(12) United States Patent
Fukui et al.

(10) Patent No.: US 7,685,324 B2
(45) Date of Patent: Mar. 23, 2010

(54) AUDIO-VIDEO PROCESSING APPARATUS AND PROGRAM THEREFOR

(75) Inventors: Takayuki Fukui, Osaka (JP); Masazumi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 11/912,457

(22) PCT Filed: Jan. 18, 2006

(86) PCT No.: PCT/JP2006/301084
§ 371 (c)(1),
(2), (4) Date: Oct. 24, 2007

(87) PCT Pub. No.: WO2006/117904
PCT Pub. Date: Nov. 9, 2006

(65) Prior Publication Data
US 2009/0132728 A1    May 21, 2009

(30) Foreign Application Priority Data
Apr. 28, 2005 (JP) .............................. 2005-131962
May 17, 2005 (JP) .............................. 2005/143753

(51) Int. Cl.
*G06F 3/00* (2006.01)
*G06F 1/00* (2006.01)

(52) U.S. Cl. ........................... 710/8; 713/300; 715/700; 710/10; 710/14; 710/16; 710/18

(58) Field of Classification Search ........................ None
See application file for complete search history.

(56) References Cited
U.S. PATENT DOCUMENTS
5,648,813 A    7/1997  Tanigawa et al.
5,887,193 A    3/1999  Takahashi et al.

FOREIGN PATENT DOCUMENTS
EP    1 146 415    10/2001
JP    7-177586    7/1995
JP    2003-29895    1/2003

OTHER PUBLICATIONS

International Search Report issued May 19, 2006 in the International (PCT) Application of which the present application is the U.S. National Stage.
Patent Cooperation Treaty (PCT) International Preliminary Report on Patentability, issued Jun. 12, 2007 in International Application No. PCT/JP2006/301084.
Written Opinion of the International Searching Authority, issued May 19, 2006.

*Primary Examiner*—Alan Chen
(74) *Attorney, Agent, or Firm*—Wenderoth, Lind & Ponack, L.L.P.

(57) ABSTRACT

Provided is an audio-video processing apparatus having significant operability. The first electronic device (100) includes a state information sending unit (105) that sends, to a second electronic device (200) being the audio-video processing apparatus, a state information indicating a state of the self electronic device. The second electronic device (200) includes: a second manipulation item information storage unit (202) that stores one or more pieces of first manipulation item information, each of which includes item information indicating an item in a manipulation menu and operation instruction information that is information instructing the first electronic device (100) to perform a specified operation corresponding to the item; a state information obtainment unit (203) that obtains the state information from the first electronic device (100); a manipulation menu display preparation unit (204) that displays a manipulation menu based on one or more pieces of manipulation item information stored in the second manipulation item information storage unit (202), depending on the state information obtained by the state information obtainment unit (203).

16 Claims, 23 Drawing Sheets

| State information | Judgment result |
|---|---|
| Powered on | Manipulation possible |
| Powered off | Manipulation not possible |
| Sleep | Manipulation not possible |
| Operation in progress | Manipulation not possible |
| ⋮ | ⋮ |

FIG. 5

```
<item>
    <item name>surround-sound effect ON</item name>
    <action name>surround_ON</action name>
    <target ID>CB01</target ID>
</item>
<item>
    <item name>surround-sound effect OFF</item name>
    <action name>surround_OFF</action name>
    <target ID>CB01</target ID>
</item>
<item>
    <item name>turn up volume</item name>
    <action name>volume_UP</action name>
    <target ID>CB01</target ID>
</item>
<item>
    <item name>turn down volume</item name>
    <action name>volume_DOWN</action name>
    <target ID>CB01</target ID>
</item>
        .
        .
        .
        .
        .
```

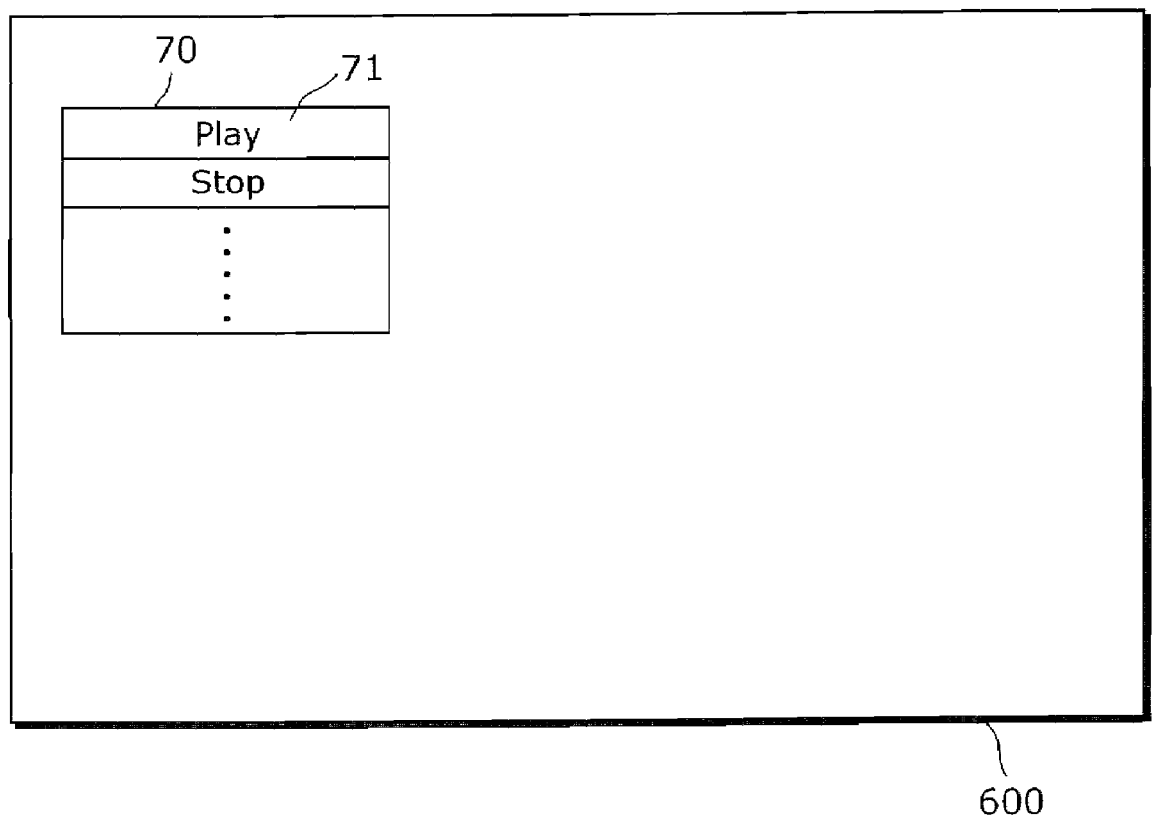

| State information | Judgment result |
|---|---|
| Powered on | Display |
| Powered off | Not display |
| Sleep | Not display |
| Operation in progress | Not display |
| ⋮ | ⋮ |

FIG. 13

| State information | Judgment result |
|---|---|
| Powered on | Sending possible |
| Sleep | Sending not possible |
| Operation in progress | Sending not possible |
| ⋮ | ⋮ |

FIG. 19

```
<item>
    <item name>surround-sound effect ON</item name>
    <action name>surround_ON</action name>
    <target ID>CB01</target ID>
</item>
<item>
    <item name>surround-sound effect OFF</item name>
    <action name>surround_OFF</action name>
    <target ID>CB01</target ID>
</item>
<item>
    <item name>turn up volume</item name>
    <action name>volume_UP</action name>
    <target ID>CB01</target ID>
</item>
<item>
    <item name>turn down volume</item name>
    <action name>volume_DOWN</action name>
    <target ID>CB01</target ID>
</item>
        .
        .
        .
        .
        .
```

FIG. 20

| Target ID | Device address information |
|---|---|
| CB01 | 192.168.1.25 |

FIG. 21

| State information | Judgment result |
|---|---|
| Powered on | Manipulation possible |
| Powered off | Manipulation not possible |
| Sleep | Manipulation not possible |
| Operation in progress | Manipulation not possible |
| ⋮ | ⋮ |

FIG. 22

```
<item>
    <item name>surround-sound effect ON</item name>
    <action name>surround_ON</action name>
    <target ID>SELF</target ID>
</item>
<item>
    <item name>surround-sound effect OFF</item name>
    <action name>surround_OFF</action name>
    <target ID>SELF</target ID>
</item>
<item>
    <item name>turn up volume</item name>
    <action name>volume_UP</action name>
    <target ID>SELF</target ID>
</item>
<item>
    <item name>turn down volume</item name>
    <action name>volume_DOWN</action name>
    <target ID>SELF</target ID>
</item>
        .
        .
        .
        .
        .
```

FIG. 26

| State information | Judgment result |
|---|---|
| Powered on | Sending possible |
| Sleep | Sending not possible |
| Operation in progress | Sending not possible |
| ⋮ | ⋮ |

AUDIO-VIDEO PROCESSING APPARATUS AND PROGRAM THEREFOR

TECHNICAL FIELD

The present invention relates to an electronic device system or the like that includes plural electronic devices connected via a network or the like, and particularly relates to an audio-video processing apparatus connected to an electronic device.

BACKGROUND ART

Conventional systems composed of electronic devices represented by an audio-video processing apparatus, include a system in which one electronic device receives menu information of another electronic device connected via a network or the like, and merges such received menu information with its own menu information (for example, refer to Japanese Laid-Open Patent Application No. 07-177586 (page 1, FIG. 1, and the like) and Japanese Laid-Open Patent Application No. 2003-029895 (page 1, FIG. 1, and the like)). Such electronic device system is capable of controlling the operation of another electronic device connected, using such merged menu information.

However, in the above-mentioned conventional electronic device system, menu items of an electronic device which has become unusable due to such reasons as that it has been powered off, are displayed as menu items in the merged menu information, meaning that menu items which are substantially unnecessary are displayed. Due to an increased number of unnecessary menu items, a user needs to spend a longer time to find a menu item s/he wishes to select or is unable to find a desired menu item. This poses a problem of poor operability.

Furthermore, the above-mentioned conventional electronic device system also has a problem of complicated operation and poor operability since the user needs to manipulate the electronic devices separately by, for example, checking which electronic devices are in a state ready to be manipulated, by determining an electronic device to manipulate from the electronic devices that are in a state ready to be manipulated, and by selecting menu items corresponding to the respective electronic devices.

In particular, since audio-video processing apparatuses such as televisions have become more diverse in function in recent years, there is a strong demand for improved operability of such audio-video processing apparatuses.

DISCLOSURE OF INVENTION

The present invention has been conceived in view of the above problems, and it is an object of the present invention to provide an audio-video processing apparatus and the like having significant operability.

The audio-video processing apparatus according to the present invention is an audio-video processing apparatus connected to an electronic device via a communication path, the apparatus including: a manipulation item information storage unit that holds one or more pieces of manipulation item information, each of which is information for causing the electronic device to operate in a predetermined manner; a state information obtainment unit that obtains state information indicating a state of the electronic device; an operation instruction accepting unit that accepts, from an input device, an operation instruction that is an instruction to cause at least one of the electronic device and the audio-video processing apparatus to operate in a predetermined manner; an operation instruction information obtainment unit that obtains, based on the state information, operation instruction information related to a corresponding one of the one or more pieces of manipulation item information corresponding to the operation instruction, the operation instruction information being information instructing that an operation should be performed; and an operation instruction information sending unit that sends, to the electronic device, the operation instruction information obtained by the operation instruction information obtainment unit. With this structure, it becomes possible for the audio-video processing apparatus to selectively display a necessary manipulation menu depending on a state of the electronic device, and thus to improve the operability of a menu by not displaying unnecessary menu items.

For example, the audio-video processing apparatus may further include a manipulation menu display preparation unit that prepares a manipulation menu based on the one or more pieces of manipulation item information held in the manipulation item information storage unit, and determines whether or not to display the manipulation menu depending on the state information obtained by the state information obtainment unit; wherein the operation instruction accepting unit may accept, as the operation instruction, an instruction directed to a menu item in the manipulation menu; and the operation instruction information obtainment unit may obtain, based on the operation instruction accepted by the operation instruction accepting unit, the operation instruction information related to the corresponding manipulation item information. With this structure, it becomes possible for the audio-video processing apparatus to change and display menu items based on a detailed state of the electronic device.

Here, the audio-video processing apparatus may further include: a priority information obtainment unit that obtains priority information that is information related to a priority level of the electronic device; wherein the operation instruction information obtainment unit may further obtains, based on the priority information, the operation instruction information related to the corresponding manipulation item information corresponding to the operation instruction. With the above structure, since an electronic device that is selected based on the priority information is manipulated from electronic devices that can be manipulated based on the operation instruction given by the user, it becomes possible to improve the operability of the electronic devices because the user is not required to select an electronic device to manipulate.

Note that it is not only possible to embody the present invention as an audio-video processing apparatus, but also as: an audio-video processing apparatus control method that includes, as its steps, the processing units making up the audio-video processing apparatus; a computer program that causes a computer to execute these steps; and a computer-readable storage medium, such as a CD-ROM, on which such program is stored.

According to the present invention, it is possible to provide an audio-video processing apparatus and the like, having significant operability, capable of displaying a menu item of an electronic device connected thereto via a network or the like, depending on a state of such electronic device.

Moreover, it is possible to provide an audio-video processing apparatus and the like, having significant operability, capable of manipulating an electronic device connected thereto via a network or the like, depending on a state of such electronic device.

The disclosure of Japanese Patent Application No. 2005-131962 filed on Apr. 28, 2005 and Japanese Patent Application No. 2005-143753 filed on May 17, 2005 including specification, drawings and claims are incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing the structure of first manipulation item information in the electronic device system;

FIG. 6 is a diagram showing an electronic device information management table of the electronic device system;

FIG. 7 is a diagram showing a display example in the electronic device system;

FIG. 13 is a diagram showing a sending judgment table of the electronic device system;

FIG. 19 is a diagram showing the structure of first manipulation item information in the electronic device system;

FIG. 20 is a diagram showing an electronic device information management table of the electronic device system;

FIG. 21 is a diagram showing a state judgment table of the electronic device system;

FIG. 22 is a diagram showing the structure of second manipulation item information in the electronic device system;

FIG. 26 is a diagram showing a state judgment table of the electronic device system.

BEST MODE FOR CARRYING OUT THE INVENTION

With reference to the drawings, the following describes preferred embodiments of a system composed of electronic devices including the audio-video processing apparatus of the present invention, i.e., an electronic device system or the like. Note that in the embodiments, components and steps assigned with the same reference numbers are intended for the same operations, and therefore their descriptions are not repeated in some cases.

First Embodiment

Figure 1:
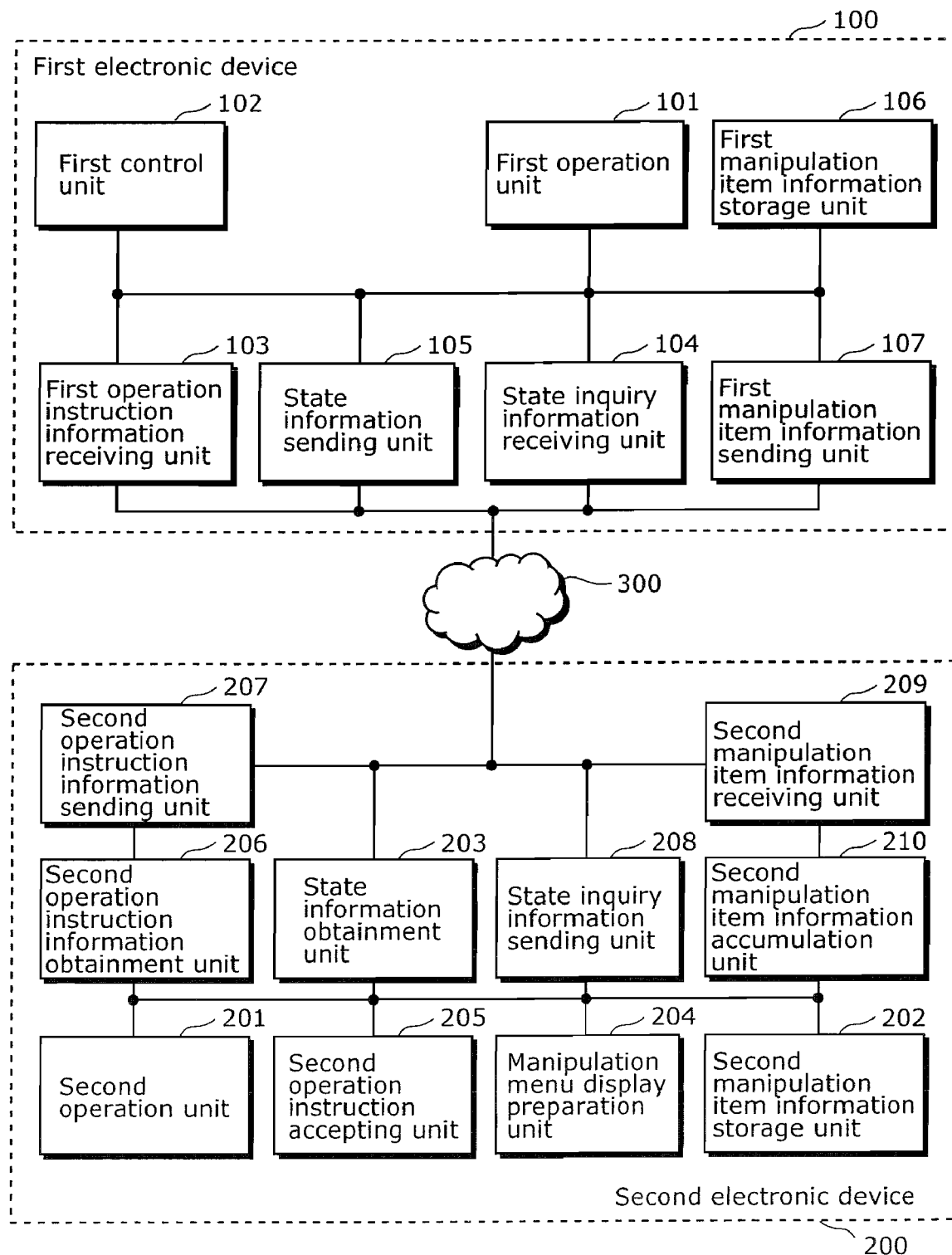
FIG. 1 is a block diagram showing the structure of an electronic device system according to a first embodiment of the present invention.

FIG. 1 is a block diagram showing the structure of an electronic device system according to the present embodiment. The electronic device system according to the present embodiment includes a first electronic device 100 and a second electronic device 200. The first electronic device 100 and the second electronic device 200 are connected via a network 300.

The first electronic device 100 is an example of an electronic device connected to the audio-video processing apparatus of the present invention. In the present embodiment, the first electronic device 100 includes a first operation unit 101, a first control unit 102, a first operation instruction information receiving unit 103, a state inquiry information receiving unit 104, a state information sending unit 105, a first manipulation item information storage unit 106, and a first manipulation item information sending unit 107.

The second electronic device 200 is an example of the audio-video processing apparatus of the present invention. In the present embodiment, the second electronic device 200 includes a second operation unit 201, a second manipulation item information storage unit 202, a state information obtainment unit 203, a manipulation menu display preparation unit 204, a second operation instruction accepting unit 205, a second operation instruction information obtainment unit 206, a second operation instruction information sending unit 207, a state inquiry information sending unit 208, a second manipulation item information receiving unit 209, and a second manipulation item information accumulation unit 210.

The first electronic device 100 may be any electronic device as long as it is capable of being connected to another device via a network or the like. For example, the first electronic device 100 may be: an Audio-Video device such as a television, a DVD player, a DVD recorder, a hard disk recorder, a video tape recorder, a CD player, a tuner, a cassette tape recorder, an amplifier, a surround-sound system; a home appliance such as a refrigerator, a washing machine, an air-conditioner, and a lighting device; and facility equipment such as a water heating system.

The first operation unit 101 operates in a predetermined manner (hereinafter also referred to as performing a "predetermined operation") based on a control signal from the first control unit 102. For example, the "predetermined operation" is an operation or the like to receive radio frequencies and display video in the case where the first electronic device 100 is a television, whereas it is an operation or the like to read a video signal and an audio signal from a DVD disc and output such signals in the case where the first electronic device 100 is a DVD player. The first operation unit 101 can be implemented, for example, as an MPU, a memory, and the like. The operation of the first operation unit 101 is implemented, for example, as software, and such software is stored in a storage medium such as a ROM. Note, however, that the operation of the first operation unit 101 may also be implemented as hardware such as a dedicated circuit.

The first operation instruction information receiving unit 103 receives, from the second electronic device 200, operation instruction information which is information instructing the first operation unit 101 to operate. The operation instruction information may be any information as long as it is information for instructing the first operation unit 101 to operate. The operation instruction information may be, for example, a command and event information or the like for causing the first operation unit 101 to perform a specified action, or may be identification information or the like for specifying an action to be executed by the first operation unit 101. Furthermore, the operation instruction information may have any data structure. The first operation instruction information receiving unit 103 may or may not include a receiving device, such as a modem and a network, for receiving information. The first operation instruction information receiving unit 103 may be implemented as hardware or as software, such as a driver, for driving the receiving device. The first operation instruction information receiving unit 103 is implemented as: a communication means/device such as a LAN; an infrared communication; a short-range wireless communication means/device such as Bluetooth (registered trademark); an e-mail sending means/device; or the like. The first operation instruction information receiving unit 103 may also be implemented as a wireless or wired broadcasting means/device.

The first control unit 102 causes the first operation unit 101 to operate based on the operation instruction information received by the first operation instruction information receiving unit 103. More specifically, the first control unit 102 outputs, to the first operation unit 101, a control signal corresponding to the received operation instruction information, so as to cause the first operation unit 101 to perform an operation as instructed by the operation instruction information. The first control unit 102 can be implemented as an MPU, a memory, and the like. The operating procedures of the first control unit 102 are implemented, for example, as software, and such software is stored in a storage medium such as a ROM. Note, however, that the operating procedures of the first control unit 102 may also be implemented as hardware such as a dedicated circuit.

The state information sending unit 105 sends, to the second electronic device 200, state information that is information related to a state of the first electronic device 100. The state information may be any information. For example, the state information may be information indicating a state of the first electronic device 100 in terms of whether or not the first electronic device 100 is in power-on state or in a power-off state, or may be information indicating whether or not the first electronic device 100 is in an activated state. Furthermore, the state information may be information indicating an operation mode such as "input mode", "output mode", "display mode", "recording mode", and "play mode". The state information may further be information indicating that only a part of the functions or components of the first electronic device 100 is ready for operation, or may be information indicating such part of functions or components ready for operation. Furthermore, the state information may be information indicating that at least a part of the first electronic device 100 is out of order, or may be information or the like indicating that the first electronic device 100 can operate normally. The state information may also be information indicating that a major hardware component of the first electronic device 100, such as the monitor and the hard disk, is in a halt state, which is a so-called sleep state or suspend state. Furthermore, the state information may be information indicating that the first electronic device 100 is already executing a certain operation or a specified operation, e.g., information indicating that the playback or recording of a DVD is being carried out in a DVD recorder, and the like. The state information may also be information indicating whether or not the first electronic device 100 is in a state ready to be manipulated. The state information may have any data structure. The state information sending unit 105 may obtain state information of the first electronic device 100, i.e., the self electronic device, in any way. For example, the state information sending unit 105 may obtain, as state information, the name or the like of a process being executed by the first operation unit 101, or may obtain state information using a conversion table or the like, based on a process being executed by the first operation unit 101. The state information sending unit 105 may also obtain state information from information outputted from the first operation unit 101, or may obtain state information from control information or the like outputted from the first control unit 102 to the first operation unit 101, or the like. Furthermore, the state information sending unit 105 may also obtain state information based on a state of power supplied to the state information sending unit 105 or based on a change in a state of such a power. The state information sending unit 105 may obtain and send state information of the first electronic device 100 at any timing or in response to any trigger. For example, the state information sending unit 105 may obtain and send state information on a regular or irregular basis, or on an occasion such as when detecting a change in a state of the first electronic device 100 and when accepting information indicating that a change in a state of the first electronic device 100 has occurred. The state information sending unit 105 may also obtain and send state information in the case of receiving, from outside, an instruction to obtain state information. Furthermore, the state information sending unit 105 may obtain and send state information in response to different triggers such as that the state information sending unit 105 obtains state information when detecting a change in a state of the first electronic device 100, and sends such obtained state information in the case of receiving, from outside, an instruction to obtain state information. Note that the present embodiment is described, in particular, for the case where the state information sending unit 105 obtains and sends state information, using, as a trigger, the receiving of state inquiry information by the below-described state inquiry information receiving unit 104. The state information sending unit 105 may or may not include a sending device, such as a modem and a network, for sending information. The state information sending unit 105 may be implemented as hardware or as software, such as a driver, for driving the sending device. The state information sending unit 105 may be implemented as: a communication means/device such as a LAN; an infrared communication; a short-range wireless communication means/device such as Bluetooth (registered trademark); an e-mail sending means/ device; or the like. The state information sending unit 105 may also be implemented as a wireless or wired broadcasting means/device.

The state inquiry information receiving unit 104 receives, from the second electronic device 200, state inquiry information that is information for inquiring about a state of the first electronic device 100. The state inquiry information may have any data structure. The state inquiry information receiving unit 104 may or may not include a receiving device, such as a modem and a network, for receiving information. The state inquiry information receiving unit 104 may be implemented as hardware or as software, such as a driver, for driving the receiving device. The state inquiry information receiving unit 104 may be implemented as: a communication means/device such as a LAN; an infrared communication; a short-range wireless communication means/device such as Bluetooth (registered trademark); an e-mail sending means/device; or the like. The state inquiry information receiving unit 104 may also be implemented as a wireless or wired broadcasting means/device.

The first manipulation item information storage unit 106 stores one or more pieces of first manipulation item information, each of which is information for causing the first electronic device 100 to operate. For example, a first manipulation item information includes: item information indicating an item in the manipulation menu; and operation instruction information corresponding to such item. This operation instruction information included in the first manipulation item information is intended for instructing the first operation unit 101 to operate. An example of the item information is information indicating an item in the manipulation menu such as "channel up" and "turn down volume" in the case where the first electronic device 100 is a television, whereas it is information indicating an item in the manipulation menu such as "play" and "stop" in the case where the first electronic device 100 is a DVD player. The item information may either be text information or image information as long as it indicates an item in the manipulation menu. Furthermore, the item information itself may be displayed as a menu item, or text data or image data for displaying a menu item associated with such item information may be displayed as a menu item. Note that the first manipulation item information may include only one of item information and operation instruction information. Also note that the first manipulation item information may include information to identify the first electronic device 100. The first manipulation item information may be in any data form. For example, the first manipulation item information may be data in the XML format, or may be data in tabular form. Furthermore, the data structures of the first manipulation item information, item information, and operation instruction information may be any structures. The first manipulation item information storage unit 106 is preferably a non-volatile storage medium such as a ROM and an optical disc, but it may also be a volatile storage medium.

The first manipulation item information sending unit 107 sends, to the second electronic device 200, the first manipulation item information stored in the first manipulation item information storage unit 106. The first manipulation item information may be sent in response to any trigger or at any timing. For example, the first manipulation item information sending unit 107 may obtain, from the first manipulation item information storage unit 106, the first manipulation item information on a regular or irregular basis, and send the obtained first manipulation item information to the second electronic device 200. Furthermore, the first manipulation item information sending unit 107 may also send the first manipulation item information when the first electronic device 100 recognizes that a connection with the second electronic device 200 has been established, such as the following timings: immediately after the first electronic device 100 and the second electronic device 200 are connected; immediately after the second electronic device 200 is powered on; and immediately after the first electronic device 100 is connected to some network or electronic device. Note that the expression "immediately after" covers the case where there is some degree of delay after the point in time when a connection between the first electronic device 100 and the second electronic device 200 is recognized. Furthermore, the first manipulation item information sending unit 107 may also send the first manipulation item information to an electronic device which has been recognized as being connected with the first electronic device 100, by specifying an address or the like of such electronic device. The first manipulation item information sending unit 107 may also send the first manipulation item information by means/device of multicast transmission or broadcast transmission over a network, a wire, or the like to which the first electronic device 100 is connected. Furthermore, the first manipulation item information sending unit 107 may also send the first manipulation item information, in the case of accepting information requesting for the first manipulation item information from another electronic device or the like, to such another electronic device specified by the accepted information or to all electronic devices on the network. The first manipulation item information sending unit 107 may or may not include a sending device, such as a modem and a network, for sending information. The first manipulation item information sending unit 107 may be implemented as hardware or as software, such as a driver, for driving the sending device. The first manipulation item information sending unit 107 may be implemented as: a communication means/device such as a LAN; an infrared communication; a short-range wireless communication means/device such as Bluetooth (registered trademark); an e-mail sending means/device; or the like. The first manipulation item information sending unit 107 may also be implemented as a wireless or wired broadcasting means/device.

The second electronic device 200 may be any electronic device as long as it is capable of being connected to another device via a network or the like. For example, the second electronic device 200 may be: an Audio-Video device such as a television, a DVD player, a DVD recorder, a hard disk recorder, a video tape recorder, a CD player, a tuner, a cassette tape recorder, an amplifier, a surround-sound system; a home appliance such as a refrigerator, a washing machine, an air-conditioner, and a lighting device; and facility equipment such as a water heating system.

The second operation unit 201 performs a predetermined operation, based usually on a control signal or the like from another control unit or the like. For example, the "predetermined operation" is an operation or the like to receive radio frequencies and display video in the case where the second electronic device 200 is a television, whereas it is an operation or the like to read a video signal and an audio signal from a DVD disc and output such signals in the case where the second electronic device 200 is a DVD player. The second operation unit 201 can be implemented, for example, as an MPU, a memory, and the like. The operation of the second operation unit 201 is implemented, for example, as software, and such software is stored in a storage medium such as a ROM. Note, however, that the operation of the second operation unit 201 may also be implemented as hardware such as a dedicated circuit.

The second manipulation item information receiving unit 209 receives, from the first electronic device 100, the first manipulation item information that is information for causing the first electronic device 100 to operate. The second manipulation item information receiving unit 209 may or may not include a receiving device, such as a modem and a network, for receiving information. The second manipulation item information receiving unit 209 may be implemented as hardware or as software, such as a driver, for driving the receiving device. The second manipulation item information receiving unit 209 may be implemented as: a communication means/device such as a LAN; an infrared communication; a short-range wireless communication means/device such as Bluetooth (registered trademark); an e-mail sending means/device; or the like. The second manipulation item information receiving unit 209 may also be implemented as a wireless or wired broadcasting means/device.

The second manipulation item information accumulation unit 210 accumulates, in the second manipulation item information storage unit 202, the first manipulation item information received by the second manipulation item information receiving unit 209. The second manipulation item information accumulation unit 210 can be implemented as an MPU, a memory, and the like.

The second manipulation item information storage unit 202 is an example of the manipulation item information storage unit that holds one or more pieces of manipulation item information, each of which is information for causing another electronic device to operate in a predetermined manner. In the present embodiment, the second manipulation item information storage unit 202 stores one or more pieces of first manipulation item information, each of which is information for causing the first electronic device 100 to operate. The term "storage/store" here also refers to temporary storage such as the case where data received by a receiving unit or the like is temporarily held and where data is temporarily held in a cache or the like at data processing time. The second manipulation item information storage unit 202 may previously store the first manipulation item information or may store the first manipulation item information sent from the first electronic device 100. The second manipulation item information storage unit 202 is preferably a rewritable non-volatile storage medium such as a ROM and an optical disc, but it may also be a volatile storage medium. Furthermore, in the case where there is no need to rewrite the first manipulation item information, a non-rewritable storage medium such as a ROM may be used as the second manipulation item information storage unit 202.

The state inquiry information sending unit 208 sends state inquiry information that is information for inquiring about a state of the first electronic device 100. The state inquiry information may be any information, and thus it may be event information for activating a program or the like for causing the first electronic device 100 to obtain and send state information or may be a command for causing the first electronic device 100 to execute these processes. Furthermore, the state inquiry information may include address information, such as an IP address, for identifying a position or the like of the second electronic device 200, or may include identification information, such as a MAC address and a serial number, for identifying the second electronic device 200. Furthermore, the state inquiry information sending unit 208 may send state inquiry information at any timing or in response to any event information. For example, the state inquiry information sending unit 208 may send state inquiry information on a regular or irregular basis, or may send state inquiry information in response to an instruction or the like from another processing unit in the second electronic device 200. The present embodiment is described for the case where the state inquiry information sending unit 208 sends state inquiry information immediately before the manipulation menu display preparation unit 204 prepares and displays a manipulation menu. The expression "immediately before the manipulation menu display preparation unit 204 prepares and displays a manipulation menu" refers to timing which is immediately before the manipulation menu display preparation unit 204 prepares and displays a manipulation menu in accordance with the first manipulation item information. For example, such timing is a period of time from when an instruction is received to prepare and display a manipulation menu in accordance with the first manipulation item information until when such manipulation menu is actually displayed. The reason for sending state inquiry information immediately before the manipulation menu display preparation unit 204 prepares and displays a manipulation menu is that it is preferable in that state information related to the latest state of the first electronic device 100 can be obtained at the time of manipulation menu preparation and display. Note that the expression "immediately before" covers the case where the sending of state inquiry information precedes the preparation and display of a manipulation menu to some extent. The state inquiry information sending unit 208 may or may not include a sending device, such as a modem and a network, for sending information. The state inquiry information sending unit 208 may be implemented as hardware or as software, such as a driver, for driving the sending device. The state inquiry information sending unit 208 may be implemented as: a communication means/device such as a LAN; an infrared communication; a short-range wireless communication means/device such as Bluetooth (registered trademark); an e-mail sending means/device; or the like. The state inquiry information sending unit 208 may also be implemented as a wireless or wired broadcasting means/device.

The state information obtainment unit 203 is an example of the state information obtainment unit that obtains state information indicating a state of another electronic device. In the present embodiment, the state information obtainment unit 203 obtains state information that is information indicating a state of the first electronic device 100. The state information obtainment unit 203 may obtain state information of the first electronic device 100 in any way. For example, the state information obtainment unit 203 may obtain state information by receiving state information sent from the first electronic device 100. Furthermore, the state information obtainment unit 203 may also obtain state information in the following manner: in the case where state information cannot be received within a certain period of time after the state inquiry information sending unit 208 sends state inquiry information, the state information obtainment unit 203 judges that the first electronic device 100 is not in a state ready for operation, and obtains state information indicating that "not in a state ready for operation". The state information obtainment unit 203 may also obtain state information of the first electronic device 100 from another information or the like outputted from the first electronic device 100. More specifically, in the case where the first electronic device 100 is a CD player, and is outputting a reproduced sound, the state information obtainment unit 203 judges that the first electronic device 100 is in operation, and obtains state information indicating that the first electronic device 100 is in operation. The state information obtainment unit 203 may or may not include a receiving device, such as a modem and a network, for receiving information. The state information obtainment unit 203 may be implemented as hardware or as software, such as a driver, for driving the receiving device. The state information obtainment unit 203 is implemented as: a communication means/device such as a LAN; an infrared communication; a short-range wireless communication means/device such as Bluetooth (registered trademark); an e-mail sending means/device; or the like. The state information obtainment unit 203 may also be implemented as a wireless or wired broadcasting means/device. Furthermore, the state information obtainment unit 203 may include an MPU, a memory, and the like in the case where the state information obtainment unit 203 is designed to perform a process of judging a state of the first electronic device 100 based on received information or the like.

The manipulation menu display preparation unit 204 is an example of the manipulation menu display preparation unit that prepares a manipulation menu based on the one or more pieces of manipulation item information held in the manipulation item information storage unit, and that determines whether or not to display the manipulation menu depending on the obtained state information of another electronic device. In the present embodiment, the manipulation menu display preparation unit 204 prepares and displays a manipulation menu that includes one or more menu items, based on the first manipulation item information stored in the second manipulation item information storage unit 202 and based on the state information obtained by the state information obtainment unit 203. The expression "prepares and displays based on the state information" covers the case where no manipulation menu is prepared and displayed at all depending on a result of a judgment that is made based on the state information. More specifically, the manipulation menu display preparation unit 204 judges, based on the state information, whether or not to prepare and display a manipulation menu based on the first manipulation item information, and either prepares and displays or does not prepare and display a manipulation menu according to the result of such judgment. The manipulation menu display preparation unit 204 may judge whether or not to prepare and display a manipulation menu in any way. For example, the manipulation menu display preparation unit 204 may judge that a manipulation menu should be prepared and displayed, only in the case where state information is information indicating whether or not the first electronic device 100 is in a state ready to be manipulated and such information indicates that the first electronic device 100 is in a state ready to be manipulated. Meanwhile, in the case where state information is information or the like indicating a power state of the first electronic device 100, or information indicating that the first electronic device 100 is currently executing a specified operation, a table may be prepared in advance indicating a relationship between each state information and a result of judgment of whether or not to prepare and display a manipulation menu corresponding to such state information, and the manipulation menu display preparation unit 204 may use such table to determine which judgment result to be outputted for each state information. Note that the manipulation menu display preparation unit 204 not only makes a judgment of whether or not to prepare and display a manipulation menu, but also may judge, based on state information, that only some of menu items should be prepared and displayed from among all menu items, and display a manipulation menu made up of such menu items judged to be displayed. The manipulation menu display preparation unit 204 may prepare and display a manipulation menu in response to any trigger. For example, an accepting unit (not illustrated in the drawing) that accepts an instruction to display a manipulation menu is provided so that the manipulation menu display preparation unit 204 prepares and displays a manipulation menu with the accepting of an instruction to display a manipulation menu by such accepting unit as a trigger, or with the accepting of an instruction to display a manipulation menu by another processing unit or the like as a trigger. The manipulation menu display preparation unit 204 prepares and displays a manipulation menu that includes, for example, a menu item corresponding to item information included in the first manipulation item information. For example, in the case where item information included is text data indicating the name of a menu item, such text data may be prepared and displayed as it is as a menu item, or menu item such as a button that is created using such text data may be displayed. In the case where item information is image data representing a menu item, such image data may be prepared and displayed as a menu item. The manipulation menu display preparation unit 204 may prepare and display a manipulation menu in any form such as a list form or as buttons. A manipulation menu may also be displayed as a menu with a hierarchical structure. Furthermore, the manipulation menu display preparation unit 204 may merge the first manipulation item information with manipulation item information that is information for causing another electronic device, such as the second electronic device 200, to operate, and prepare and display a manipulation menu based on such merged manipulation item information. In the case where a manipulation menu is displayed based on merged manipulation item information, merge may be carried out in any way. For example, a merge rule concerning data structure may be applied, such as that item information included in another manipulation item information should be simply added after item information included in the first manipulation item information, or a merge rule concerning a pre-set shape may be applied, such as how the shape of a menu button or the like is selected. Furthermore, a merge rule concerning operation may be applied. An example of the merge rule concerning operation is that, in the case where there is an instruction to perform a video recording operation, the recording should be carried out after always shifting the control from a television to a video device. In other words, in the case where an instruction is related to an operation of the video device, such rule defines, as pre-processing, that the operation of shifting the control to the video device must be performed first. In the case where there is an instruction to play video, such processing may be defined as the one for shifting the destination of a signal for television display to an external input terminal connected to an output of the video device. The manipulation menu display preparation unit 204 may or may not include a display device such as a display. The manipulation menu display preparation unit 204 may prepare and output, to another display device, information for displaying a manipulation menu. The manipulation menu display preparation unit 204 can be implemented as driver software for display device, or may be made up of a display device, driver software, and an output device, or the like. Furthermore, the manipulation menu display preparation unit 204 may include an MPU, a memory, and the like for executing, by software, processes or the like of judging whether or not to display a manipulation menu, or may include dedicated hardware for executing such processes.

The second operation instruction accepting unit 205 is an example of the operation instruction accepting unit that accepts, from an input device, an operation instruction that is an instruction to cause at least one of another electronic device and the self electronic device (audio-video processing apparatus) to operate in a predetermined manner. In the present embodiment, the second operation instruction accepting unit 205 accepts an operation instruction that is an instruction directed to a menu item displayed by the manipulation menu display preparation unit 204. More specifically, the second operation instruction accepting unit 205 accepts an operation instruction by the selection of an item in the manipulation menu displayed by the manipulation menu display preparation unit 204. The operation instruction may be an instruction to display a new menu, e.g., a sub menu or the like, related to a predetermined menu item in the manipulation menu. An operation instruction is accepted, for example, by the selection of a menu item using a remote control device and by the selection of a menu item on a touch panel equipped to the manipulation menu display preparation unit 204, or the like. Information that is selected by the press of a hard button equipped to the second electronic device 200 may also be accepted as an operation instruction. The second operation instruction accepting unit 205 may accept an input through any input means/device such as a remote control device, a touch panel, a hard button, a ten key pad, a keyboard, and a mouse. The second operation instruction accepting unit 205 can be implemented as a device driver for input means/device such as a remote control device, a touch panel, and a hard button, or as software or the like for controlling menu screen.

The second operation instruction information obtainment unit 206 is an example of the operation instruction information obtainment unit that obtains, based on the state information, operation instruction information related to a corresponding one of the one or more pieces of manipulation item information corresponding to the operation instruction, the operation instruction information being information instructing that an operation should be performed. In the present embodiment, the second operation instruction information obtainment unit 206 obtains operation instruction information related to a corresponding first manipulation item information, based on the operation instruction accepted by the second operation instruction accepting unit 205. More specifically, each first manipulation item information stored in the second manipulation item information storage unit 202 and each menu item in the manipulation menu displayed by the manipulation menu display preparation unit 204 are associated with each other, for example, by assigning, to the menu item, link information or identification information to identify the associated first manipulation item information. In the case where a menu item selected by the second operation instruction accepting unit 205 is a menu item that is displayed based on a first manipulation item information, the second operation instruction information obtainment unit 206 determines a first manipulation item information associated with such menu item selected by the second operation instruction accepting unit 205, from among pieces of first manipulation item information stored in the second manipulation item information storage unit 202, and obtains operation instruction information related to such associated first manipulation item information. The operation instruction information related to the first manipulation item information may have any relationship with the first manipulation item information. For example, in the case where a first manipulation item information includes operation instruction information, the second operation instruction information obtainment unit 206 may obtain the operation instruction information included in the first manipulation item information. Furthermore, in the case where there is operation instruction information associated with a first manipulation item information by use of link information or the like, the second operation instruction information obtainment unit 206 may obtain such associated operation instruction information. Furthermore, operation instruction information may be constructed using one or more pieces of information included in a first manipulation item information. The second operation instruction information obtainment unit 206 can be implemented as an MPU, a memory, and the like. The operating procedures of the second operation instruction information obtainment unit 206 are implemented, for example, as software, and such software is stored in a storage medium such as a ROM. Note, however, that the operating procedures of the second operation instruction information obtainment unit 206 may also be implemented as hardware such as a dedicated circuit.

The second operation instruction information sending unit 207 is an example of the operation instruction information sending unit that sends, to another electronic device, the operation instruction information obtained by the second operation instruction information obtainment unit 206. In the present embodiment, the second operation instruction information sending unit 207 sends, to the first electronic device 100, the operation instruction information obtained by the second operation instruction information obtainment unit 206. The second operation instruction information sending unit 207 may or may not include a sending device, such as a modem and a network card, for sending information. The second operation instruction information sending unit 207 may be implemented as hardware or as software, such as a driver, for driving the sending device. The sending by the second operation instruction information sending unit 207 may be implemented as: a communication means/device such as a LAN; an infrared communication; a short-range wireless communication means/device such as Bluetooth (registered trademark); an e-mail sending means/device; or the like. The second operation instruction information sending unit 207 may be implemented as a wireless or wired broadcasting means/device.

The network 300 may be any network as long as it is capable of allowing data sending and receiving between the first electronic device 100 and the second electronic device 200. The network 300 may be a wireless network using an IP protocol, a wired network, or the like. Furthermore, a communication via such network may be realized in the form of terrestrial broadcasting, cable television broadcasting, satellite broadcasting, or the like. The first electronic device 100 and the second electronic device 200 may be connected in any way as long as data communication is possible between these devices. For example, instead of being connected via a network, the first electronic device 100 and the second electronic device 200 may be connected via a serial bus such as an IEEE1394 serial bus and a USB serial bus.

Figure 2:
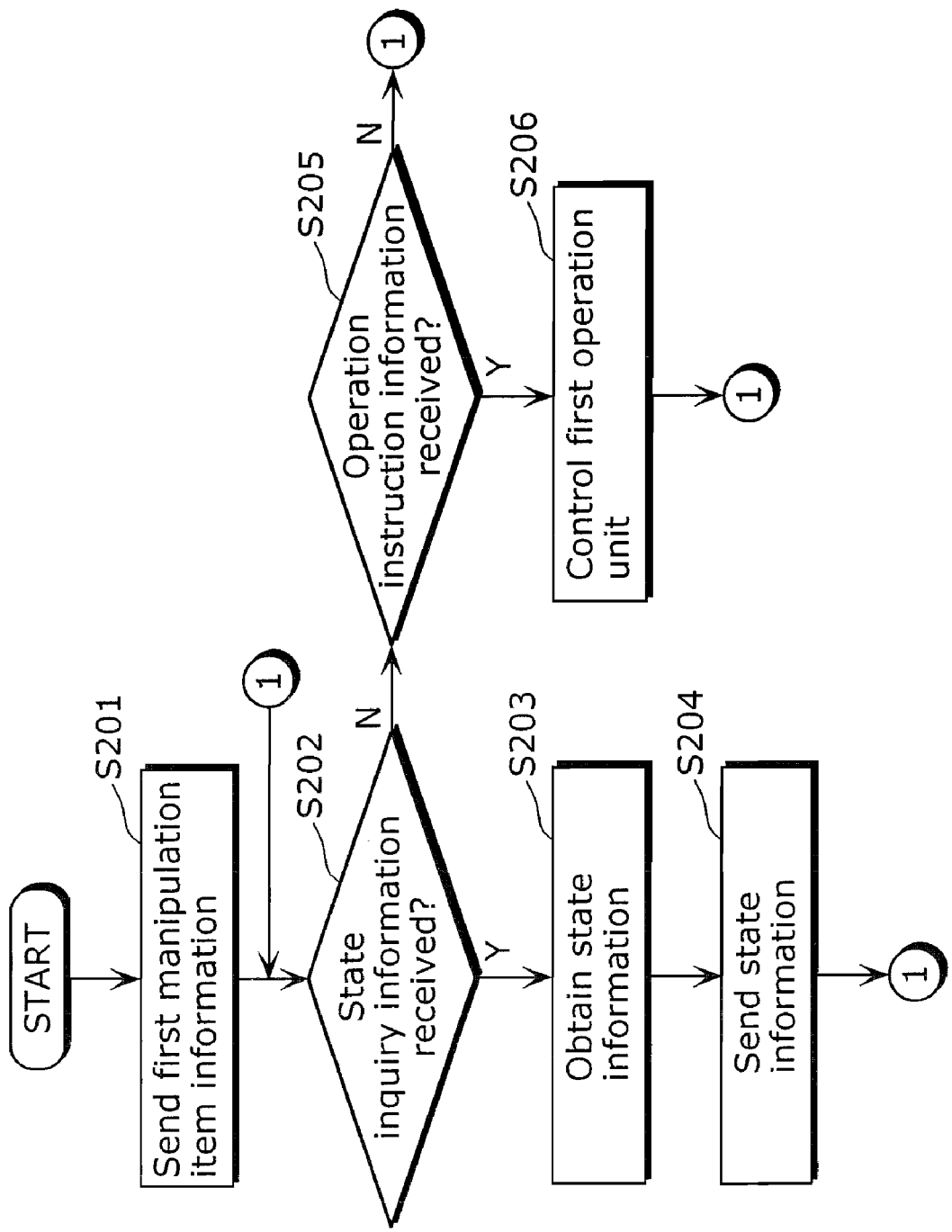
FIG. 2 is a flowchart for describing an operation performed in the electronic device system.

Next, referring to the flowchart of FIG. 2, the operation performed by the first electronic device 100 is described.

(Step S201) The first manipulation item information sending unit 107, when the first electronic device 100 is powered on, obtains the first manipulation item information from the first manipulation item information storage unit 106, and sends the first manipulation item information to another electronic device, which is the second electronic device 200 here, via the network 300. Note that the first manipulation item information is sent in response to the first electronic device 100 being powered on as a trigger, but the first manipulation item information may be sent in response to any trigger in the present embodiment. For example, the first manipulation item information may be sent with the following as a trigger: when the first electronic device 100 recognizes that it has connected to the network 300; and in the case where the first electronic device 100 accepts a certain kind of signal outputted from the second electronic device 200.

(Step S202) The state inquiry information receiving unit 104 judges whether or not state inquiry information has been received. In the case where the judgment is YES, the process proceeds to Step S203, whereas in the case where the judgment is NO, the process proceeds to Step S205.

(Step S203) The state information sending unit 105 obtains state information that is information indicating a state of the first electronic device 100.

(Step S204) The state information sending unit 105 sends, to the second electronic device 200, the state information obtained in Step S203, and returns to Step S202.

(Step S205) The first operation instruction information receiving unit 103 judges whether or not operation instruction information has been received. In the case where the judgment is YES, the process proceeds to Step S206, whereas in the case where the judgment is NO, the process returns to Step S202.

(Step S206) The first control unit 102 controls the first operation unit 101 so as to cause the first operation unit 101 to perform a predetermined operation, based on the operation instruction information, and then returns to Step S202.

Note that the processing shown in the flowchart of FIG. 2 is terminated in response to the power off of the first electronic device 100 or to an interruption for terminating the processing.

Figure 3:
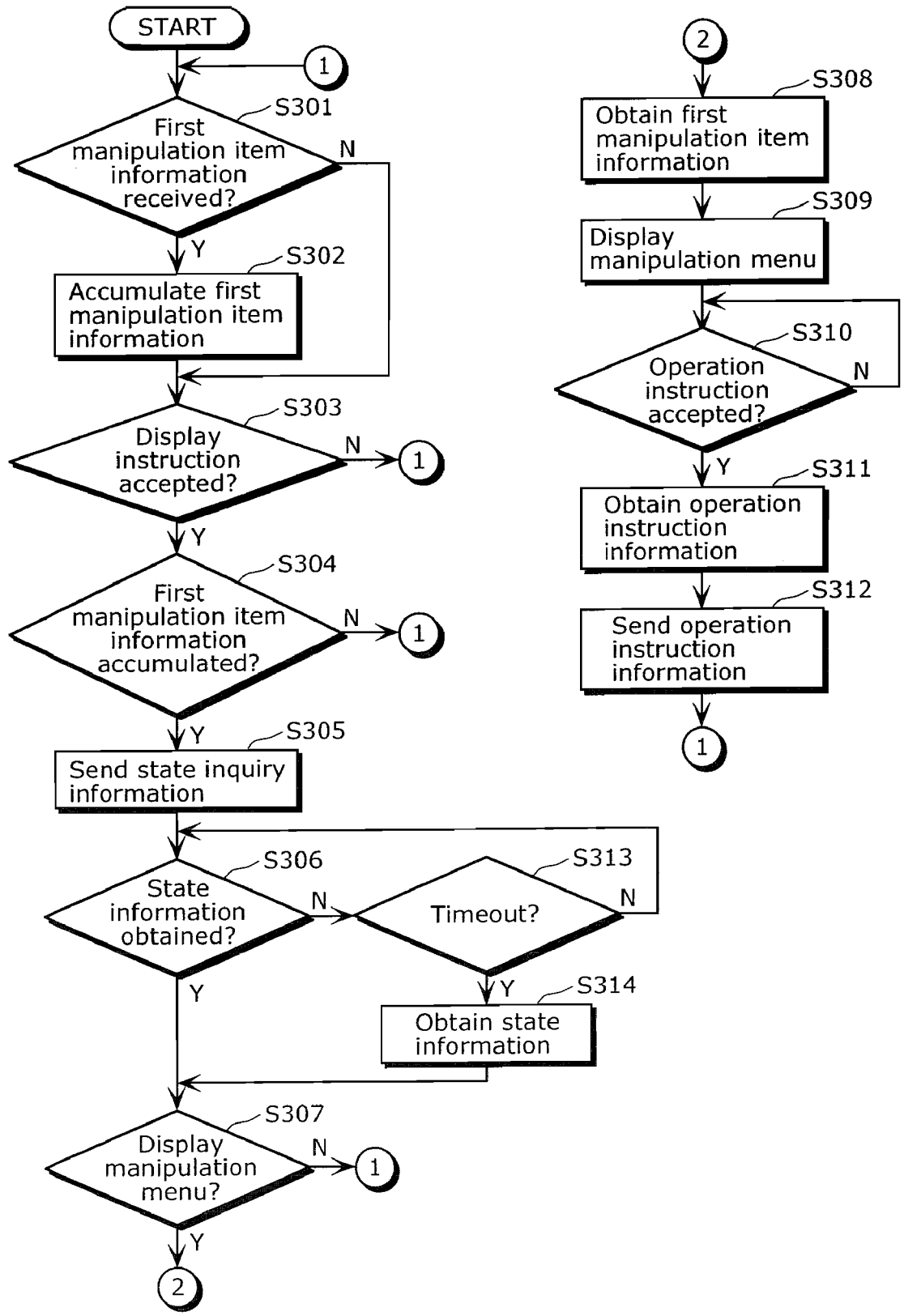
FIG. 3 is a flowchart for describing an operation performed in the electronic device system.

Next, referring to the flowchart shown in FIG. 3, the operation performed by the second electronic device 200 is described.

(Step S301) The second manipulation item information receiving unit 209 judges whether or not the first manipulation item information has been received from the first electronic device 100. In the case where the judgment is YES, the process proceeds to Step S302, whereas in the case where the judgment is NO, the process proceeds to Step S303.

(Step S302) The second manipulation item information accumulation unit 210 accumulates, in the second manipulation item information storage unit 202, the first manipulation item information received in Step S301, and proceeds to Step S303.

(Step S303) The manipulation menu display preparation unit 204 judges whether or not an instruction to display a manipulation menu based on the first manipulation item information has been received. In the case where the judgment is YES, the process proceeds to Step S304, whereas in the case where the judgment is NO, the process returns to Step S301. Note that an instruction to display a manipulation menu may be accepted in any way. For example, an accepting unit or the like that accepts an instruction to display a manipulation menu is provided so as to accept such instruction through this accepting unit, or an instruction or the like outputted from another processing unit may be accepted.

(Step S304) The manipulation menu display preparation unit 204 judges whether or not the first manipulation item information is accumulated in the second manipulation item information storage unit 202. In the case where the judgment is YES, the process proceeds to Step S305, whereas in the case where the judgment is NO, the process returns to Step S301.

(Step S305) The state inquiry information sending unit 208 sends state inquiry information to the first electronic device 100.

(Step S306) The state information obtainment unit 203 judges whether or not state information has been received from the first electronic device 100. In the case where the judgment is YES, the process proceeds to Step S307, whereas in the case where the judgment is NO, the process proceeds to Step S313.

(Step S307) The manipulation menu display preparation unit 204 judges whether to or not to display a manipulation menu based on the state information. In the case where the judgment is YES, the process proceeds to Step S308, whereas in the case where the judgment is NO, the process returns to Step S301.

(Step S308) The manipulation menu display preparation unit 204 obtains the first manipulation item information from the second manipulation item information storage unit 202.

(Step S309) The manipulation menu display preparation unit 204 displays a manipulation menu based on the first manipulation item information obtained in Step S308.

(Step S310) The second operation instruction accepting unit 205 judges whether or not an operation instruction corresponding to a menu item in the manipulation menu displayed in Step S309 has been accepted. In the case where the judgment is YES, the process proceeds to Step S311, whereas in the case where the judgment is NO, the process returns to Step S310.

(Step S311) The second operation instruction information obtainment unit 206 obtains operation instruction information related to a first manipulation item information corresponding to the operation instruction accepted in Step S310.

(Step S312) The second operation instruction information sending unit 207 sends, to the first electronic device 100, the operation instruction information obtained in Step S311, and returns to Step S301.

(Step S313) The state information obtainment unit 203 judges whether it is a time-out or not. Time-out is a pointer based on which it is judged, for example, whether or not a predetermined period of time has elapsed after the sending of state inquiry information. In the case where the judgment is YES, the process proceeds to Step S314, whereas in the case where the judgment is NO, the process returns to Step S306.

(Step S314) The state information obtainment unit 203 obtains, as state information of the first electronic device 100, state information indicating, for example, that the first electronic device 100 is in a state of being unable to send/receive information, and proceeds to Step S307.

Note that the processing shown in the flowchart of FIG. 3 is terminated in response to the power off of the second electronic device 200 or to an interruption for terminating the processing.

Also note that other than the above-described operation of the second electronic device 200, it is also possible to display a manipulation menu for manipulating the second electronic device 200 and to cause the second operation unit 201 to perform a predetermined operation based on an operation instruction corresponding to a manipulation item in such manipulation menu. Since such structure is a known technique, and thus its details are not given here. This also apples to the other embodiments.

Figure 4:
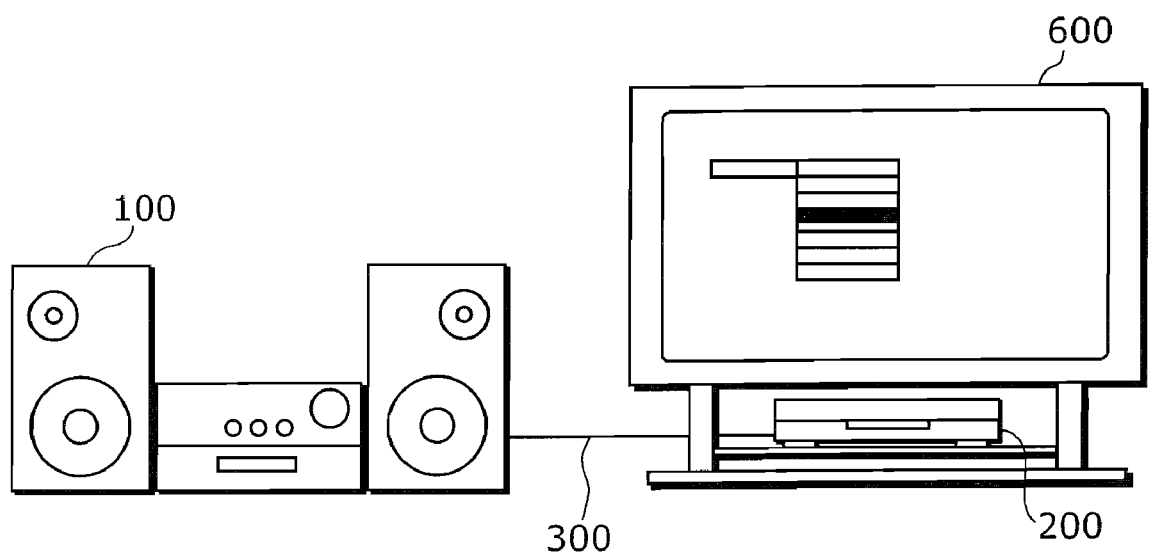
FIG. 4 is a diagram showing an overview of the structure of the electronic device system.

Next, a description is given of a concrete example. FIG. 4 is a schematic diagram for describing a concrete example of the electronic device system according to the present embodiment. This concrete example assumes that the first electronic device 100 is an audio system, so-called a minicomponent stereo, equipped with a CD player, a surround-sound amplifier, and a speaker, that the second electronic device 200 is a DVD player capable of recording and playing video/audio information, and that the first electronic device 100 and the second electronic device 200 are connected via the wired network 300 that uses an Internet protocol. It also assumes that the output destination of sound from the second electronic device 200 is the first electronic device 100, and an output of the second electronic device 200 is connected to an external display 600, onto which video or the like is displayed.

First, when the first electronic device 100 and second electronic device 200 are powered on, the first electronic device 100 recognizes that a connection is established with the second electronic device 200, and outputs, to the second electronic device 200, the first manipulation item information stored in the first manipulation item information storage unit 106. In the second electronic device 200, the second manipulation item information receiving unit 209 receives the first manipulation item information, and the second manipulation item information accumulation unit 210 stores the received first manipulation item information into the second manipulation item information storage unit 202. The first electronic device 100 also sends, to the second electronic device 200, the address information of the self electronic device together with the identification information of the self electronic device, and the second electronic device 200 stores, into the second manipulation item information storage unit 202, the received identification information and address information of the first electronic device 100 in association with each other.

FIG. 5 is a diagram showing the data structure of the first manipulation item information stored in the first manipulation item information storage unit 106 of the first electronic device 100. The present example assumes that one or more pieces of first manipulation item information are stored in one file. In this data, information in between a start tag (word bracketed by < >) and an end tag (word bracketed by </>) of "item" corresponds to one piece of first manipulation item information. Information in between a start tag and an end tag is hereinafter referred to as an "element". An element of "item name", which is a display name displayed as a menu item in the manipulation menu, corresponds to item information. An element of "action name", which is the name of an action which the first electronic device 100 is caused to execute, corresponds to operation instruction information. An element of "target ID" is identification information to identify a device which is caused to perform an action, and the identification information of the first electronic device 100, "CB01", is set here.

FIG. 6 is a diagram showing an electronic device information management table stored in the second manipulation item information storage unit 202 of the second electronic device 200. The electronic device information management table has attributes of "target ID" and "device address information". "Target ID", which is the identification information of an electronic device, corresponds to "target ID" shown in FIG. 5. "Device address information" is information indicating a network address of the electronic device corresponding to the target ID, and is assumed to be an IP address here. Here, "CB01", which is the identification information of the first electronic device 100, and "192. 168. 1. 25", which is the IP address of the first electronic device 100, are stored in the single record.

When the user gives, to the second electronic device 200, an instruction to output a manipulation menu by manipulating a remote control device or the like, the second electronic device 200 displays, on the display 600, a manipulation menu 70 for manipulating the second electronic device 200, according to the instruction as shown in FIG. 7. The structure for displaying a manipulation menu used for manipulating the self electronic device, the structure for generating an event or the like that causes the self electronic device to perform a predetermined process by selecting a menu item in the manipulation menu, and processes or the like executed in these structures are known techniques, and thus their descriptions are not given here.

Then, when the user selects a menu item 71 "play" in the manipulation menu 70 by manipulating a remote control device or the like, the following events occur in the second electronic device 200: an event for executing a process of playing a DVD disc; and an event for executing a process of displaying the manipulation menu of the first electronic device 100 as a submenu of the manipulation menu 70.

Then, based on the event for executing the process of playing a DVD disc, a process of playing a DVD disc is executed in the second electronic device 200.

Furthermore, based on the event for executing a process of displaying the manipulation menu of the first electronic device 100 as a submenu of the manipulation menu 70, the processes described below are executed.

First, the manipulation menu display preparation unit 204 judges whether or not the first manipulation item information used to display the manipulation menu of the first electronic device 100 is stored in the second manipulation item information storage unit 202. Here, as described above, the first manipulation item information is stored, and thus a result of the judgment to be obtained is "stored".

The state inquiry information sending unit 208 sends state inquiry information to the first electronic device 100.

When the state inquiry information receiving unit 104 of the first electronic device 100 receives the state inquiry information from the second electronic device 200, the state information sending unit 105 obtains state information of the first electronic device 100. Here, suppose that the first electronic device 100 is in a power-on state, that it does not perform a process of outputting sound or the like, and thus that the state information indicates "powered on". Then, the state information "powered on" is sent to the second electronic device 200.

The state information obtainment unit 203 of the second electronic device 200 obtains the state information "powered on" sent from the first electronic device 100.

Figures 8, 9:
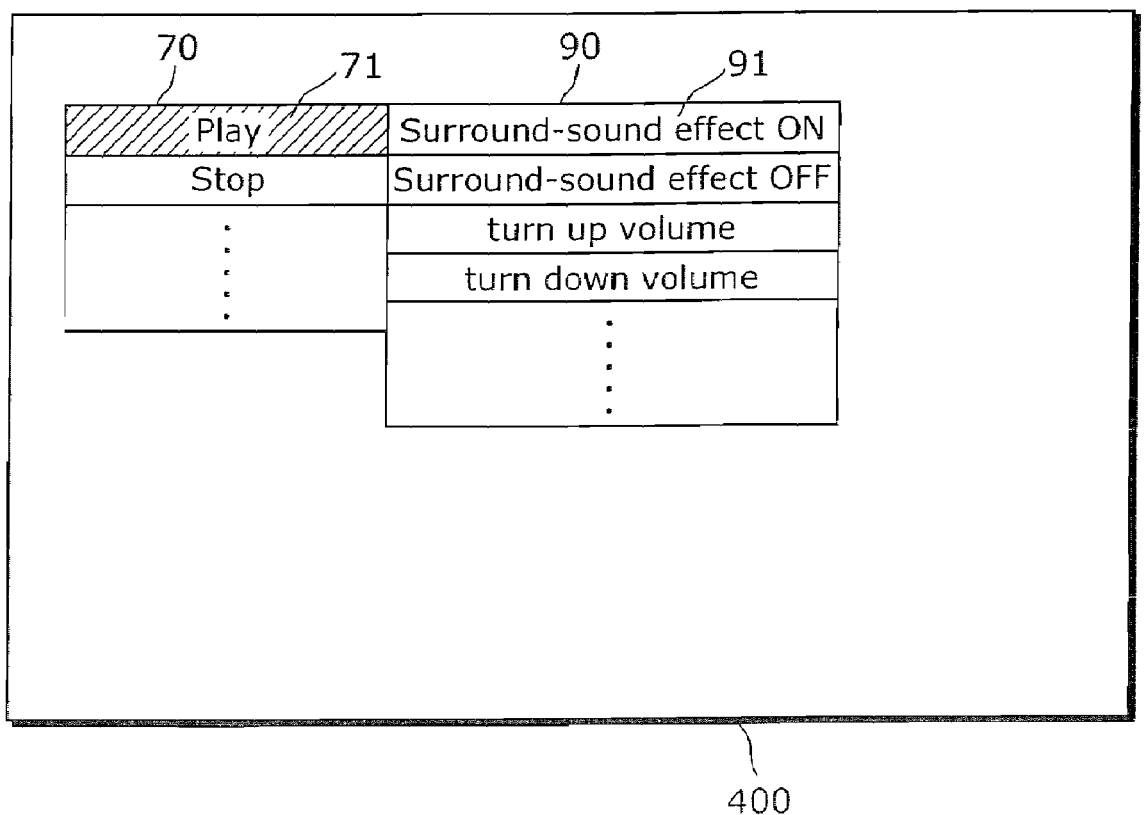
FIG. 8 is a diagram showing a menu display judgment table of the electronic device system.
FIG. 9 is a diagram showing a display example of the electronic device system.

FIG. 8 is a menu display judgment table indicating a relationship between each state information and information indicating whether or not a menu display based on the first manipulation item information should be performed. The menu display judgment table has attributes of "state information" and "judgment result". "State information" corresponds to state information obtained by the state information obtainment unit 203. "Judgment result" is an attribute indicating the result of a judgment of whether or not to display a manipulation menu based on the first manipulation item information. In "Judgment result", an attribute value "display" indicates that the result of a judgment is that the manipulation menu should be displayed, whereas an attribute value "not display" indicates that the result of a judgment is that the manipulation menu should not be displayed. This menu display judgment table is stored in a memory or the like not illustrated in the drawing.

The manipulation menu display preparation unit 204 searches the menu display judgment table shown in FIG. 8 for a record having an attribute value that matches the state information "powered on" obtained by the state information obtainment unit 203, and obtains the attribute value, included in such record, for "judgment result". Here, the attribute value "display" is obtained.

The manipulation menu display preparation unit 204 judges that the display of the manipulation menu is possible, based on the attribute value "display". Then, based on the first manipulation item information, shown in FIG. 5, stored in the second manipulation item information storage unit 202, the manipulation menu display preparation unit 204 displays, as a submenu of the menu item 71 "play", a manipulation menu 90 as shown in FIG. 9. The process performed by the manipulation menu display preparation unit 204 of constructing a manipulation menu for display based on the first manipulation item information is realized by use of a style file such as model information. Such a technique of constructing a manipulation menu is a known technique, and thus its description is not given here. Note that the manipulation menu may be displayed in any structure or in any form. For example, the manipulation menu may be displayed as a menu having a hierarchical structure. Alternatively, all menu items in the manipulation menu may be displayed only in text form, or may be displayed in the form of buttons customized by the user.

When the user selects a menu item 91 "turn up volume" in the manipulation menu 90, by manipulating a remote control device or the like, the second operation instruction information obtainment unit 206 obtains operation instruction information intended for the first operation unit 101 corresponding to the selected menu item 91, from among pieces of first manipulation item information stored in the second manipulation item information storage unit 202. Here, the second operation instruction information obtainment unit 206 obtains "volume_UP" which is an element of "action name" of the first manipulation item information whose element of "item name" is "turn up volume". The second operation instruction information obtainment unit 206 also obtains "CB01", which is an element of "target ID".

Then, the second operation instruction information sending unit 207 obtains, from the electronic device information management table shown in FIG. 6, "192. 168. 1. 25", which is an attribute value of "device address information" of a record whose "target ID" is "CB01", and sends "volume_UP" to the first electronic device 100, using this IP address. The first control unit 102 of the first electronic device 100 controls the first operation unit 101 based on the operation instruction information "volume_UP", so that the volume is turned up.

As described above, in the case where a state of the first electronic device 100 is "powered on", a menu for manipulating the first electronic device 100 to which sound from the second electronic device 200 is outputted is displayed, in response to the selection of the menu item "play" of the second electronic device 200. This makes it possible for the user to control the volume or the like of sound outputted from the first electronic device 100, at the time of reproducing a content or the like by the second electronic device 200.

Here, consider the case where the first electronic device 100 is playing a CD or the like at a point in time when the menu item 71 "play" of the second electronic device 200 is selected. In this case, the state information sending unit 105 of the first electronic device 100 detects that a play operation is going on in the first electronic device 100, obtains state information "operation in progress", and sends it to the second electronic device 200. The obtainment of state information can be realized, for example, by: having in advance a conversion table from which state information "operation in progress" can be obtained, in the case where a process to be executed by the first electronic device 100 is a process such as playback and forward; obtaining a process being executed by the first electronic device 100, here playback; and converting such process using the above conversion table. The state information obtainment unit 203 obtains the state information "operation in progress", and the manipulation menu display preparation unit 204 obtains a judgment result "not display" from the menu display judgment table shown in FIG. 8, based on the state information "operation in progress". Based on this judgment result, the manipulation menu display preparation unit 204 does not display a manipulation menu that is based on the first manipulation item information, i.e., a submenu.

As described above, in the case where the first electronic device 100 is performing some sort of operation, and it is not appropriate to manipulate the first electronic device 100 from the second electronic device 200, it is possible not to display a manipulation menu that is based on the first manipulation item information.

Furthermore, consider the case where the first electronic device 100 is powered off at a point in time when the menu item 71 "play" of the second electronic device 200 is selected. In this case, the first electronic device 100 cannot send state information in response to the sending of state inquiry information by the state inquiry information sending unit 208. As a result, the state information obtainment unit 203 judges that it is a time-out after waiting for receiving the state information for a certain period of time. Then, the state information obtainment unit 203 obtains state information "powered off" indicating that the first electronic device 100 is in a power-off state. The manipulation menu display preparation unit 204 obtains a judgment result "not display" from the menu display judgment table shown in FIG. 8, based on such state information "powered off". Based on this judgment result, the manipulation menu display preparation unit 204 does not display a manipulation menu that is based on the first manipulation item information, i.e., a submenu.

As described above, in the case where state information cannot be obtained from the first electronic device 100, it is possible not to display a manipulation menu that is based on the first manipulation item information, judging that the first electronic device 100 is in a state not ready to be manipulated due to such reasons as that it is in a power-off state.

As described above, according to the present embodiment, it is possible to change a manipulation menu for manipulating the first electronic device 100 to be displayed in the second electronic device 200, depending on a state of the first electronic device 100. As a result, it becomes possible to selectively display a necessary manipulation menu depending on a state of the first electronic device 100, and thus to improve the operability of a menu by not displaying unnecessary menu items.

Note that although the present embodiment has been described by taking, as an example, the case where the manipulation menu of the first electronic device 100 is displayed as a submenu of the manipulation menu of the second electronic device 200, the present invention is also applicable to the cases such as where the manipulation menu of the first electronic device 100 is displayed singly, and where the manipulation menus of the first electronic device 100 and second electronic device 200 are displayed concurrently in a merged form. This also applies to the other embodiments.

Furthermore, although a manipulation menu is displayed based on the first manipulation item information obtained from the first electronic device 100 in the present embodiment, the second manipulation item information storage unit 202 may store, in advance, the first manipulation item information of the first electronic device 100. In this case, a higher processing speed is achieved for menu display since a process of obtaining the first manipulation item information is not necessary. Furthermore, it is possible to omit the first manipulation item information storage unit 106, first manipulation item information sending unit 107, second manipulation item information receiving unit 209, second manipulation item information accumulation unit 210, and the like. This also applies to the other embodiments.

Note that although the present embodiment has been described for the case where the menu of the first electronic device 100 is displayed in the second electronic device 200, the present invention is also applicable to the case where plural first electronic devices whose respective first operation units operate differently or plural first electronic devices whose respective first operation units operate in the same manner, for example, is connected to the second electronic device 200. For example, the present invention can also be carried out by the second manipulation item information storage unit 202 storing the respective pieces of first manipulation item information or the like of plural first electronic devices, the state information obtainment unit 203 obtaining state information of each of the first electronic devices, and the manipulation menu display preparation unit 204 displaying the manipulation menu of each of the first electronic devices according to each of such state information. This also applies to the other embodiments.

Note that in the present embodiment, in the case where determination of whether or not to display a manipulation menu for manipulating the first electronic device 100 is made according only to whether the first electronic device 100 is powered on or off, or according to a state indicating whether or not a connection with the first electronic device 100 is established, it is not necessary for the first electronic device 100 to include a unit or the like for obtaining the state information of the self electronic device. This also applies to the other embodiments.

Second Embodiment

Figure 10:
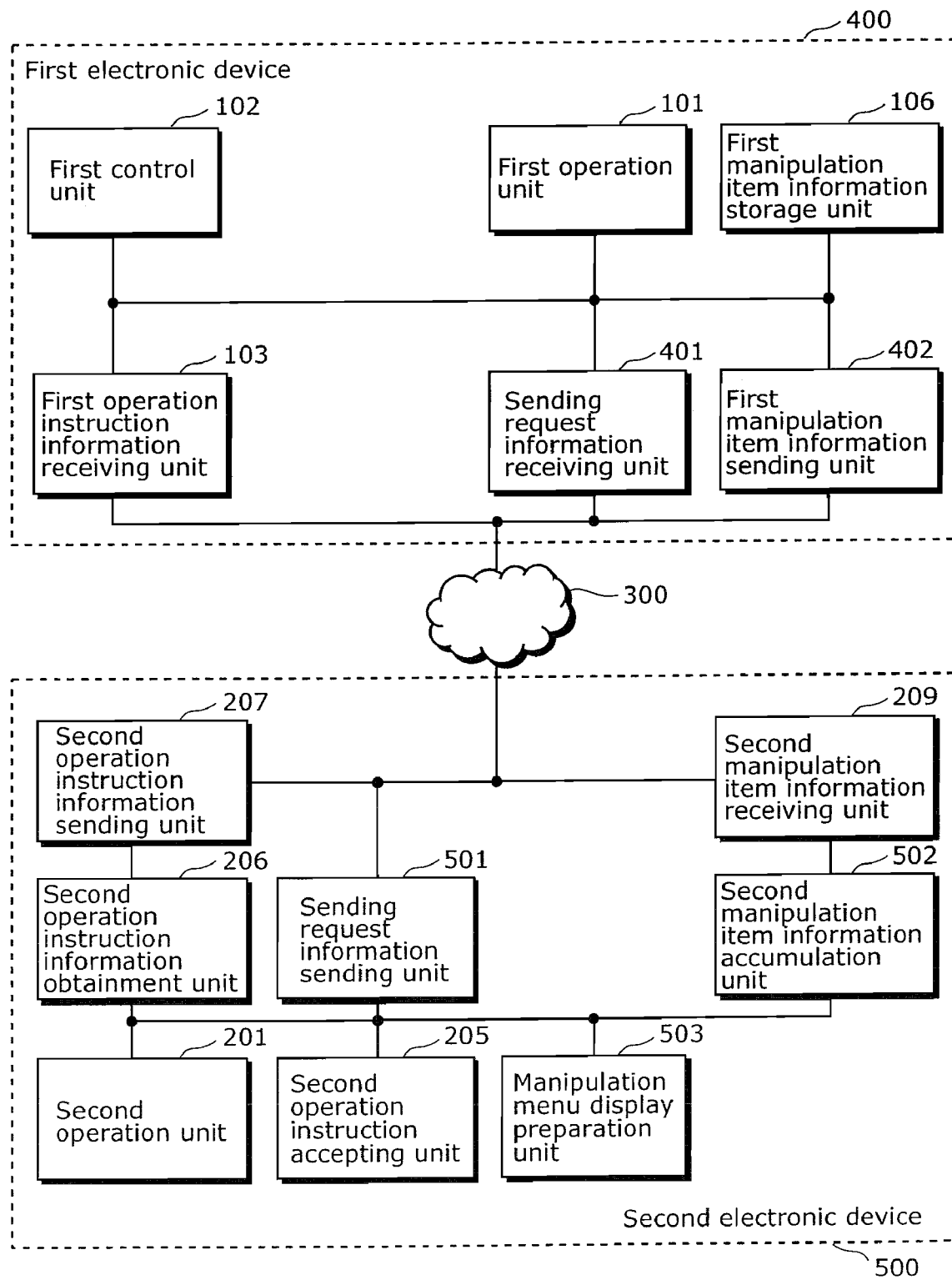
FIG. 10 is a block diagram showing the structure of an electronic device system according to a second embodiment of the present invention.

FIG. 10 is a block diagram showing the structure of an electronic device system according to the present embodiment. The electronic device system according to the present embodiment is a system in which the first electronic device 400 judges whether or not to send the first manipulation item information, depending on a state of its own in the electronic device system of the first embodiment. The electronic device system according to the present embodiment includes a first electronic device 400 and a second electronic device 500. The first electronic device 400 and the second electronic device 500 are connected with each other via the network 300. The network 300 is the same as the one in the first embodiment, and thus its description is not given here.

The first electronic device 400 is an example of an electronic device connected to the audio-video processing apparatus of the present invention. In the present embodiment, the first electronic device 400 includes a first manipulation item information sending unit 402, instead of the first manipulation item information sending unit 107 included in the first electronic device 100 described in the first embodiment, and includes a sending request information receiving unit 401 instead of the state inquiry information receiving unit 104 and state information sending unit 105 included in the first electronic device 100 described in the first embodiment. The other components are the same as those of the first embodiment, and thus their descriptions are not given.

The second electronic device 500 is an example of the audio-video processing apparatus of the present invention. In the present embodiment, the second electronic device 500 includes a sending request information sending unit 501, a second manipulation item information accumulation unit 502, and a manipulation menu display preparation unit 503 instead of the second manipulation item information storage unit 202, state information obtainment unit 203, and state inquiry information sending unit 208, respectively, that are included in the second electronic device 200 described in the first embodiment.

The sending request information sending unit 501 sends, to the first electronic device 400, sending request information for requesting for the sending of the first manipulation item information. The sending request information may be any information, and thus it may be event information or a command for activating a program or the like for causing the first electronic device 400 to obtain and send the first manipulation item information, or may be a program or the like for causing the first electronic device 400 to execute these processes. Furthermore, the sending request information may include address information, such as an IP address, for identifying a position or the like of the second electronic device 500, or may include identification information, such as a MAC address and a serial number, for identifying the second electronic device 500. Furthermore, the sending request information sending unit 501 may send sending request information at any timing or in response to any event information. For example, the sending request information sending unit 501 may send sending request information on a regular or irregular basis, or may send sending request information in response to an instruction or the like from another processing unit in the second electronic device 500. The present embodiment is described for the case where the sending request information sending unit 501 sends sending request information immediately before the manipulation menu display preparation unit 503 displays a manipulation menu. The reason for sending sending request information immediately before the manipulation menu display preparation unit 503 displays a manipulation menu is that it is preferable in judging, at the time of manipulation menu display, whether or not the first electronic device 400 is in a state of being able to send sending request information. Note that the expression "immediately before" covers the case where the sending of sending request information precedes the display of a manipulation menu to some extent. The sending request information sending unit 501 may or may not include a sending device, such as a modem and a network, for sending information. The sending request information sending unit 501 may be implemented as hardware or as software, such as a driver, for driving the sending device. The sending request information sending unit 501 may be implemented as: a communication means/device such as a LAN; an infrared communication; a short-range wireless communication means/device such as Bluetooth (registered trademark); an e-mail sending means/device; or the like. The sending request information sending unit 501 may also be implemented as a wireless or wired broadcasting means/device.

The sending request information receiving unit 401 receives sending request information from the second electronic device 500. The sending request information receiving unit 401 may or may not include a receiving device, such as a modem and a network, for receiving information. The sending request information receiving unit 401 may be implemented as hardware or as software, such as a driver, for driving the receiving device. The sending request information receiving unit 401 may be implemented as: a communication means/device such as a LAN; an infrared communication; a short-range wireless communication means/device such as Bluetooth (registered trademark); an e-mail sending means/device; or the like. The sending request information receiving unit 401 may also be implemented as a wireless or wired broadcasting means/device.

The first manipulation item information sending unit 402 sends the first manipulation item information to the second electronic device 500, in response to the sending request information received by the sending request information receiving unit 401. For example, the first manipulation item information sending unit 402 may execute a process of sending the first manipulation item information in response to the receiving of the sending request information by the sending request information receiving unit 401 as a trigger, or in response to a command or the like included in the sending request information. Furthermore, the first manipulation item information sending unit 402 sends the first manipulation item information depending on a state of the first electronic device 400, i.e., the self electronic device. The expression "sends the first manipulation item information depending on a state" refers to situations in which the sending of the first manipulation item information will be performed or will not be performed depending on a state of the first electronic device 400. More specifically, the first manipulation item information sending unit 402 obtains, from the self electronic device, information that is the same as state information described in the first embodiment at the time of sending the first manipulation item information in response to sending request information, and judges whether or not to send the first manipulation item information based on such obtained state information. The process of making this judgment may be any process. For example, this process may be the same as the judgment process, performed by the manipulation menu display preparation unit 204 described in the first embodiment, of judging whether or not to display the manipulation menu. In this case, for example, the first manipulation item information 402 judges that the first manipulation item information should be sent instead of making a judgment "display", and judges that the first manipulation item information should not be sent instead of making a judgment "not display". The first manipulation item information sending unit 402 may send sending request information only to the second electronic device 500 based on information or the like indicating an address included in the sending request information or by means/device of multicast communication, broadcast communication, or any other methods. The first manipulation item information sending unit 402 may or may not include a sending device, such as a modem and a network, for sending information. The first manipulation item information sending unit 402 may be implemented as hardware or as software, such as a driver, for driving the sending device. The first manipulation item information sending unit 402 may be implemented as: a communication means/device such as a LAN; an infrared communication; a short-range wireless communication means/device such as Bluetooth (registered trademark); an e-mail sending means/device; or the like. The first manipulation item information sending unit 402 may also be implemented as a wireless or wired broadcasting means/device. Furthermore, the first manipulation item information sending unit 402 may include an MPU, a memory, and the like for executing, by software, processes or the like of judging whether or not to send the first manipulation item information, or may include dedicated hardware for executing such processes.

The second manipulation item information accumulation unit 502 is the same as the second manipulation item information accumulation unit 210 of the first embodiment except for that the second manipulation item information accumulation unit 502 accumulates the first manipulation item information received by the second manipulation item information receiving unit 209 into a storage medium such as a memory not illustrated in the drawing, and thus its description is not given here. Note that the second manipulation item information accumulation unit 502 may be omitted in the case where the first manipulation item information received by the second manipulation item information receiving unit 209 is temporarily stored in a storage medium such as a memory.

The manipulation menu display preparation unit 503 displays a manipulation menu based on the first manipulation item information received by the second manipulation item information receiving unit 209, in the case where the second manipulation item information receiving unit 209 receives the first manipulation item information. More specifically, the manipulation menu display preparation unit 503 judges whether or not the second manipulation item information receiving unit 209 has received the first manipulation item information after a point in time when an instruction to display a manipulation menu based on the first manipulation item information is received. In the case where the second manipulation item information receiving unit 209 has received the first manipulation item information, the manipulation menu display preparation unit 503 displays a manipulation menu based on the first manipulation item information accumulated in a memory or the like by the second manipulation item information accumulation unit 502. Whereas in the case where the second manipulation item information receiving unit 209 could not receive the first manipulation item information, the manipulation menu display preparation unit 503 does not display a manipulation menu based on the first manipulation item information. Note that the manipulation menu display preparation unit 503 may judge whether or not the first manipulation item information has been received within a certain period of time after an instruction to display a manipulation menu is accepted. Such "certain period of time" may be set in any way. Usually, in the case where the first electronic device 400 operates normally and a communication between the first electronic device 400 and the second electronic device 500 functions normally, a "certain period of time" is set as the time that is deemed sufficient to receive a corresponding first manipulation item information after accepting an instruction to display a manipulation menu from the first electronic device 400. The manipulation menu display preparation unit 503 may also judge whether or not the second manipulation item information receiving unit 209 has received the first manipulation item information after the sending request information sending unit 501 sends sending request information. Note that in the case where the second manipulation item information accumulation unit 502 is omitted, the manipulation menu display preparation unit 503 may display a manipulation menu based on the first manipulation item information accumulated in a memory or the like by the second manipulation item information receiving unit 209. The other structures are the same as those of the manipulation menu display preparation unit 204 in the first embodiment except for the structure used to display a manipulation menu depending on state information, and thus their descriptions are not given here.

Figure 11:
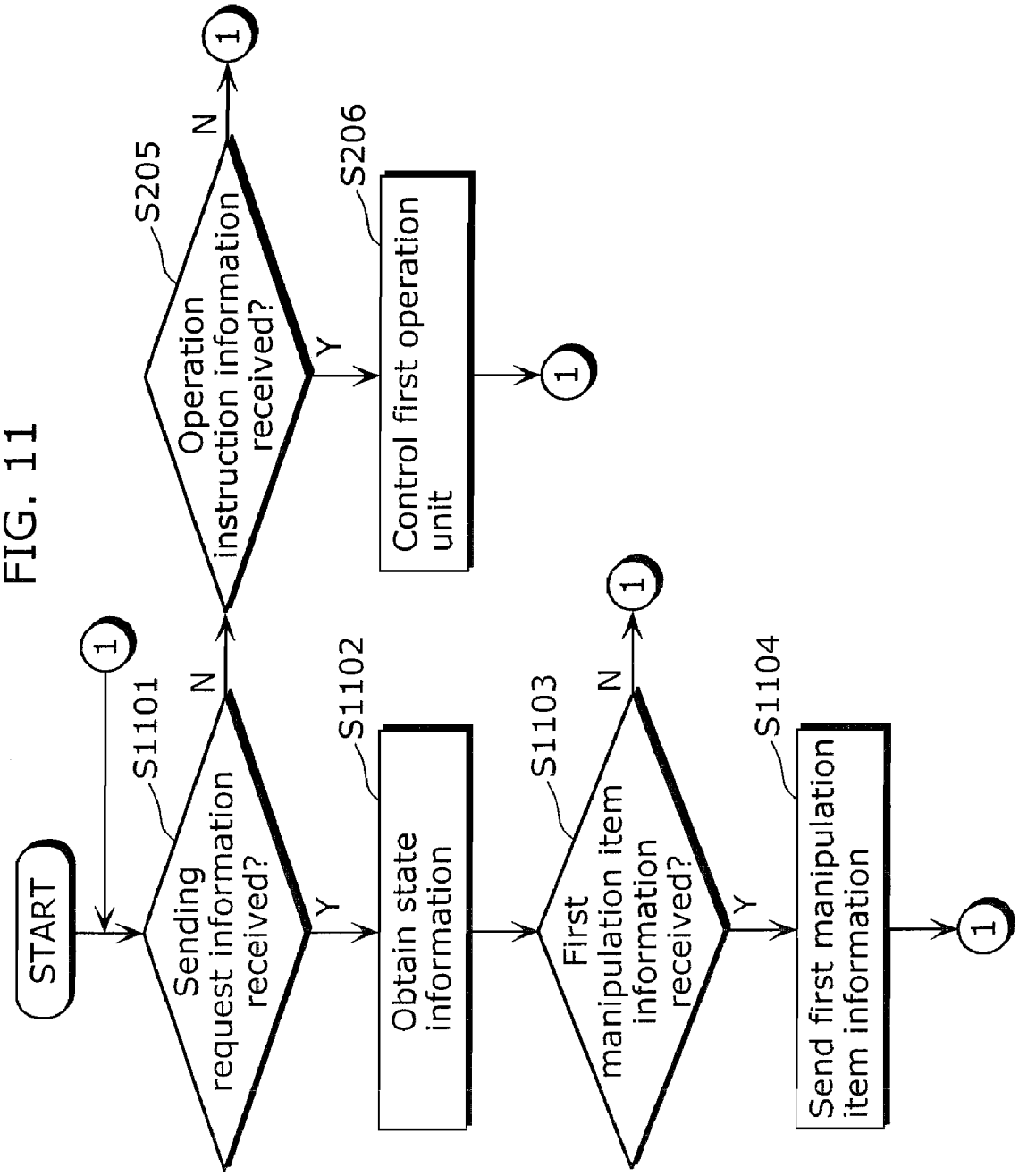
FIG. 11 is a flowchart for describing an operation performed in the electronic device system.

Next, referring to the flowchart shown in FIG. 11, the operation of the first electronic device 400 is described. Note that in FIG. 11, the same reference numbers as those shown in FIG. 2 are the same or equivalent to the process steps shown in FIG. 2, and thus their descriptions are not given.

(Step S1101) The sending request information receiving unit 401 judges whether or not sending request information has been received from the second electronic device 500. In the case where the judgment is YES, the process proceeds to Step S1102, whereas in the case where the judgment is NO, the process proceeds to Step S205.

(Step S1102) The first manipulation item information sending unit 402 obtains state information that is information indicating a state of the first electronic device 400.

(Step S1103) The first manipulation item information sending unit 402 judges whether or not to send the first manipulation item information, based on the state information received in Step S1102. In the case where the judgment is YES, the process proceeds to Step S1104, whereas in the case where the judgment is NO, the process returns to Step S1101.

(Step S1104) The first manipulation item information sending unit 402 obtains the first manipulation item information from the first manipulation item information storage unit 106, and sends it to the second electronic device 500, and then returns to Step S1101.

Note that the processing shown in the flowchart of FIG. 11 is terminated in response to the power off of the first electronic device 400 or to an interruption for terminating the processing.

Figure 12:
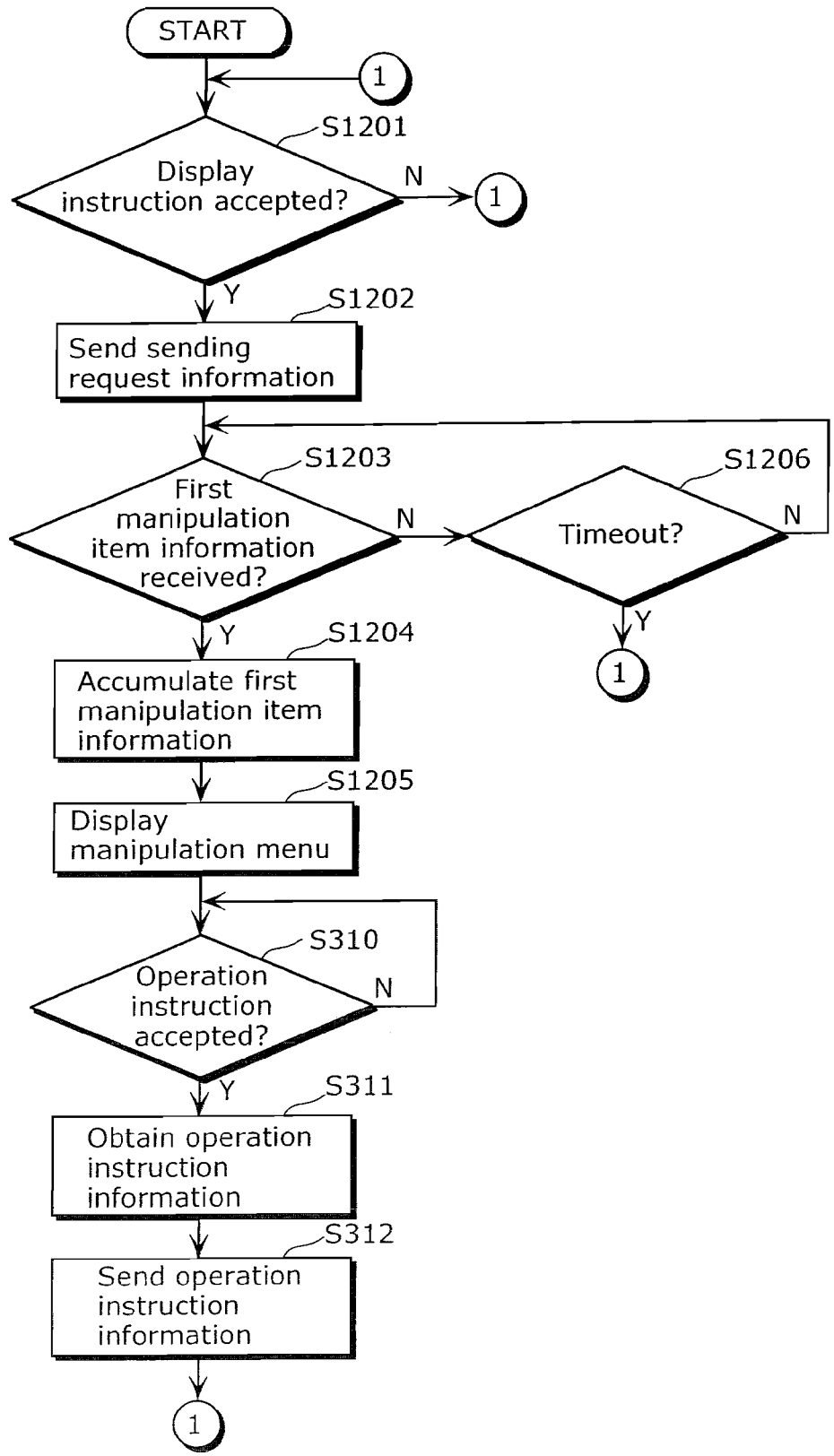
FIG. 12 is a flowchart for describing an operation performed in the electronic device system.

Next, referring to the flowchart shown in FIG. 12, the operation of the second electronic device 500 is described. Note that in FIG. 12, the same reference numbers as those shown in FIG. 3 are the same or equivalent to the process steps shown in FIG. 3, and thus their descriptions are not given.

(Step S1201) The manipulation menu display preparation unit 503 judges whether or not an instruction to display a manipulation menu based on the first manipulation item information has been received. In the case where the judgment is YES, the process proceeds to Step S1202, whereas in the case where the judgment is NO, the process returns to Step S1201. Note that an instruction to display a manipulation menu may be accepted in any way. For example, an accepting unit or the like that accepts an instruction to display a manipulation menu is provided so as to accept such instruction through this accepting unit, or an instruction or the like outputted from another processing unit may be accepted.

(Step S1202) The sending request information sending unit 501 sends sending request information to the first electronic device 400.

(Step S1203) The manipulation menu display preparation unit 503 judges whether or not the second manipulation item information receiving unit 209 has received the first manipulation item information from the first electronic device 400. In the case where the judgment is YES, the process proceeds to Step S1204, whereas in the case where the judgment is NO, the process proceeds to Step S1206.

(Step S1204) The second manipulation item information accumulation unit 502 accumulates, in a memory or the like, the first manipulation item information received in the Step S1203.

(Step S1205) The manipulation menu display preparation unit 503 displays a manipulation menu based on the first manipulation item information accumulated in Step S1204, and then proceeds to Step S310.

(Step S1206) The manipulation menu display preparation unit 503 judges whether it is a time-out or not. Time-out is a pointer based on which it is judged, for example, whether or not a predetermined period of time has elapsed after the sending of sending request information. The manipulation menu display preparation unit 503 may also judge whether or not a certain period of time has elapsed after accepting an instruction to display a manipulation menu. In the case where the judgment is YES, the process proceeds to Step S1201, whereas in the case where the judgment is NO, the process returns to Step S1203.

Note that the processing shown in the flowchart of FIG. 12 is terminated in response to the power off of the second electronic device 500 or to an interruption for terminating the processing.

Next, a description is given of a concrete example of the electronic device system according to the present embodiment. The overview of this electronic device system is the same as the one described in FIG. 4 except that the first electronic device 400 is included instead of the first electronic device 100 and the second electronic device 500 is included instead of the second electronic device 200.

First, the first electronic device 400 and second electronic device 500 are powered on. When the user gives an instruction to output a manipulation menu to the second electronic device 500, by manipulating a remote control device or the like, the second electronic device 500 displays, on the display 600, a manipulation menu 70 for manipulating the second electronic device 500, according to the instruction as shown in FIG. 7.

Then, when the user selects a menu item 71 "play" in the manipulation menu 70 by manipulating a remote control device or the like, the following events occur in the second electronic device 500: an event for executing a process of playing a DVD disc; and an event for executing a process of displaying the manipulation menu of the first electronic device 400 as a submenu of the manipulation menu 70.

Then, based on the event for executing the process of playing a DVD disc, a process of playing a DVD disc is executed in the second electronic device 500.

Furthermore, based on the event for executing a process of displaying the manipulation menu of the first electronic device 400 as a submenu of the manipulation menu 70, the processes described below are executed.

First, the sending request information sending unit 501 sends sending request information to the first electronic device 400.

When the sending request information receiving unit 401 of the first electronic device 400 receives the sending request information from the second electronic device 500, the first manipulation item information sending unit 402 obtains state information of the first electronic device 400. Here, suppose that the first electronic device 400 is in a power-on state, that it does not perform a process of outputting sound or the like, and thus that the state information indicating "powered on" is obtained.

FIG. 13 is a sending judgment table indicating a relationship between each state information and whether or not to send the first manipulation item information. The sending judgment table has attributes of "state information" and "judgment result". "State information" corresponds to state information obtained by the first manipulation item information sending unit 402. "Judgment result" is an attribute indicating the result of a judgment of whether or not to send the first manipulation item information. In "judgment result", an attribute value "sending possible" indicates that the result of a judgment is that the first manipulation item information should be sent, whereas an attribute value "sending not possible" indicates that the result of a judgment is that the first manipulation item information should not be sent. This sending judgment table is stored in a memory or the like not illustrated in the drawing.

The first manipulation item information sending unit 402 searches the sending judgment table shown in FIG. 13 for a record having an attribute value that matches the obtained state information "powered on", and obtains the attribute value, included in such record, for "judgment result". Here, the attribute value "sending possible" is obtained.

The first manipulation item information sending unit 402 judges that the sending of the first manipulation item information is possible, based on the attribute value "sending possible". Then, the first manipulation item information sending unit 402 sends, to the second electronic device 500, the first manipulation item information, shown in FIG. 5, stored in the first manipulation item information storage unit 106. Note that the first manipulation item information sending unit 402 also sends, to the second electronic device 500, the identification information of the self electronic device and the address information of the self electronic device at this time.

When the second manipulation item information receiving unit 209 receives the first manipulation item information from the first electronic device 400, the second manipulation item information accumulation unit 502 accumulates the first manipulation item information in a memory or the like. At this time, the second manipulation item information receiving unit 209 also receives the identification information and address information of the first electronic device 400, and accumulates these pieces of information in the electronic device information management table, provided in a memory or the like, as shown in FIG. 6.

Then, based on the first manipulation item information accumulated by the second manipulation item information accumulation unit 502, the manipulation menu display preparation unit 503 displays the manipulation menu 90 as a submenu of the menu item 71 "play", as shown in FIG. 9.

The subsequent processes are the same as those described in the concrete example in the aforementioned embodiment, and thus their descriptions are not given here.

As described above, in the case where a state of the first electronic device 400 is "powered on", a menu for manipulating the first electronic device 400 to which sound from the second electronic device 500 is outputted is displayed, by the first manipulation item information of the first electronic device 400 being sent to the second electronic device 500 in response to the selection of the menu item "play" of the second electronic device 500. This makes it possible for the user to control the volume or the like of sound outputted from the first electronic device 400, at the time of reproducing a content or the like by the second electronic device 500.

Here, consider the case where the first electronic device 400 is playing a CD or the like at a point in time when the menu item 71 "play" of the second electronic device 500 is selected. In this case, the first manipulation item information sending unit 402 of the first electronic device 400 detects that a play operation is going on in the first electronic device 400, obtains state information "operation in progress", and obtains a judgment result "sending not possible" from the sending judgment table shown in FIG. 13, based on the state information "operation in progress". Based on this judgment result, the first manipulation item information sending unit 402 does not send the first manipulation item information to the second electronic device 500. As a result, the second manipulation item information receiving unit 209 does not receive the first manipulation item information, and the manipulation menu display preparation unit 503 does not display a manipulation menu, judging that the second manipulation item information receiving unit 209 has not received the first manipulation item information.

As described above, in the case where the first electronic device 400 is performing some sort of operation, and it is not appropriate to manipulate the first electronic device 400 from the second electronic device 500, the first manipulation item information sending unit 402 does not send the first manipulation item information to the second electronic device 500, so that a manipulation menu based on the first manipulation menu item is not displayed in the second electronic device 500.

Furthermore, consider the case where the first electronic device 400 is powered off at a point in time when the menu item 71 "play" of the second electronic device 500 is selected. In this case, the first electronic device 400 cannot send the first manipulation item information in response to the sending of sending request information by the sending request information sending unit 501. As a result, since the second manipulation item information receiving unit 209 does not receive the first manipulation item information within a certain period of time after an instruction to display a manipulation menu is accepted, the manipulation menu display preparation unit 503 does not display a manipulation menu based on the first manipulation item information.

As described above, in the case where state information cannot be obtained from the first electronic device 400, it is possible to avoid displaying a manipulation menu that is based on the first manipulation item information, judging that the first electronic device 400 is in a state not ready to be manipulated due to such reasons as that it is in a power-off state.

As described above, according to the present embodiment, it is possible to change a manipulation menu for manipulating the first electronic device 400 to be displayed in the second electronic device 500, depending on a state of the first electronic device 400. As a result, it becomes possible to selectively display a necessary manipulation menu depending on a state of the first electronic device 400, and thus to improve the operability of a menu by not displaying unnecessary menu items.

Furthermore, there is no need for the second electronic device 500 to perform a judgment process of judging whether or not to display a manipulation menu depending on a state of the first electronic device 400. This reduces the workload of the second electronic device 500. As a result, in the case where plural first electronic devices 400 are connected to the second electronic device 500, a process of displaying the manipulation menu of the first electronic device 400 can be performed in a decentralized manner, which makes it possible to achieve a higher processing speed and stabilized processing.

Note that in each of the above-described embodiments, processes (functions) may be realized by a single device (system) executing them in a centralized manner, or may be realized by plural devices executing them in a decentralized manner.

Furthermore, in each of the above-described embodiments, each of the components may be constructed as dedicated hardware. Components that can be implemented as software may be implemented by the execution of a program. For example, each of the components can be implemented by a program execution unit such as a CPU reading out and executing a software program stored on a storage medium such as a hard disk and a semiconductor memory.

Third Embodiment

Figure 14:
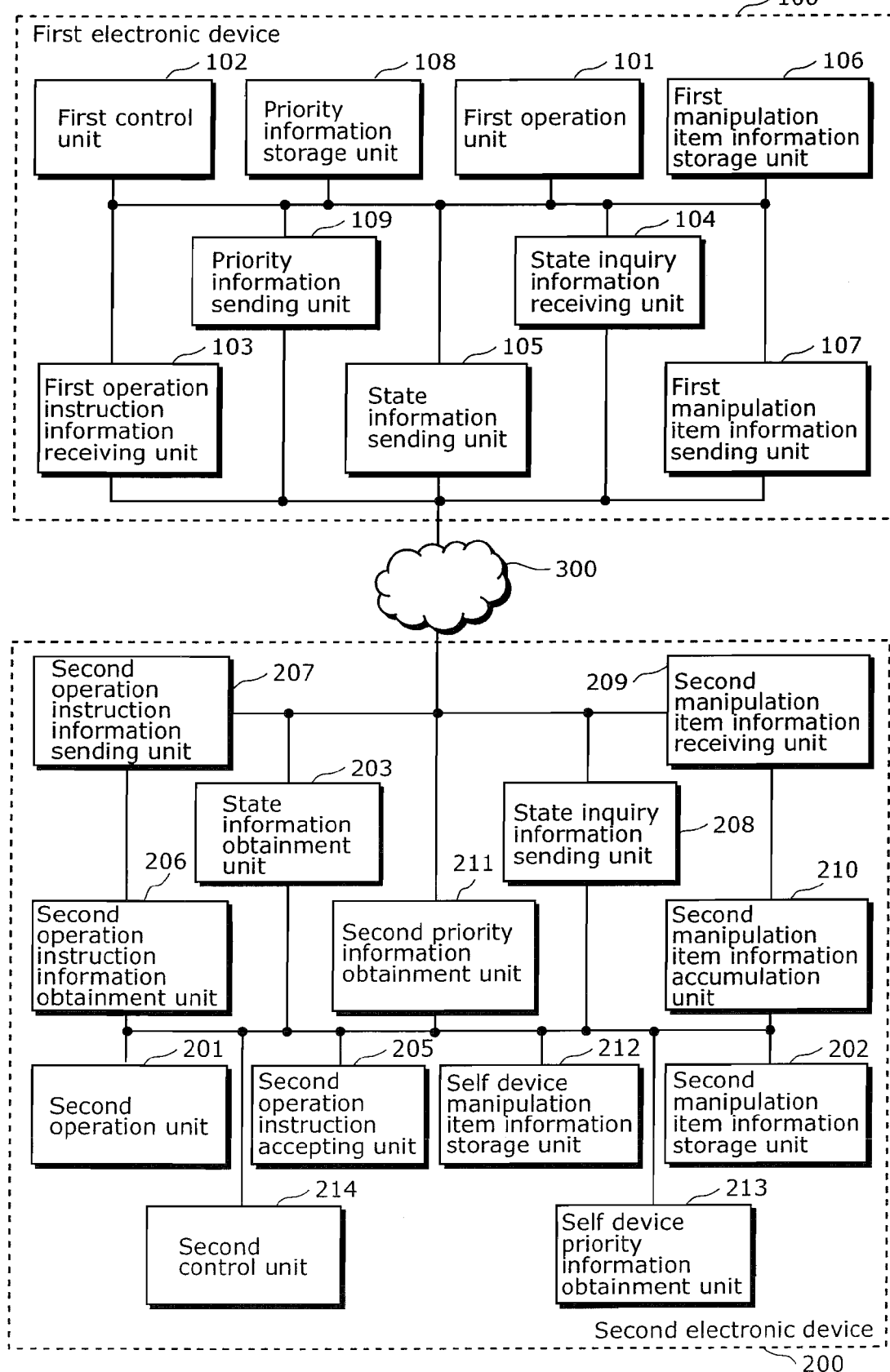
FIG. 14 is a block diagram showing the structure of an electronic device system according to a third embodiment of the present invention.

FIG. 14 is a block diagram showing the structure of an electronic device system according to the present embodiment. The electronic device system according to the present embodiment includes a first electronic device 100 and a second electronic device 200. The first electronic device 100 and the second electronic device 200 are connected via a network 300.

The first electronic device 100 is an example of an electronic device connected to the audio-video processing apparatus of the present invention. In the present embodiment, the first electronic device 100 includes a first operation unit 101, a first control unit 102, a first operation instruction information receiving unit 103, a state inquiry information receiving unit 104, a state information sending unit 105, a first manipulation item information storage unit 106, a first manipulation item information sending unit 107, a priority information storage unit 108, and a priority information sending unit 109.

The second electronic device 200 is an example of the audio-video processing apparatus of the present invention. In the present embodiment, the second electronic device 200 includes a second operation unit 201, a second manipulation item information storage unit 202, a state information obtainment unit 203, a second operation instruction accepting unit 205, a second operation instruction information obtainment unit 206, a second operation instruction information sending unit 207, a state inquiry information sending unit 208, a second manipulation item information receiving unit 209, a second manipulation item information accumulation unit 210, a second priority information obtainment unit 211, a self device manipulation item information storage unit 212, a self device priority information obtainment unit 213, and a second control unit 214.

The first electronic device 100 may be any electronic device as long as it is capable of being connected to another device via a network or the like. For example, the first electronic device 100 may be: an Audio-Video device such as a television, a DVD player, a DVD recorder, a hard disk recorder, a video tape recorder, a CD player, a tuner, a cassette tape recorder, an amplifier, a surround-sound system; a home appliance such as a refrigerator, a washing machine, an air-conditioner, and a lighting device; and facility equipment such as a water heating system.

The first operation unit 101 performs a predetermined operation based on a control signal from the first control unit 102. For example, the "predetermined operation" is an operation or the like to receive radio frequencies and display video in the case where the first electronic device 100 is a television, whereas it is an operation or the like to read a video signal and an audio signal from a DVD disc and output such signals in the case where the first electronic device 100 is a DVD player. The first operation unit 101 can be implemented, for example, as an MPU, a memory, and the like. The operation of the first operation unit 101 is implemented, for example, as software, and such software is stored in a storage medium such as a ROM. Note, however, that the operation of the first operation unit 101 may also be implemented as hardware such as a dedicated circuit.

The first operation instruction information receiving unit 103 receives, from the second electronic device 200, a first operation instruction information which is information instructing the first operation unit 101 to operate. The first operation instruction information may be any information as long as it is information instructing the first operation unit 101 to operate. The first operation instruction information may be, for example, a command and event information or the like for causing the first operation unit 101 to perform a specified action, or may be identification information or the like for specifying an action to be executed by the first operation unit 101. Furthermore, the first operation instruction information may have any data structure. The first operation instruction information receiving unit 103 may or may not include a receiving device, such as a modem and a network, for receiving information. The first operation instruction information receiving unit 103 may be implemented as hardware or as software, such as a driver, for driving the receiving device. The first operation instruction information receiving unit 103 is implemented as: a communication means/device such as a LAN; an infrared communication; a short-range wireless communication means/device such as Bluetooth (registered trademark); an e-mail sending means/device; or the like. The first operation instruction information receiving unit 103 may also be implemented as a wireless or wired broadcasting means/device.

The first control unit 102 causes the first operation unit 101 to operate based on the first operation instruction information received by the first operation instruction information receiving unit 103. More specifically, the first control unit 102 outputs, to the first operation unit 101, a control signal corresponding to the received first operation instruction information, so as to cause the first operation unit 101 to perform an operation as instructed by the first operation instruction information. The first control unit 102 can be implemented as an MPU, a memory, and the like. The operating procedures of the first control unit 102 are implemented, for example, as software, and such software is stored in a storage medium such as a ROM. Note, however, that the operating procedures of the first control unit 102 may also be implemented as hardware such as a dedicated circuit.

The state information sending unit 105 sends, to the second electronic device 200, state information that is information related to a state of the first electronic device 100. The state information may have any data structure. For example, the state information may be information indicating a state of the first electronic device 100 in terms of whether or not the first electronic device 100 is in power-on state or in power-off state, or may be information indicating whether the first electronic device 100 is in an activated state or not. Furthermore, the state information may be information indicating an operation mode such as "input mode", output mode", "display mode", "recording mode", and "play mode". The state information may further be information indicating that only a part of the functions or components of the first electronic device 100 is ready for operation, or may be information indicating such part of functions or components ready for operation.

Furthermore, the state information may be information indicating that at least a part of the first electronic device 100 is out of order, or may be information or the like indicating that the first electronic device 100 can operate normally. The state information may also be information indicating that a major hardware component of the first electronic device 100, such as the monitor and the hard disk, is in a halt state, which is so-called sleep state or suspend state.

Furthermore, the state information may be information indicating that the first electronic device 100 is already executing a certain operation or a specified operation, e.g., information indicating that the playback or recording of a DVD is being carried out in a DVD recorder, and the like. Furthermore, the state information may be information indicating whether or not there is sufficient storage capacity in the case where an electronic device is a device, such as a DVD recorder, in which information is stored. The state information may also be information indicating whether or not the first electronic device 100 is in a state ready to be manipulated.

The state information may have any data structure. The state information sending unit 105 may obtain state information of the first electronic device 100, i.e., the self electronic device, in any way.

For example, the state information sending unit 105 may obtain, as state information, the name or the like of a process being executed by the first operation unit 101, or may obtain state information by having in advance a table indicating a correspondence relationship between a process being executed by the first operation unit 101 and each state information, and by using a conversion table or the like, based on such table. The state information sending unit 105 may also obtain state information from information outputted from the first operation unit 101, or may obtain state information from control information or the like outputted from the first control unit 102 to the first operation unit 101, or the like. Furthermore, the state information sending unit 105 may also obtain state information based on a state of power supplied to the state information sending unit 105 or based on a change in a state of such a power. The state information sending unit 105 may obtain and send state information of the first electronic device 100 at any timing or in response to any trigger. For example, the state information sending unit 105 may obtain and send state information on a regular or irregular basis, or on an occasion such as when detecting a change in a state of the first electronic device 100 and when accepting information indicating that a change in a state of the first electronic device 100 has occurred. The state information sending unit 105 may also obtain and send state information in the case of receiving, from outside, an instruction to obtain state information. Furthermore, the state information sending unit 105 may obtain and send state information in response to different triggers, respectively, such as that the state information sending unit 105 obtains state information when detecting a change in a state of the first electronic device 100, and sends such obtained state information in the case of receiving, from outside, an instruction to obtain state information. Note that the present embodiment is described, in particular, for the case where the state information sending unit 105 obtains and sends state information, using, as a trigger, the receiving of state inquiry information by the below-described state inquiry information receiving unit 104. The state information sending unit 105 may or may not include a sending device, such as a modem and a network, for sending information. The state information sending unit 105 may be implemented as hardware or as software, such as a driver, for driving the sending device. The state information sending unit 105 may be implemented as: a communication means/device such as a LAN; an infrared communication; a short-range wireless communication means/device such as Bluetooth (registered trademark); an e-mail sending means/device; or the like. The state information sending unit 105 may also be implemented as a wireless or wired broadcasting means/device.

The state inquiry information receiving unit 104 receives, from the second electronic device 200, state inquiry information that is information for inquiring about a state of the first electronic device 100. The state inquiry information is, for example, a command or the like for requesting for the sending of information indicating a state. The state inquiry information receiving unit 104 may or may not include a receiving device, such as a modem and a network, for receiving information. The state inquiry information receiving unit 104 may be implemented as hardware or as software, such as a driver, for driving the receiving device. The state inquiry information receiving unit 104 may be implemented as: a communication means/device such as a LAN; an infrared communication; a short-range wireless communication means/device such as Bluetooth (registered trademark); an e-mail sending means/device; or the like. The state inquiry information receiving unit 104 may also be implemented as a wireless or wired broadcasting means/device.

The first manipulation item information storage unit 106 stores one or more pieces of first manipulation item information, each of which is information for causing the first electronic device 100 to operate. More specifically, a first manipulation item information may be any information as long as it is information that can be used for obtaining a first operation instruction information as described above. For example, the first manipulation item information includes a first operation instruction information as described above. The first manipulation item information may also include information to identify the first electronic device 100. The first manipulation item information storage unit 106 is preferably a non-volatile storage medium such as a ROM and an optical disc, but it may also be a volatile storage medium.

The first manipulation item information sending unit 107 sends, to the second electronic device 200, the first manipulation item information stored in the first manipulation item information storage unit 106. The first manipulation item information may be sent in response to any trigger or at any timing. For example, the first manipulation item information sending unit 107 may obtain, from the first manipulation item information storage unit 106, the first manipulation item information on a regular or irregular basis, and send the obtained first manipulation item information to the second electronic device 200. Furthermore, the first manipulation item information sending unit 107 may also send the first manipulation item information when the first electronic device 100 recognizes that a connection with the second electronic device 200 has been established, such as the following timings: immediately after the first electronic device 100 and the second electronic device 200 are connected; immediately after the second electronic device 200 is powered on; and immediately after the first electronic device 100 is connected to some network or electronic device. Note that the expression "immediately after" covers the case where there is some degree of delay after the point in time when a connection between the first electronic device 100 and the second electronic device 200 is recognized. Furthermore, the first manipulation item information sending unit 107 may also send the first manipulation item information to an electronic device which has been recognized as being connected with the first electronic device 100, by specifying an address or the like of such electronic device. The first manipulation item information sending unit 107 may also send the first manipulation item information by means/device of multicast transmission or broadcast transmission over a network, a wire, or the like to which the first electronic device 100 is connected. Furthermore, the first manipulation item information sending unit 107 may also send the first manipulation item information, in the case of accepting information requesting for the first manipulation item information from another electronic device or the like, to such another electronic device specified by the accepted information or to all electronic devices on the network. The first manipulation item information sending unit 107 may or may not include a sending device, such as a modem and a network, for sending information. The first manipulation item information sending unit 107 may be implemented as hardware or as software, such as a driver, for driving the sending device. The first manipulation item information sending unit 107 may be implemented as: a communication means/device such as a LAN; an infrared communication; a short-range wireless communication means/device such as Bluetooth (registered trademark); an e-mail sending means/device; or the like. The first manipulation item information sending unit 107 may also be implemented as a wireless or wired broadcasting means/device.

The priority information storage unit 108 stores priority information which is information related to the priority level of the first electronic device 100. To be more specific, a priority level indicates: which one of plural electronic devices should be preferentially selected; which one of plural electronic devices should be preferentially caused to execute a process; or the like. Usually, an electronic device with a high priority level is selected, or preferentially caused to execute a process, but the selection or the like of an electronic device according to priority level is made in any way. Priority information may be any information as long as it relates to a priority level as described above. For example, priority information may be information in which a priority level is indicated by a value such as "high" and "low", as well as "A", and "B", or may be information in which a priority level is indicated by a numerical value such as "78" and "9.3". Moreover, a value indicating a priority level may be obtained from corresponding priority information, by using each priority information as information corresponding to a value or the like indicating a priority level and using a conversion table or the like indicating a correspondence relationship between each priority level and each value. The priority information storage unit 108 may store different pieces of priority information for the respective functions of the first electronic device 100. Priority information may have any data structure. The priority information storage unit 108 is preferably a non-volatile storage medium such as a ROM and an optical disc, but it may also be a volatile storage medium.

The priority information sending unit 109 sends the priority information stored in the priority information storage unit 108. The priority information sending unit 109 may send priority information at any timing or in response to any trigger. For example, the priority information sending unit 109 may obtain, from the priority information storage unit 108, the priority information on a regular or irregular basis, and send the obtained priority information to the second electronic device 200. Furthermore, the priority information sending unit 109 may also send the priority information when the first electronic device 100 recognizes that a connection with the second electronic device 200 has been established, such as the following timings: immediately after the first electronic device 100 and the second electronic device 200 are connected; immediately after the second electronic device 200 is powered on; and immediately after the first electronic device 100 is connected to some network or electronic device. Note that the expression "immediately after" covers the case where there is some degree of delay after the point in time when a connection between the first electronic device 100 and the second electronic device 200 is recognized. Furthermore, the first electronic device 100 may also send the priority information to an electronic device which has been recognized as being connected with the first electronic device 100, by specifying an address or the like of such electronic device. The priority information sending unit 109 may also send the priority information by means/device of multicast transmission or broadcast transmission over a network, a wire, or the like to which the first electronic device 100 is connected. Furthermore, the priority information sending unit 109 may also send the priority information, in the case of accepting information requesting for the priority information from another electronic device or the like, to such another electronic device specified by the accepted information or to all electronic devices on the network. In the case where the priority information storage unit 108 stores different pieces of priority information for the respective functions of the first electronic device 100, the priority information sending unit 109 may obtain, from the priority information storage unit 108, priority information for an operation requested by the second electronic device 200, and send the obtained priority information. The priority information sending unit 109 may or may not include a sending device, such as a modem and a network, for sending information. The priority information sending unit 109 may be implemented as hardware or as software, such as a driver, for driving the sending device. The priority information sending unit 109 may be implemented as: a communication means/device such as a LAN; an infrared communication; a short-range wireless communication means/device such as Bluetooth (registered trademark); an e-mail sending means/device; or the like. The priority information sending unit 109 may also be implemented as a wireless or wired broadcasting means/device.

The second electronic device 200 may be any electronic device as long as it is capable of being connected to another device via a network or the like. For example, the second electronic device 200 may be: an Audio-Video device such as a television, a DVD player, a DVD recorder, a hard disk recorder, a video tape recorder, a CD player, a tuner, a cassette tape recorder, an amplifier, a surround-sound system; a home appliance such as a refrigerator, a washing machine, an air-conditioner, and a lighting device; and facility equipment such as a water heating system.

The second operation unit 201 performs a predetermined operation, based usually on a control signal from the second control unit 214. For example, the "predetermined operation" is an operation or the like to receive radio frequencies and display video in the case where the second electronic device 200 is a television, whereas it is an operation or the like to read a video signal and an audio signal from a DVD disc and output such signals in the case where the second electronic device 200 is a DVD player. The second operation unit 201 can be implemented, for example, as an MPU, a memory, and the like. The operation of the second operation unit 201 is implemented, for example, as software, and such software is stored in a storage medium such as a ROM. Note, however, that the operation of the second operation unit 201 may also be implemented as hardware such as a dedicated circuit.

The second control unit 214 causes the second operation unit 201 to operate based on a second operation instruction information, which is information instructing the second operation unit 201 to perform a specified operation, received by the second operation instruction information obtainment unit 206. More specifically, the second control unit 214 outputs, to the second operation unit 201, a control signal corresponding to the received second operation instruction information, so as to cause the second operation unit 201 to perform an operation as instructed by the second operation instruction information. The second operation instruction information is the same as the first operation instruction information except that the second operation instruction information is intended for instructing the second operation unit 201 to operate, and thus its description is not given. The second control unit 214 can be implemented as an MPU, a memory, and the like. The operating procedures of the second control unit 214 are implemented, for example, as software, and such software is stored in a storage medium such as a ROM. Note, however, that the operating procedures of the second control unit 214 may also be implemented as hardware such as a dedicated circuit.

The second manipulation item information receiving unit 209 receives, from the first electronic device 100, the first manipulation item information that is information for causing the first electronic device 100 to operate. The second manipulation item information receiving unit 209 may or may not include a receiving device, such as a modem and a network, for receiving information. The second manipulation item information receiving unit 209 may be implemented as hardware or as software, such as a driver, for driving the receiving device. The second manipulation item information receiving unit 209 may be implemented as: a communication means/device such as a LAN; an infrared communication; a short-range wireless communication means/device such as Bluetooth (registered trademark); an e-mail sending means/device; or the like. The second manipulation item information receiving unit 209 may also be implemented as a wireless or wired broadcasting means/device.

The second manipulation item information accumulation unit 210 accumulates, in the second manipulation item information storage unit 202, the first manipulation item information received by the second manipulation item information receiving unit 209. The second manipulation item information accumulation unit 210 can be implemented as an MPU, a memory, and the like.

The second manipulation item information storage unit 202 stores one or more pieces of first manipulation item information, each of which is information for causing the first electronic device 100 to operate. The term "storage/store" here also refers to temporary storage such as the case where data received by a receiving unit or the like is temporarily held and where data is temporarily held in a cache or the like at data processing time. The second manipulation item information storage unit 202 may previously store the first manipulation item information or may store the first manipulation item information sent from the first electronic device 100. The second manipulation item information storage unit 202 is preferably a rewritable non-volatile storage medium such as a ROM and an optical disc, but it may also be a volatile storage medium. Furthermore, in the case where there is no need to rewrite the first manipulation item information, a non-rewritable storage medium such as a ROM may be used as the second manipulation item information storage unit 202.

The state inquiry information sending unit 208 sends state inquiry information that is information for inquiring about a state of the first electronic device 100. The state inquiry information may be any information, and thus it may be event information for activating a program or the like for causing the first electronic device 100 to obtain and send state information or may be a command for causing the first electronic device 100 to execute these processes. Furthermore, the state inquiry information may include address information, such as an IP address, for identifying a position or the like of the second electronic device 200, or may include identification information, such as a MAC address and a serial number, for identifying the second electronic device 200. Furthermore, the state inquiry information sending unit 208 may send state inquiry information at any timing or in response to any event information. For example, the state inquiry information sending unit 208 may send state inquiry information on a regular or irregular basis, or may send state inquiry information in response to an instruction or the like from another processing unit in the second electronic device 200. The present embodiment is described for the case where the state inquiry information sending unit 208 sends state inquiry information immediately before the second operation instruction information obtainment unit 206 obtains at least one of the first operation instruction information and the second operation instruction information. The expression "immediately before" covers the timing that precedes, to some extent, the obtainment of at least one of the first operation instruction information and the second operation instruction information. To be more specific, such timing is a period of time from when the second operation instruction accepting unit 205 receives an operation instruction until when the second operation instruction information obtainment unit 206 obtains at least one of the first operation instruction information and the second operation instruction information. The reason for sending state inquiry information immediately before the second operation instruction information obtainment unit 206 obtains at least one of the first operation instruction information and the second operation instruction information, is that it is preferable in that state information related to the latest state of the first electronic device 100 can be obtained and used at the time when the second operation instruction information obtainment unit 206 obtains at least one of the first operation instruction information and the second operation instruction information. The state inquiry information sending unit 208 may be implemented as hardware or as software, such as a driver, for driving the sending device. The state inquiry information sending unit 208 may be implemented as: a communication means/device such as a LAN; an infrared communication; a short-range wireless communication means/device such as Bluetooth (registered trademark); an e-mail sending means/device; or the like. The state inquiry information sending unit 208 may also be implemented as a wireless or wired broadcasting means/device.

The state information obtainment unit 203 obtains state information that is information indicating a state of the first electronic device 100. The state information obtainment unit 203 may obtain state information of the first electronic device 100 in any way. For example, the state information obtainment unit 203 may obtain state information by receiving state information sent from the first electronic device 100. Furthermore, the state information obtainment unit 203 may obtain state information in the following manner: in the case where state information cannot be received within a certain period of time after the state inquiry information sending unit 208 sends state inquiry information, the state information obtainment unit 203 judges that the first electronic device 100 is not in a state ready for operation, and obtains state information indicating that "not in a state ready for operation". The state information obtainment unit 203 may also obtain state information of the first electronic device 100 from another information or the like outputted from the first electronic device 100. More specifically, in the case where the first electronic device 100 is a CD player, and is outputting a reproduced sound, the state information obtainment unit 203 judges that the first electronic device 100 is in operation, and obtains state information indicating that the first electronic device 100 is in operation. The state information obtainment unit 203 may or may not include a receiving device, such as a modem and a network, for receiving information. The state information obtainment unit 203 may be implemented as hardware or as software, such as a driver, for driving the receiving device. The state information obtainment unit 203 is implemented as: a communication means/device such as a LAN; an infrared communication; a short-range wireless communication means/device such as Bluetooth (registered trademark); an e-mail sending means/device; or the like. The state information obtainment unit 203 may also be implemented as a wireless or wired broadcasting means/device. Furthermore, the state information obtainment unit 203 may include an MPU, a memory, and the like in the case where the state information obtainment unit 203 is designed to perform a process of judging a state of the first electronic device 100 based on received information or the like.

The second priority information obtainment unit 211 is an example of the priority information obtainment unit that obtains priority information that is information related to a priority level of another electronic device. In the present embodiment, the second priority information obtainment unit 211 obtains the priority information that is information related to the priority level of the first electronic device 100. The second priority information obtainment unit 211 may obtain the priority information of the first electronic device 100 in any way. For example, the second priority information obtainment unit 211 may obtain the priority information by receiving priority information sent from the first electronic device 100, or in the case where the priority information of the first electronic device 100 is stored in advance in a memory or the like, the second priority information obtainment unit 211 may obtain such stored priority information. Furthermore, the priority information of the first electronic device 100 may be constructed so that it satisfies a predetermined relationship with respect to the priority level of the second electronic device 200, and the second priority information obtainment unit 211 may obtain such priority information. For example, the priority information of the first electronic device 100 may be set so that the priority level of an electronic device connected to the second electronic device 200 is always higher than the priority level of the second electronic device 200. In the case where there are different pieces of priority information for the respective functions of the second electronic device 200, the second priority information obtainment unit 211 may obtain priority information for a required operation of the second electronic device 200. The second priority information obtainment unit 211 may or may not include a receiving device, such as a modem and a network, for receiving information. The second priority information obtainment unit 211 may be implemented as hardware or as software, such as a driver, for driving the receiving device. The second priority information obtainment unit 211 is implemented as: a communication means/device such as a LAN; an infrared communication; a short-range wireless communication means/device such as Bluetooth (registered trademark); an e-mail sending means/device; or the like. The second priority information obtainment unit 211 may also be implemented as a wireless or wired broadcasting means/device. Furthermore, the second priority information obtainment unit 211 may include an MPU, a memory, and the like in the case of obtaining priority information stored in a memory or the like, or constructing priority information.

The self device manipulation item information storage unit 212 stores one or more pieces of second manipulation item information, each of which is information for causing the second electronic device 200 to operate. More specifically, a second manipulation item information may be any information as long as it is information that can be used for obtaining a second operation instruction information as described above. For example, the second manipulation item information includes a second operation instruction information as described above. The second manipulation item information may also include information to identify the second electronic device 200. The second operation instruction information is the same as the above-described first operation instruction information except for that these pieces of information are intended for different operation targets, and thus its details are not described here. The term "storage/store" here also refers to temporary storage such as the case where data received by a receiving unit or the like is temporarily held and where data is temporarily held in a cache or the like at data processing time. The self device manipulation item information storage unit 212 may previously store the second manipulation item information or may store the second manipulation item information sent from another electronic device, or the like. The self device manipulation item information storage unit 212 is preferably a rewritable non-volatile storage medium such as a ROM and an optical disc, but it may also be a volatile storage medium. Furthermore, in the case where there is no need to rewrite the second manipulation item information, a non-rewritable storage medium such as a ROM may be used as the self device manipulation item information storage unit 212. Furthermore, in the case where there is no need to rewrite the second manipulation item information, a non-rewritable storage medium such as a ROM may be used as the self device manipulation item information storage unit 212.

The self device priority information obtainment unit 213 obtains priority information that is information related to the priority level of the second electronic device 200. Such priority information is the same as the priority information stored in the priority information storage unit 108, and thus its description is not given here. The self device priority information obtainment unit 213 may obtain the priority information of the second electronic device 200 in any way. For example, the self device priority information obtainment unit 213 may obtain the priority information stored in a storage medium such as a memory. Furthermore, the priority information of the second electronic device 200 may be constructed based on the priority information of the first electronic device 100 obtained by the second priority information obtainment unit 211, so that its priority level is higher than the priority level of the priority information of the first electronic device 100, and the self device priority information obtainment unit 213 may obtain such constructed priority information. Furthermore, predetermined values that are set in advance may be set as the priority information of the second electronic device 200 and the priority information of the first electronic device 100. The self device priority information obtainment unit 213 can be implemented as an MPU, a memory, or the like. The operating procedures of the self device priority information obtainment unit 213 are implemented, for example, as software, and such software is stored in a storage medium such as a ROM. Note, however, that the operating procedures of the self device priority information obtainment unit 213 may also be implemented as hardware such as a dedicated circuit. Note that the priority information of the first electronic device 100 obtained by the second priority information obtainment unit 211 is hereinafter referred to also as a "first priority information", and the priority information of the second electronic device 200 obtained by the self device priority information obtainment unit 213 is hereinafter referred to also as a "second priority information".

The second operation instruction accepting unit 205 accepts an operation instruction that is an instruction to cause at least one of the first electronic device 100 and the second electronic device 200 to operate. More specifically, the second operation instruction accepting unit 205 accepts an operation instruction by a manipulation button or the like such as "play" and "stop" of the remote control device for the second electronic device 200 being manipulated or by a manipulation menu item such as "play" and "turn up volume" displayed on the display being selected. Information that is selected by the press of a hard button equipped to the second electronic device 200 may also be accepted as an operation instruction. The second operation instruction accepting unit 205 may accept an input through any input means/device such as a remote control device, a touch panel, a hard button, a ten key pad, a keyboard, and a mouse. The second operation instruction accepting unit 205 can be implemented as a device driver for input means/device such as a remote control device, a touch panel, and a hard button, or as software or the like for controlling menu screen.

The second operation instruction information obtainment unit 206 is an example of the operation instruction information obtainment unit that obtains, based on the state information and the priority information, operation instruction information related to the corresponding manipulation item information corresponding to the operation instruction. In the present embodiment, the second operation instruction information obtainment unit 206 obtains a first operation instruction information related to a first manipulation item information, stored in the second manipulation item information storage unit 202, corresponding to the operation instruction accepted by the second operation instruction accepting unit 205, based on the state information obtained by the state information obtainment unit 203 and the priority information obtained by the second priority information obtainment unit 211.

Furthermore, the second operation instruction information obtainment unit 206 obtains a second operation instruction information related to a second manipulation item information, stored in the self device manipulation item information storage unit 212, corresponding to the operation instruction accepted by the second operation instruction accepting unit 205, based on the priority information obtained by the self device priority information obtainment unit 213. More specifically, the first manipulation item information stored in the second manipulation item information storage unit 202 and the operation instruction accepted by the second operation instruction accepting unit 205 are associated with each other in advance. Information used to make this association may be stored anywhere. For example, such information may be included in a first manipulation item information. Then, in the case where the operation instruction accepted by the second operation instruction accepting unit 205 is associated with a first manipulation item information, the second operation instruction information obtainment unit 206 judges whether or not to obtain a first operation instruction information corresponding to such operation instruction, based on the state information and the first priority information. Details of this judgment process are described later. In the case of judging that the first operation instruction information should be obtained, the second operation instruction information obtainment unit 206 obtains the first operation instruction information related to a first manipulation item information associated with such operation instruction. As the first operation instruction information related to the first manipulation item information, the second operation instruction information obtainment unit 206 may obtain a first operation instruction information with any relationship with the first manipulation item information. For example, in the case where a first manipulation item information includes operation instruction information, the second operation instruction information obtainment unit 206 may obtain the operation instruction information included in the first manipulation item information. Furthermore, in the case where there is operation instruction information associated with a first manipulation item information by use of link information or the like, the second operation instruction information obtainment unit 206 may obtain such associated operation instruction information. Furthermore, operation instruction information may be constructed using one or more pieces of information included in a first manipulation item information. Similarly, the second manipulation item information stored in the self device manipulation item information storage unit 212 and the operation instruction accepted by the second operation instruction accepting unit 205 are associated with each other in advance. Information used to make this association may be stored anywhere. For example, such information may be included in a second manipulation item information. Then, in the case where the operation instruction accepted by the second operation instruction accepting unit 205 is associated with a second manipulation item information, the second operation instruction information obtainment unit 206 judges whether or not to obtain a second operation instruction information corresponding to such operation instruction, based on the second priority information. Details of this judgment process are described later. In the case of judging that the second operation instruction information should be obtained, the second operation instruction information obtainment unit 206 obtains the second operation instruction information related to a second manipulation item information associated with such operation instruction. As the second operation instruction information related to the second manipulation item information, the second operation instruction information obtainment unit 206 may obtain a second operation instruction information with any relationship with the second manipulation item information. For example, in the case where a second manipulation item information includes a second operation instruction information, the second operation instruction information obtainment unit 206 may obtain the second operation instruction information included in the second manipulation item information. Furthermore, in the case where there is a second operation instruction information associated with a second manipulation item information by use of link information or the like, the second operation instruction information obtainment unit 206 may obtain such associated operation instruction information. Furthermore, operation instruction information may be constructed using one or more pieces of information included in a second manipulation item information. The second operation instruction information obtainment unit 206 can be implemented as an MPU, a memory, and the like. The operating procedures of the second operation instruction information obtainment unit 206 for obtaining operation instruction information are implemented, for example, as software, and such software is stored in a storage medium such as a ROM. Note, however, that the operating procedures of the second operation instruction information obtainment unit 206 may also be implemented as hardware such as a dedicated circuit.

The second operation instruction information sending unit 207 sends, to the first electronic device 100, the first operation instruction information obtained by the second operation instruction information obtainment unit 206. The second operation instruction information sending unit 207 may or may not include a sending device, such as a modem and a network card, for sending information. The second operation instruction information sending unit 207 may be implemented as hardware or as software, such as a driver, for driving the sending device. The sending of the second operation instruction information sending unit 207 may be implemented as: a communication means/device such as a LAN; an infrared communication; a short-range wireless communication means/device such as Bluetooth (registered trademark); an e-mail sending means/device; or the like. The second operation instruction information sending unit 207 may also be implemented as a wireless or wired broadcasting means/device.

The network 300 may be any network as long as it is capable of allowing data sending and receiving between the first electronic device 100 and the second electronic device 200. The network 300 may be a wireless network using an IP protocol, a wired network, or the like. Furthermore, a communication via such network may be realized in the form of terrestrial broadcasting, cable television broadcasting, satellite broadcasting, or the like. The first electronic device 100 and the second electronic device 200 may be connected in any way as long as data communication is possible between these devices. For example, instead of being connected via a network, the first electronic device 100 and the second electronic device 200 may be connected via a serial bus such as an IEEE1394 serial bus and a USB serial bus.

Figure 15:
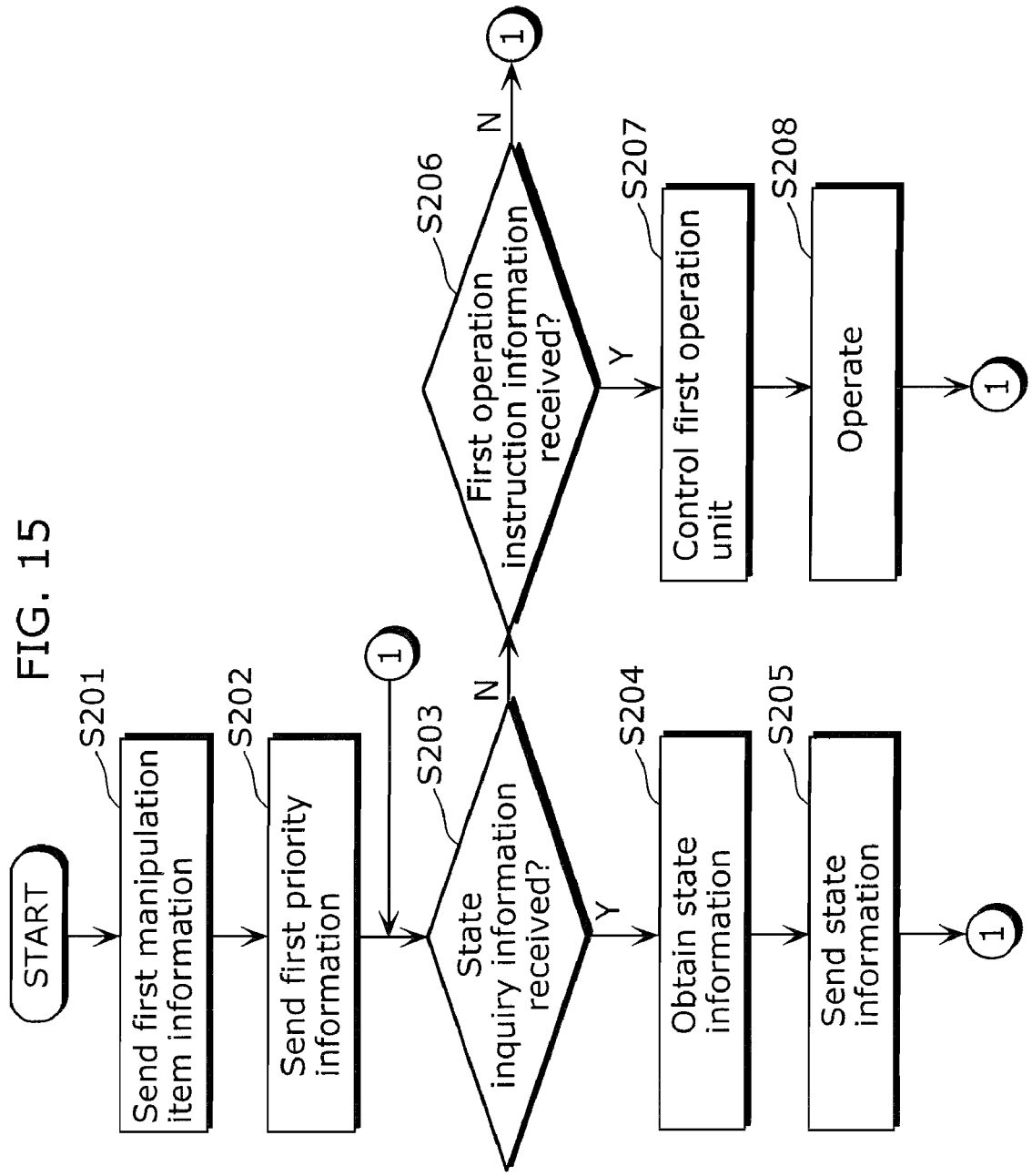
FIG. 15 is a flowchart for describing an operation performed in the electronic device system.

Next, referring to the flowchart of FIG. 15, the operation performed by the first electronic device 100 is described.

(Step S201) The first manipulation item information sending unit 107, when the first electronic device 100 is powered on, obtains the first manipulation item information from the first manipulation item information storage unit 106, and sends the first manipulation item information to another electronic device, which is the second electronic device 200 here, via the network 300. Note that the first manipulation item information is sent in response to the first electronic device 100 being powered on as a trigger here, but the first manipulation item information may be sent in response to any trigger in the present embodiment. For example, the first manipulation item information may be sent with the following as a trigger: when the first electronic device 100 recognizes that it is connected to the network 300; and in the case where the first electronic device 100 accepts a certain kind of signal outputted from the second electronic device 200.

(Step S202) The priority information sending unit 109 obtains the first priority information from the priority information storage unit 108, and sends the first priority information to another electronic device, which is the second electronic device 200 here, via the network 300. Note that the priority information sending unit 109 may send the first priority information in response to any trigger or the like in the present embodiment. For example, the first priority information may be sent with the following as a trigger: when the first electronic device 300 is powered on; and when the first electronic device 100 recognizes that it has got connected to the network 300. The first priority information may also be sent in the case where the first electronic device 100 accepts a certain kind of signal outputted from the second electronic device 200. Furthermore, the process of Step S202 may be executed as a pre-process of Step S201.

(Step S203) The state inquiry information receiving unit 104 judges whether or not state inquiry information has been received. In the case where the judgment is YES, the process proceeds to Step S204, whereas in the case where the judgment is NO, the process proceeds to Step S206.

(Step S204) The state information sending unit 105 obtains state information that is information indicating a state of the first electronic device 100.

(Step S205) The state information sending unit 105 sends, to the second electronic device 200, the state information obtained in Step S204, and returns to Step S203.

(Step S206) The first operation instruction information receiving unit 103 judges whether or not a first operation instruction information has been received. In the case where the judgment is YES, the process proceeds to Step S207, whereas in the case where the judgment is NO, the process returns to Step S203.

(Step S207) The first control unit 102 controls the first operation unit 101 so as to cause the first operation unit 101 to perform a predetermined operation, based on the first operation instruction information.

(Step S208) The first operation unit 101 performs a predetermined operation, and then returns to Step S203.

Note that the processing shown in the flowchart of FIG. 15 is terminated in response to the power off of the first electronic device 100 or to an interruption for terminating the processing.

Figure 16:
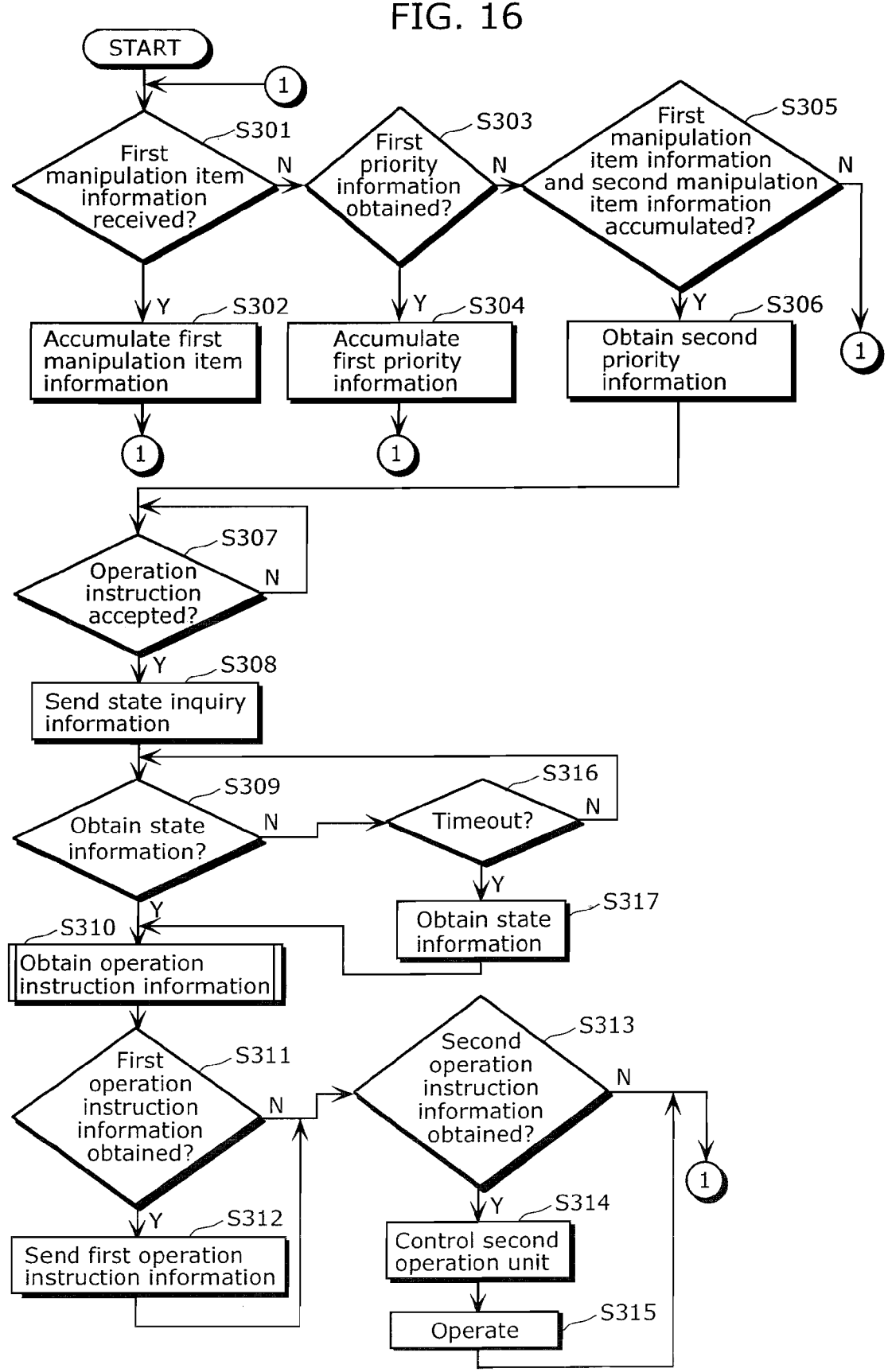
FIG. 16 is a flowchart for describing an operation performed in the electronic device system.

Next, referring to the flowchart shown in FIG. 16, the operation performed by the second electronic device 200 is described.

(Step S301) The second manipulation item information receiving unit 209 judges whether or not the first manipulation item information has been received from the first electronic device 100. In the case where the judgment is YES, the process proceeds to Step S302, whereas in the case where the judgment is NO, the process proceeds to Step S303.

(Step S302) The second manipulation item information accumulation unit 210 stores, in the second manipulation item information storage unit 202, the first manipulation item information received in Step S301, and returns to Step S301.

(Step S303) The second priority information obtainment unit 211 judges whether or not the first priority information sent by the first electronic device 100 has been obtained. In the case where the judgment is YES, the process proceeds to Step S304, whereas in the case where the judgment is NO, the process proceeds to Step S305.

(Step S304) The second priority information obtainment unit 211 accumulates the received first priority information in a memory or the like, and returns to Step S301.

(Step S305) It is judged whether or not the first manipulation item information and the first priority information are accumulated. In the case where the judgment is YES, the process proceeds to Step S306, whereas in the case where the judgment is NO, the process returns to Step S301.

(Step S306) The self device priority information obtainment unit 213 obtains the second priority information that is stored in advance in a memory or the like.

(Step S307) The second operation instruction accepting unit 205 judges whether or not an operation instruction has been accepted. In the case where the judgment is YES, the process proceeds to Step S308, whereas in the case where the judgment is NO, the process returns to Step S307.

(Step S308) The state inquiry information sending unit 208 sends state inquiry information to the first electronic device 100.

(Step S309) The state information obtainment unit 203 judges whether or not state information from the first electronic device 100 has been received. In the case where the judgment is YES, the process proceeds to Step S310, whereas in the case where the judgment is NO, the process proceeds to Step S316.

(Step S310) The second operation instruction information obtainment unit 206 performs a process of obtaining at least one of the first operation instruction information and the second operation instruction information, using the state information and the priority information. Details of this process are described later.

(Step S311) The second operation instruction information obtainment unit 206 judges whether or not the first operation instruction information is obtained in Step S310. In the case where the judgment is YES, the process proceeds to Step S312, whereas in the case where the judgment is NO, the process proceeds to Step S313.

(Step S312) The second operation instruction information sending unit 207 sends, to the first electronic device 100, the first operation instruction information obtained in Step S310, and proceeds to Step S313.

(Step S313) The second operation instruction information obtainment unit 206 judges whether or not the second operation instruction information is obtained in Step S310. In the case where the judgment is YES, the process proceeds to Step S314, whereas in the case where the judgment is NO, the process returns to Step S301.

(Step S314) The second control unit 214 controls the second operation unit 201 based on the second operation instruction information obtained in Step S313.

(Step S315) The second operation unit 201 performs a predetermined operation, and returns to Step S301.

(Step S316) The state information obtainment unit 203 judges whether it is a time-out or not. Time-out is a pointer based on which it is judged, for example, whether or not a predetermined period of time has elapsed after the sending of state inquiry information. In the case where the judgment is YES, the process proceeds to Step S317, whereas in the case where the judgment is NO, the process returns to Step S309.

(Step S317) The state information obtainment unit 203 obtains, as state information of the first electronic device 100, state information indicating, for example, that the first electronic device 100 is in a state of not being able to perform the sending and receiving of information, or that the first electronic device 100 is in a state of not ready to be manipulated from another electronic device, and proceeds to Step S310.

Note that the processing shown in the flowchart of FIG. 16 is terminated in response to the power off of the second electronic device 200 or to an interruption for terminating the processing.

Figure 17:
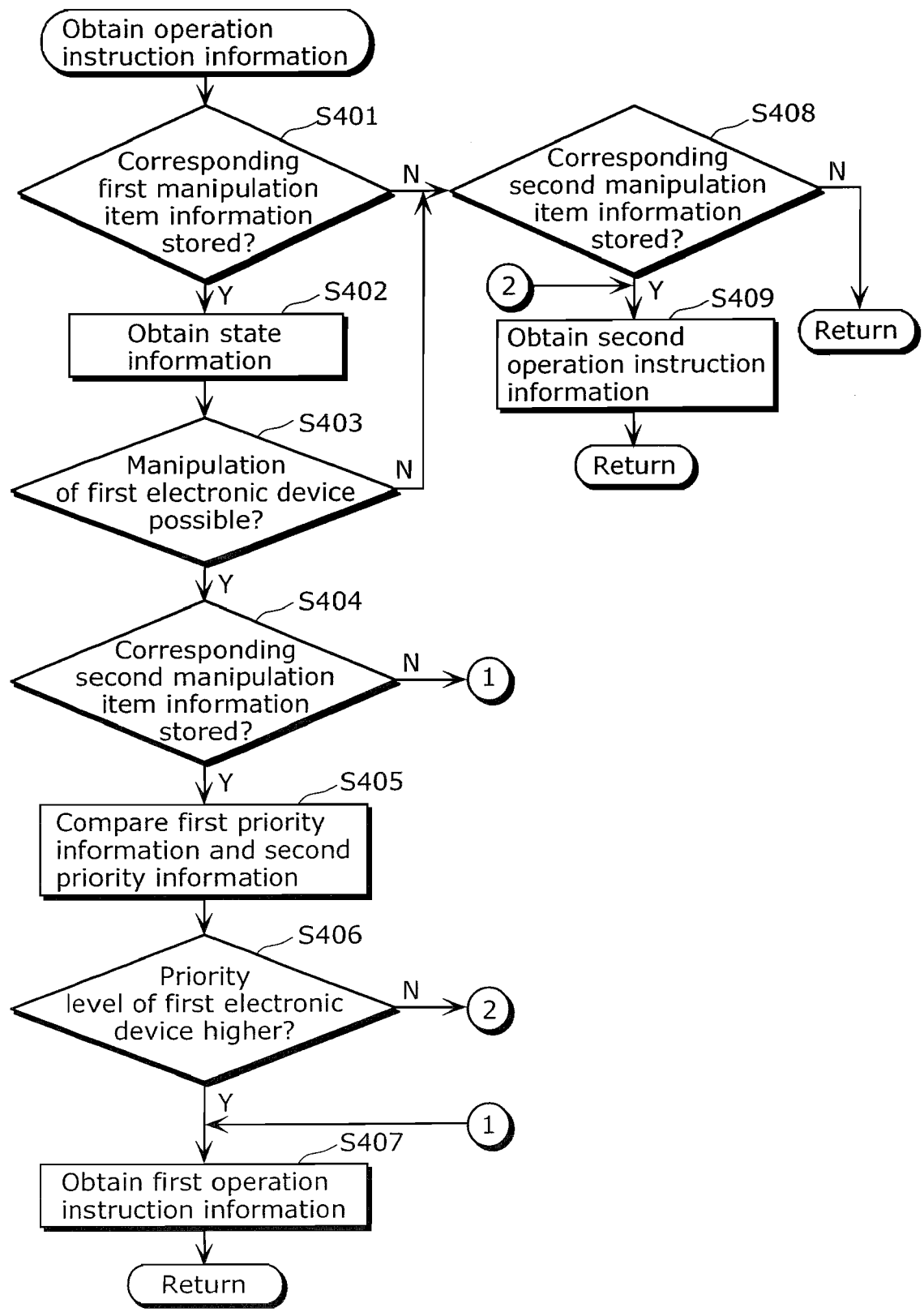
FIG. 17 is a flowchart for describing an operation performed in the electronic device system.

Next, referring to the flowchart shown in FIG. 17, a description is given of the details of a process of Step S310, shown in FIG. 16, performed by the second electronic device 200 for obtaining at least one of the first operation instruction information and the second operation instruction information, based on state information and priority information.

(Step S401) The second operation instruction information obtainment unit 206 judges whether or not the first manipulation item information corresponding to the operation instruction accepted by the second operation instruction accepting unit 205 is stored in the second manipulation item information storage unit 202. This judgment can be realized by, for example, searching for the first manipulation item information that includes information associated with such obtained operation instruction. In the case where the judgment is YES, the process proceeds to Step S402, whereas in the case where the judgment is NO, the process proceeds to Step S408.

(Step S402) The second operation instruction information obtainment unit 206 obtains the state information obtained by the state information obtainment unit 203.

(Step S403) The second operation instruction information obtainment unit 206 judges, from the state information obtained in Step S402, whether or not the first electronic device 100 is in a state ready to be manipulated from the second electronic device 200. This judgment can be realized by, for example, having in advance a table indicating a relationship between each state information and information indicating whether the manipulation of the first electronic device 100 is possible or not, and then by obtaining information, indicating whether the manipulation of the first electronic device 100 is possible or not, corresponding to the state information obtained in Step S402, by use of such table. In the case where the judgment is YES, the process proceeds to Step S404, whereas in the case where the judgment is NO, the process proceeds to Step S408.

(Step S404) The second operation instruction information obtainment unit 206 judges whether or not the second manipulation item information corresponding to the operation instruction accepted by the second operation instruction accepting unit 205 is stored in the self device manipulation item information storage unit 212. This judgment can be realized by the same process as the process of Step S401. In the case where the judgment is YES, the process proceeds to Step S405, whereas in the case where the judgment is NO, the process proceeds to Step S407.

(Step S405) The second operation instruction information obtainment unit 206 obtains the first priority information obtained by the second priority information obtainment unit 211 and the second priority information obtained by the self device priority information obtainment unit 213, and compares the first priority information and the second priority information.

(Step S406) The second operation instruction information obtainment unit 206 judges whether or not the result of the comparison made in Step S405 is that the priority level of the first electronic device 100 is high. In the case where the judgment is YES, the process proceeds to Step S407, whereas in the case where the judgment is NO, the process proceeds to Step S409. Note that the process proceeds to Step S409 in the case where the priority levels of the first electronic device 100 and the second electronic device 200 are the same in the present embodiment, but the process may proceed to Step S407 in the case where the priority levels of the first electronic device 100 and the second electronic device 200 are the same.

(Step S407) The second operation instruction information obtainment unit 206 obtains a first operation instruction information related to a first manipulation item information corresponding to the operation instruction accepted by the second operation instruction accepting unit 205. For example, in the case where the first manipulation item information corresponding to the operation instruction includes a first operation instruction information, the second operation instruction information obtainment unit 206 obtains such first operation instruction information as the first operation instruction information related to the first manipulation item information. Then, the second operation instruction information obtainment unit 206 returns the obtained first operation instruction information to the calling function.

(Step S408) The second operation instruction information obtainment unit 206 judges, as in the case of Step S405, whether or not the second manipulation item information corresponding to the operation instruction accepted in the second operation instruction accepting unit 205 is stored in the self device manipulation item information storage unit 212. In the case where the judgment is YES, the process proceeds to Step S409, whereas in the case where the judgment is NO, information indicating that neither the first operation instruction information nor the second operation instruction information was obtained, is returned to the calling function.

(Step S409) The second operation instruction information obtainment unit 206 obtains a second operation instruction information related to a second manipulation item information corresponding to the operation instruction accepted by the second operation instruction accepting unit 205. For example, in the case where the second manipulation item information corresponding to the operation instruction includes a second operation instruction information, the second operation instruction information obtainment unit 206 obtains such second operation instruction information as the second operation instruction information related to the second manipulation item information. Then, the second operation instruction information obtainment unit 206 returns the obtained second operation instruction information to the calling function.

Figure 18:
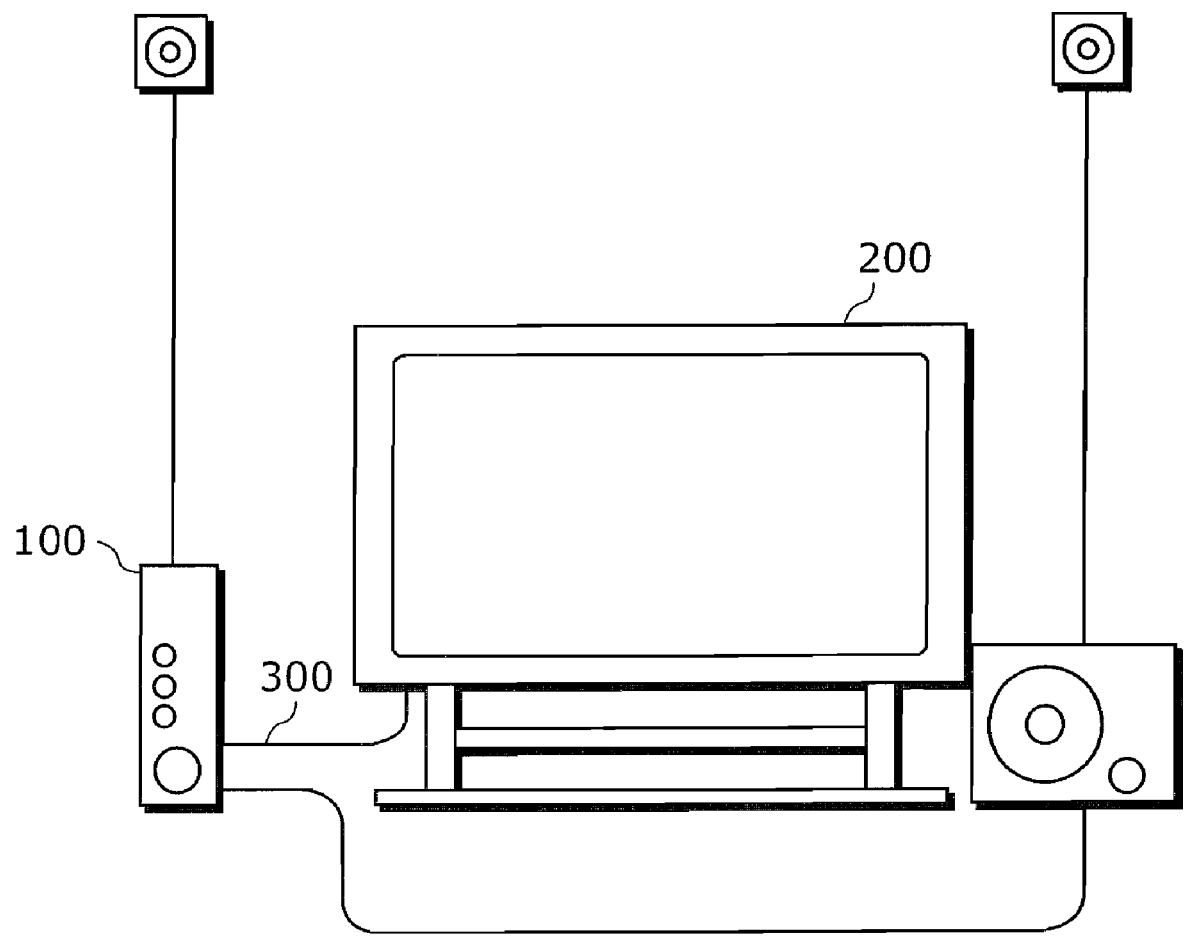
FIG. 18 is a diagram showing an overview of the structure of the electronic device system.

Next, a description is given of a concrete example. FIG. 18 is a schematic diagram for describing a concrete example of the electronic device system according to the present embodiment. This concrete example assumes that the first electronic device 100 is so-called a surround-sound system equipped with a surround-sound amplifier, a speaker, and the like, that the second electronic device 200 is a television, and that the first electronic device 100 and the second electronic device 200 are connected via the wired network 300 that uses an Internet protocol. It also assumes that sound from the second electronic device 200 can be outputted from the first electronic device 100.

First, when the first electronic device 100 and second electronic device 200 are powered on, the first electronic device 100 recognizes that a connection is established with the second electronic device 200, and outputs, to the second electronic device 200, the first manipulation item information stored in the first manipulation item information storage unit 106. In the second electronic device 200, the second manipulation item information receiving unit 209 receives the first manipulation item information, and the second manipulation item information accumulation unit 210 stores the first manipulation item information into the second manipulation item information storage unit 202. The first electronic device 100 also sends, to the second electronic device 200, the address information of the self electronic device together with the identification information of the self electronic device, and the second electronic device 200 stores, into the second manipulation item information storage unit 202, the received identification information and address information of the first electronic device 100 in association with each other.

Next, the first electronic device 100 sends, to the second electronic device 200, the first priority information stored in the priority information storage unit 108 via the network 300. The present example assumes that each priority information is indicated by a value of 10 levels from 1 to 10, and that the priority level of an electronic device is higher as its value is greater. The value of the first priority information is assumed to be "8". The second priority information obtainment unit 211 of the second electronic device 200 receives this first priority information, and stores it into a memory or the like.

FIG. 19 is a diagram showing the data structure of the first manipulation item information stored in the first manipulation item information storage unit 106 of the first electronic device 100. The present example assumes that one or more pieces of first manipulation item information are stored in one file. In this data, information in between a start tag (word bracketed by < >) and an end tag (word bracketed by </>) of "item" corresponds to one piece of first manipulation item information. Information in between a start tag and an end tag is hereinafter referred to as an "element". An element of "item name" is information associated with an operation instruction. An element of "action name", which is the name of an action which the first electronic device 100 is caused to execute, corresponds to operation instruction information, particularly to a first operation instruction information. An element of "target ID" is identification information to identify a device which is caused to perform an action, and the identification information of the first electronic device 100 "CB01" is set here.

FIG. 20 is a diagram showing an electronic device information management table stored in the second manipulation item information storage unit 202 of the second electronic device 200. The electronic device information management table has attributes of "target ID" and "device address information". "Target ID", which is the identification information of an electronic device, corresponds to "target ID" element shown in FIG. 19. "Device address information" is information indicating a network address of the electronic device corresponding to the target ID, and is assumed to be an IP address here. Here, "CB01", which is the identification information of the first electronic device 100, and "192. 168. 1. 25", which is the IP address of the first electronic device 100, are stored in the single record.

When the user gives, to the second electronic device 200, an operation instruction "surround-sound effect ON", by manipulating a remote control device or the like, to add a surround-sound effect to sound outputted from the second electronic device 200, the second electronic device 200 accepts such operation instruction "surround-sound effect ON".

Next, the state inquiry information sending unit 208 sends state inquiry information to the first electronic device 100.

When the state inquiry information receiving unit 104 of the first electronic device 100 receives the state inquiry information from the second electronic device 200, the state information sending unit 105 obtains state information of the first electronic device 100. Here, suppose that the first electronic device 100 is in a power-on state, that it does not perform a process of outputting sound or the like, and thus that the state information indicating "powered on" is obtained. Then, the state information "powered on" is sent to the second electronic device 200.

The state information obtainment unit 203 of the second electronic device 200 obtains the state information "powered on" sent from the first electronic device 100.

The second operation instruction information obtainment unit 206 judges whether or not the first manipulation item information associated with the operation instruction "surround-sound effect ON" accepted by the second operation instruction accepting unit 205 is stored in the second manipulation item information storage unit 202. More specifically, the second operation instruction information obtainment unit 206 judges whether or not there exists a first manipulation item information whose item attribute, "item name" element, is the same as the operation instruction "surround-sound effect ON". Here, since there exists the first manipulation item information whose item attribute, "item name" element, is the same as the operation instruction "surround-sound effect ON", the second operation instruction information obtainment unit 206 judges that there exists a first manipulation item information associated with the operation instruction. This indicates that it is possible to manipulate the first electronic device 100 based on such operation instruction.

Next, the second operation instruction information obtainment unit 206 obtains the state information of the first electronic device 100 obtained by the state information obtainment unit 203, and then judges whether or not the first electronic device 100 is in a state ready to be manipulated based on the first operation instruction information outputted from the second electronic device 200.

FIG. 21 is a state judgment table indicating a relationship between each state information obtained by the state information obtainment unit 203 and whether the manipulation of the first electronic device 100 from the second electronic device 200 is possible or not, that is, whether the first electronic device 100 is in a state ready to be controlled based on a first operation instruction outputted from the second electronic device 200. This state judgment table has attributes of "state information" and "judgment result". "State information" corresponds to state information obtained by the state information obtainment unit 203. "Judgment result" is an attribute indicating the result of a judgment of whether or not the first electronic device 100 is in a state ready to be manipulated from the second electronic device 200. In "judgment result", an attribute value "manipulation possible" indicates that the result of a judgment is that the first electronic device 100 is in a state ready to be manipulated from the second electronic device 200, whereas an attribute value "manipulation not possible" indicates that the result of a judgment is that the first electronic device 100 is in a state not ready to be manipulated from the second electronic device 200. This state judgment table is stored in a memory or the like not illustrated in the drawing.

The second operation instruction information obtainment unit 206 searches the state judgment table shown in FIG. 21 for a record having an attribute value that matches the state information "powered on" obtained by the state information obtainment unit 203, and obtains the attribute value, included in such record, for "judgment result". Here, the attribute value "manipulation possible" is obtained.

The second operation instruction information obtainment unit 206 judges, from the attribute value "manipulation possible", that the manipulation of the first electronic device 100 based on a first operation instruction information outputted from the second electronic device 200 is possible.

FIG. 22 is a diagram showing the data structure of the second manipulation item information stored in the self device manipulation item information storage unit 212 of the second electronic device 200. Tags shown in FIG. 22 that are the same as those shown in FIG. 19 are the same as or equivalent to the tags shown in FIG. 19. Here, assume that "target ID" element is information "SELF" indicating that this second manipulation item information relates to the self electronic device.

Next, the second operation instruction information obtainment unit 206 judges whether or not the second manipulation item information associated with the operation instruction "surround-sound effect ON" accepted by the second operation instruction accepting unit 205 is stored in the self device manipulation item information storage unit 212. More specifically, the second operation instruction information obtainment unit 206 judges whether or not there exists a second manipulation item information whose item attribute "item name" is the same as the operation instruction "surround-sound effect ON". Here, since there exists the second manipulation item information whose item attribute "item name" is the same as the operation instruction "surround-sound effect ON", the second operation instruction information obtainment unit 206 judges that there exists a second manipulation item information associated with the operation instruction. This indicates that it is possible to manipulate the second electronic device 200 based on such operation instruction.

Next, the second operation instruction information obtainment unit 206 obtains the first priority information and the second priority information respectively obtained by the second priority information obtainment unit 211 and the self device priority information obtainment unit 213, and compares these pieces of priority information. Here, assuming that the value of the second priority information is "5", the value of the first priority information is "8", and thus the result of the comparison is that the value of the first priority information is greater. This indicates that the priority level of the first electronic device 100 is higher than the priority level of the second electronic device 200.

Since this result of the comparison is that the priority level of the first electronic device 100 is higher, the second operation instruction information obtainment unit 206 obtains the first operation instruction information related to a first manipulation item information corresponding to the operation instruction "surround-sound effect ON", from among pieces of first manipulation item information stored in the second manipulation item information storage unit 202. In other words, the second operation instruction information obtainment unit 206 detects the first manipulation item information whose "item name" element is "surround-sound effect ON", from among pieces of first manipulation item information shown in FIG. 19, and obtains the first operation instruction information "surround_ON", which is the "action name" element in such detected first manipulation item information. The second operation instruction information obtainment unit 206 also obtains "CB01", which is "target ID" element.

Then, the second operation instruction information sending unit 207 obtains, from the electronic device information management table shown in FIG. 20, "192.168.1.25", which is an attribute value of "device address information" of a record whose "target ID" is "CB01", and sends "surround_ON" to the first electronic device 100, using this IP address. The first control unit 102 of the first electronic device 100 controls the first operation unit 101 based on the operation instruction information "surround_ON", so as to cause the first operation unit 101 to execute a process of adding a surround-sound effect to the sound outputted by the second electronic device 200 via the first electronic device 100.

As described above, in the case where the first electronic device 100 is in a state ready to be manipulated, and the priority level of the first electronic device 100 is higher than the priority level of the second electronic device 200, it is possible to manipulate only the first electronic device 100 in response to an operation instruction given by the user.

Here, consider the case where the value of the second priority information is "9" in the above-described concrete example. In this case, the result of comparing the first priority information and the second priority information is that the priority level of the second electronic device 200 is higher than the priority level of the first electronic device 100. The second operation instruction information obtainment unit 206 thus obtains the second operation instruction information related to a second manipulation item information corresponding to the operation instruction "surround-sound effect ON", from among pieces of second manipulation item information stored in the self device manipulation item information storage unit 212. In other words, the second operation instruction information obtainment unit 206 detects the second manipulation item information whose "item name" element is "surround-sound effect ON", from among pieces of second manipulation item information shown in FIG. 22, and obtains the second operation instruction information "surround_ON", which is the "action name" element in such detected second manipulation item information. The second operation instruction information obtainment unit 206 also obtains "SELF", which is "target ID" element.

Then, since the value of "target ID" is "SELF" indicating the self device, the second control unit 214 obtains the second operation instruction information "surround_ON", and controls the second operation unit 201 based on the obtained second operation instruction information, and the second electronic device 200 causes the second operation unit 201 to execute a process of adding a surround-sound effect to the sound outputted from the second electronic device itself.

As described above, in the case where the priority level of the second electronic device 200 is higher than the priority level of the first electronic device 100, even when the first electronic device 100 is in a state ready to be manipulated, it is possible to manipulate only the second electronic device 200 in response to an operation instruction given by the user.

Here, consider the case where the first electronic device 100 is outputting the sound of an electronic device other than the second electronic device 200 at a point in time when the second operation instruction accepting unit 205 accepts an operation instruction in the above-described concrete example. In this case, the state information sending unit 105 of the first electronic device 100 detects that the first electronic device 100 is in a state of executing a process of outputting sound, obtains state information "operation in progress", and sends it to the second electronic device 200. The obtainment of state information can be realized, for example, by: having in advance a conversion table from which state information "operation in progress" can be obtained, in the case where a process executed by the first electronic device 100 is a process of outputting sound; obtaining information indicating that a process being executed by the first electronic device 100 is a process of outputting sound; and converting such process using the above conversion table. The state information obtainment unit 203 obtains the state information "operation in progress", and the second operation instruction information obtainment unit 206 obtains a judgment result "manipulation not possible" from the state judgment table shown in FIG. 21, based on the state information "operation in progress". Based on this judgment result, the second operation instruction information obtainment unit 206 manipulates only the second electronic device 200, judging that the first electronic device 100 is in a state of not accepting any manipulations, regardless of the priority levels of the first electronic device 100 and the second electronic device 200, by causing the second electronic device 200 to execute a process of adding a surround-sound effect to the sound outputted from the second electronic device itself.

As described above, in the case where the first electronic device 100 is in a state of not accepting any manipulations, it is possible to manipulate only the second electronic device 200 in response to an operation instruction given by the user, regardless of the priority levels of the first electronic device 100 and the second electronic device 200.

Furthermore, consider the case where the first electronic device 100 is powered off at a point in time when the second operation instruction accepting unit 205 accepts an operation instruction in the above-described example. In this case, the first electronic device 100 cannot send state information in response to the sending of state inquiry information by the state inquiry information sending unit 208. As a result, the state information obtainment unit 203 judges that it is a time-out after waiting for receipt of the state information for a certain period of time. Then, the state information obtainment unit 203 obtains state information "powered off" indicating that the first electronic device 100 is in a power-off state. The second operation instruction information obtainment unit 206 obtains a judgment result "manipulation not possible" from the state judgment table shown in FIG. 21, based on such state information "powered off". Based on this judgment result, the second operation instruction information obtainment unit 206 manipulates only the second electronic device 200, judging that the first electronic device 100 is in a state of not accepting any manipulations, regardless of the priority levels of the first electronic device 100 and the second electronic device 200, by causing the second electronic device 200 to execute a process of adding a surround-sound effect to the sound outputted from the second electronic device itself.

As described above, in the case where state information cannot be obtained from the first electronic device 100, it is possible to manipulate only the second electronic device 200 in response to an operation instruction given by the user, regardless of the priority levels of the first electronic device 100 and the second electronic device 200, judging that the first electronic device 100 is in a state not ready to be manipulated due to such reasons as that the first electronic device 100 is powered off.

As described above, according to the present embodiment, in the case where an operation instruction is accepted, it is possible to manipulate an electronic device by switching electronic devices to manipulate as appropriate according to the state information of the first electronic device 100 and the priority levels of the first electronic device 100 and second electronic device 200. This can improve the operability of the electronic devices since the user is not required to check whether or not an electronic device s/he wishes to manipulate is in a state ready to be manipulated, not required to select an electronic device to manipulate from among them, or not required to manipulate electronic devices separately.

Note that in the present embodiment, in the case where both of the first electronic device and the second electronic device are in a state ready to be manipulated, either of such electronic devices is selected for manipulation based on priority information, but both the first electronic device and the second electronic device may be manipulated concurrently in response to a single operation instruction, without using priority information. In this case, the structures and processes for handling priority information, such as the priority information storage unit 108, may be omitted. This also applies to the other embodiments.

Furthermore, in the present embodiment, at least one of the electronic devices may have plural pieces of different priority information. Moreover, such plural pieces of priority information of the electronic device may correspond to functions or the like of such electronic device, so that they are selectively used according to another information such as state information of the first electronic device 100 and operation instruction information obtained by the second electronic device 200. For example, in the above-described concrete example, each of the first electronic device 100 and second electronic device 200 has plural pieces of different priority information, and their respective pieces of priority information and respective pieces of operation instruction information that can be obtained by the second electronic device 200 are associated in advance with each other. In this case, when obtaining operation instruction information, the second electronic device 200 may select the priority information associated with such obtained operation instruction information, and judge to which one of the first electronic device 100 and second electronic device 200 the obtained operation instruction information should be sent, using such selected priority information. This structure makes it possible to change whether to send operation instruction information to the first electronic device 100 or to the second electronic device 200 for each operation instruction accepted by the second electronic device 200, and thus to improve the degree of design flexibility of the electronic device system. More specifically, in the case of controlling the sound volume, priority information of the second electronic device 200 whose priority level is higher than that of the first electronic device 100 is selectively obtained from the second priority information obtainment unit 211 and the self device priority information obtainment unit 213 so as to control the sound volume of the second electronic device 200, whereas in the case of turning on the surround-sound function, priority information of the first electronic device 100 whose priority level is higher than that of the second electronic device 200 is selectively obtained from the second priority information obtainment unit 211 and the self device priority information obtainment unit 213 so as to turn on the surround-sound function. This also applies to the other embodiments.

Furthermore, although a manipulation menu is displayed based on the first manipulation item information obtained from the first electronic device 100 in the present embodiment, the second manipulation item information storage unit 202 may store, in advance, the first manipulation item information of the first electronic device 100. In this case, a higher processing speed is achieved for menu display since a process of obtaining the first manipulation item information is not necessary. Furthermore, it is possible to omit the first manipulation item information storage unit 106, first manipulation item information sending unit 107, second manipulation item information receiving unit 209, second manipulation item information accumulation unit 210, and the like. This also applies to the other embodiments.

Similarly, the first priority information may be accumulated in a storage medium such as a memory in the second electronic device 200, and the second priority information obtainment unit 211 may obtain such accumulated first priority information. In this case, a higher processing speed is achieved since a structure or a process of obtaining the first priority information is not necessary. This also applies to the other embodiments.

Note that although the present embodiment has been described for the case where the first electronic device 100 is connected with the second electronic device 200, the present invention is also applicable to the case where plural first electronic devices whose respective first operation units operate differently or to plural first electronic devices whose respective first operation units operate in the same manner are connected to the second electronic device 200. In this case, the present invention can also be carried out by, for example, the second manipulation item information storage unit 202 storing the respective pieces of first manipulation item information or the like of plural first electronic devices, the state information obtainment unit 203 obtaining state information of each of the first electronic devices, and the second priority information obtainment unit 211 obtaining the priority information of each of the plural first electronic devices and switching to an electronic device for manipulation that is in a state ready to be manipulated and that has the highest priority level, in response to an operation instruction, according to the state information and priority information of each of the plural first electronic device, for example, as in the case of the above-described embodiment. This also applies to the other embodiments.

Furthermore, the state information obtainment unit 203 may obtain, as the state information of an electronic device other than the second electronic device 200, state information with which the priority level of such electronic device is always higher than the priority level of the second electronic device 200. For example, priority information indicating that the priority level is higher than the priority level of the second electronic device 200 may be stored in advance in a memory or the like, and the state information obtainment unit 203 may obtain such priority information as the priority information of a device connected to the second electronic device 200. Furthermore, in the case where plural first electronic devices are connected to the second electronic device, priority information may be obtained whose priority level changes depending on the temporal order in which each of the first electronic device was connected to the second electronic device 200, as the priority information of each of such first electronic devices. This also applies to the other embodiments.

Furthermore, the present embodiment has been described for the case where the manipulation of not only the first electronic device but also the second electronic device is possible in response to an operation instruction accepted by the second operation instruction accepting unit 205, but the second electronic device may not be manipulated. In this case, structures for manipulating the second electronic device may be omitted. This also applies to the other embodiments.

Fourth Embodiment

Figure 23:
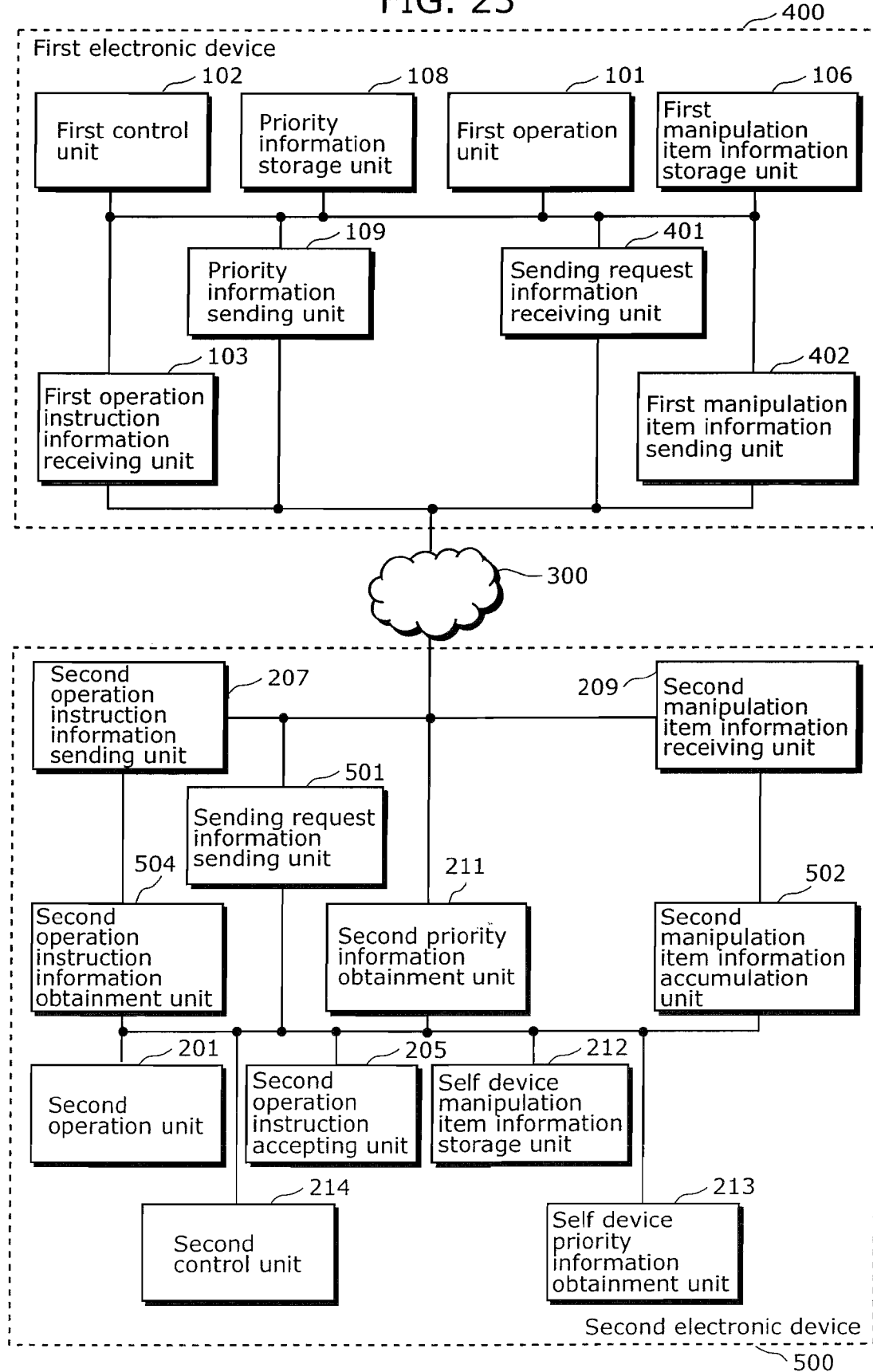
FIG. 23 is a block diagram showing the structure of an electronic device system according to a fourth embodiment of the present invention.

FIG. 23 is a block diagram showing the structure of an electronic device system according to the present embodiment. The electronic device system according to the present embodiment is a system in which the first electronic device 100 judges whether or not to send the first manipulation item information depending on a state of the self electronic device in the electronic device system of the third embodiment. The electronic device system according to the present embodiment includes a first electronic device 400 and a second electronic device 500. The first electronic device 400 and the second electronic device 500 are connected with each other via the network 300. The network 300 is the same as the one in the third embodiment, and thus its description is not given here.

The first electronic device 400 is an example of an electronic device connected to the audio-video processing apparatus of the present invention. In the present embodiment, the first electronic device 400 includes a first manipulation item information sending unit 402 instead of the first manipulation item information sending unit 107 included in the first electronic device 100 described in the third embodiment, and includes a sending request information receiving unit 401 instead of the state inquiry information receiving unit 104 and state information sending unit 105 included in the first electronic device 100 described in the third embodiment. The other components are the same as those of the third embodiment, and thus their descriptions are not given.

The second electronic device 500 is an example of the audio-video processing apparatus of the present invention. In the present embodiment, the second electronic device 500 includes a sending request information sending unit 501 instead of the second manipulation item information storage unit 202, state information obtainment unit 203, and state inquiry information sending unit 208 included in the second electronic device 200 described in the third embodiment, includes a second manipulation item information accumulation unit 502 instead of the second manipulation item information accumulation unit 210 included in the second electronic device 200 described in the third embodiment, and includes a second operation instruction information obtainment unit 504 instead of the second operation instruction obtainment unit 206 included in the second electronic device 200 described in the third embodiment.

The sending request information sending unit 501 sends, to the first electronic device 400, sending request information for requesting for the sending of the first manipulation item information. The sending request information may be any information, and thus it may be event information, a command, or the like for activating a program or the like for causing the first electronic device 400 to obtain and send the first manipulation item information, or may be a program or the like for causing the first electronic device 400 to execute these processes. Furthermore, the sending request information may include address information, such as an IP address, for identifying a position or the like of the second electronic device 500, or may include identification information, such as a MAC address and a serial number, for identifying the second electronic device 500. Furthermore, the sending request information sending unit 501 may send sending request information at any timing or in response to any event information. For example, the sending request information sending unit 501 may send sending request information on a regular or irregular basis, or may send sending request information in response to an instruction or the like from another processing unit in the second electronic device 500. The present embodiment is described for the case where the sending request information sending unit 501 sends sending request information immediately before a first operation instruction information or a second operation instruction information is outputted. The reason for sending request information immediately before a first operation instruction information or a second operation instruction information is outputted is that a process of obtaining a first operation instruction information or a second operation instruction information corresponding to an operation instruction can be executed based on the latest state of the first electronic device 400. Note that the expression "immediately before" covers the case where the sending of sending request information precedes the display of a manipulation menu to some extent. The sending request information sending unit 501 may or may not include a sending device, such as a modem and a network, for sending information. The sending request information sending unit 501 may be implemented as hardware or as software, such as a driver, for driving the sending device. The sending request information sending unit 501 may be implemented as: a communication means/device such as a LAN; an infrared communication; a short-range wireless communication means/device such as Bluetooth (registered trademark); an e-mail sending means/device; or the like. The sending request information sending unit 501 may also be implemented as a wireless or wired broadcasting means/device.

The sending request information receiving unit 401 receives sending request information from the second electronic device 500. The sending request information receiving unit 401 may or may not include a receiving device, such as a modem and a network, for receiving information. The sending request information receiving unit 401 may be implemented as hardware or as software, such as a driver, for driving the receiving device. The sending request information receiving unit 401 may be implemented as: a communication means/device such as a LAN; an infrared communication; a short-range wireless communication means/device such as Bluetooth (registered trademark); an e-mail sending means/device; or the like. The sending request information receiving unit 401 may also be implemented as a wireless or wired broadcasting means/device.

The first manipulation item information sending unit 402 sends the first manipulation item information to the second electronic device 500, in response to the sending request information received by the sending request information receiving unit 401. For example, the first manipulation item information sending unit 402 may execute a process of sending the first manipulation item information in response to the receiving of the sending request information by the sending request information receiving unit 401 as a trigger, or in response to a command or the like included in the sending request information. Furthermore, first manipulation item information sending unit 402 sends the first manipulation item information depending on a state of the first electronic device 400, i.e., the self electronic device. The expression "sends the first manipulation item information depending on a state" also refers to that the first manipulation item information will not be sent depending on the result of a judgment about a state of the first electronic device 400. More specifically, the first manipulation item information sending unit 402 obtains, from the self electronic device, state information that is the same as state information described in the third embodiment at the time of sending the first manipulation item information in response to sending request information, and judges whether or not to send the first manipulation item information based on such obtained state information. The process of making this judgment may be any process. For example, this process may be the same as the judgment process, which is performed by the second operation instruction information obtainment unit 206 described in the third embodiment, of judging whether or not the first electronic device 100 is in a state ready to be manipulated. In this case, for example, the first manipulation item information sending unit 402 judges that the first manipulation item information should be sent instead of making a judgment "manipulation possible", and judges that the first manipulation item information should not be sent instead of making a judgment "manipulation not possible". The first manipulation item information sending unit 402 may send sending request information only to the second electronic device 500 based on information or the like indicating an address included in the sending request information or by means/device of multicast communication, broadcast communication, or any other methods. The first manipulation item information sending unit 402 may or may not include a sending device, such as a modem and a network, for sending information. The first manipulation item information sending unit 402 may be implemented as hardware or as software, such as a driver, for driving the sending device. The first manipulation item information sending unit 402 may be implemented as: a communication means/device such as a LAN; an infrared communication; a short-range wireless communication means/device such as Bluetooth (registered trademark); an e-mail sending means/device; or the like. The first manipulation item information sending unit 402 may also be implemented as a wireless or wired broadcasting means/device. Furthermore, the first manipulation item information 402 may include an MPU, a memory, and the like for executing, by software, processes or the like of judging whether or not to send the first manipulation item information, or may include dedicated hardware for executing such processes.

The second manipulation item information accumulation unit 502 is the same as the second manipulation item information accumulation unit 210 of the third embodiment except for that the second manipulation item information accumulation unit 502 accumulates the first manipulation item information received by the second manipulation item information receiving unit 209 into a storage medium such as a memory not illustrated in the drawing, and thus its description is not given here. Note that the second manipulation item information accumulation unit 502 may be omitted in the case where the first manipulation item information received by the second manipulation item information receiving unit 209 is temporarily stored in a storage medium such as a memory.

The second operation instruction information obtainment unit 504 obtains, in the case where the second manipulation item information receiving unit 209 receives the first manipulation item information, a first operation instruction information related to a received first manipulation item information corresponding to the operation instruction accepted by the second operation instruction accepting unit 205, based on the priority information obtained by the second priority information obtainment unit 211. More specifically, instead of judging, by the second operation instruction information obtainment unit 206 described in the third embodiment, whether or not the first electronic device is in a state ready to be manipulated based on the state information of the first electronic device, the second operation instruction information obtainment unit 504 judges whether or not the first electronic device 400 is in a state ready to be manipulated based on whether or not the second manipulation item information receiving unit 209 has received the first manipulation item information sent from the first electronic device 400. For example, the second operation instruction information obtainment unit 504 judges whether or not the second manipulation item information receiving unit 209 has received the first manipulation item information after a point in time when the second operation instruction accepting unit 205 has received an operation instruction. In the case where the second manipulation item information receiving unit 209 has received the first manipulation item information, the second operation instruction information obtainment unit 504 judges that the manipulation of the first electronic device 400 is possible. Whereas in the case where the second manipulation item information receiving unit 209 could not receive the first manipulation item information, the second operation instruction information obtainment unit 504 judges that the manipulation of the first electronic device 400 is not possible. Note that the second operation instruction information obtainment unit 504 may also judge whether or not the first manipulation item information has been received within a certain period of time after an operation instruction is accepted. Such "certain period of time" may be set in any way. Usually, in the case where the first electronic device 400 operates normally and a communication between the first electronic device 400 and the second electronic device 500 functions normally, a "certain period of time" is set as the time that is deemed sufficient to receive a corresponding first manipulation item information after the second electronic device 500 accepts an operation instruction. The second operation instruction information obtainment unit 504 may also judge whether or not the second manipulation item information receiving unit 209 has received the first manipulation item information after the sending request information sending unit 501 sends sending request information. The other structures are the same as the structure of the second operation instruction information obtainment unit 206 described in the third embodiment, and thus their descriptions are not given here.

Figure 24:
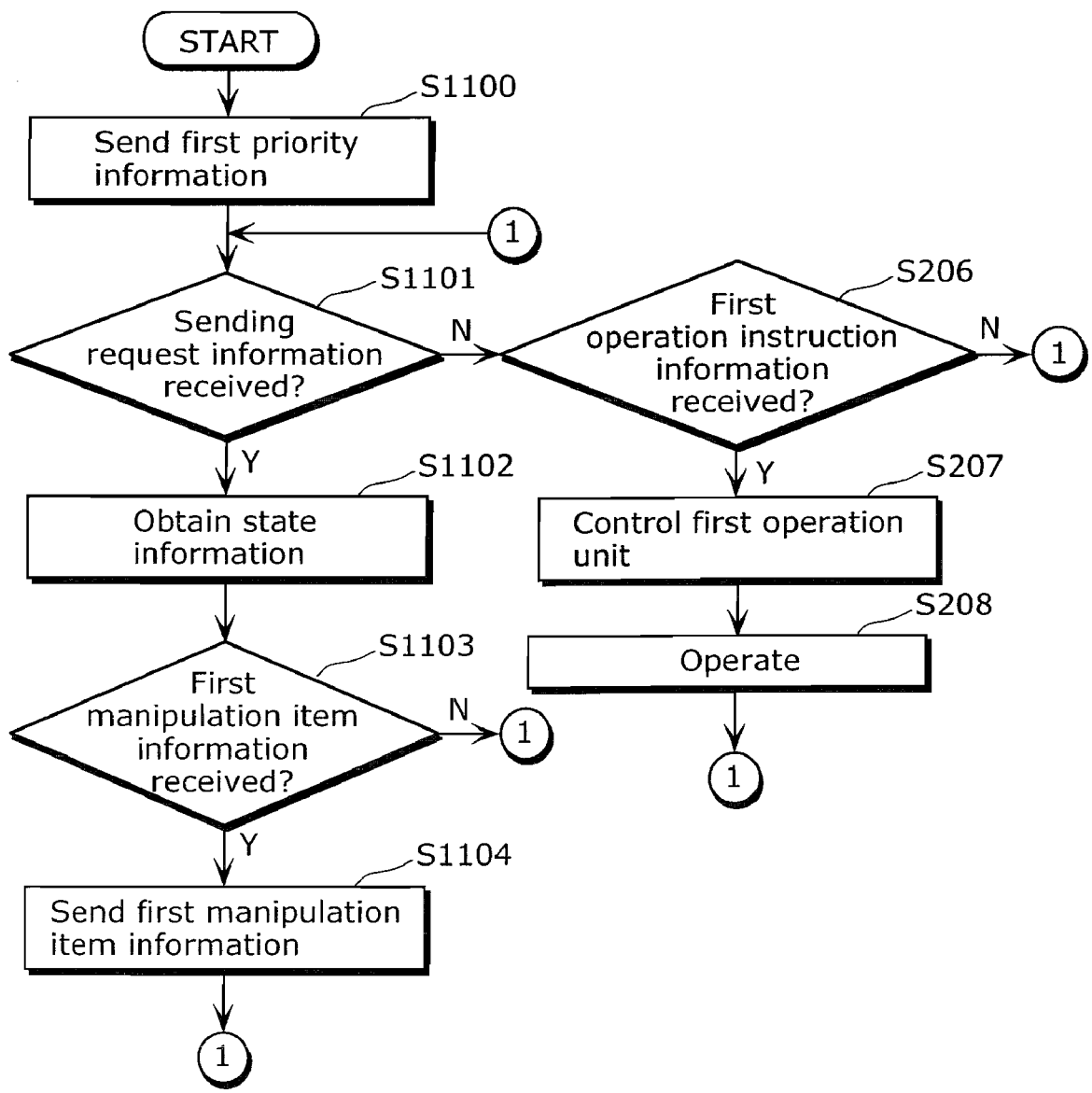
FIG. 24 is a flowchart for describing an operation performed in the electronic device system.

Next, referring to the flowchart shown in FIG. 24, the operation of the first electronic device 400 is described. Note that in FIG. 24, the same reference numbers as those shown in FIG. 15 are the same or equivalent to the process steps shown in FIG. 15, and thus their descriptions are not given.

(Step S1100) The priority information sending unit 109, when the first electronic device 400 is powered on, obtains the first priority information from the priority information storage unit 108, and sends the first priority information to another electronic device, which is the second electronic device 500 here, via the network 300. Note that the first priority information is sent in response to the first electronic device 400 being powered on as a trigger, but the first priority information may be sent in response to any trigger in the present embodiment. For example, the first priority information may be sent with the following as a trigger: when the first electronic device 400 is powered on; when the first electronic device 400 recognizes that it has got connected to the network 300; and in the case where the first electronic device 400 accepts a certain kind of signal outputted from the second electronic device 500. Also note that the process of Step S1100 may be executed as a post-process of the processes of Step S1101 to Step S1104 described below.

(Step S1101) The sending request information receiving unit 401 judges whether or not sending request information has been received from the second electronic device 500. In the case where the judgment is YES, the process proceeds to Step S1102, whereas in the case where the judgment is NO, the process proceeds to Step S206.

(Step S1102) The first manipulation item information sending unit 402 obtains state information that is information indicating a state of the first electronic device 400.

(Step S1103) The first manipulation item information sending unit 402 judges whether or not to send the first manipulation item information, based on the state information received in Step S1102. In the case where the judgment is YES, the process proceeds to Step S1104, whereas in the case where the judgment is NO, the process returns to Step S1101.

(Step S1104) The first manipulation item information sending unit 402 obtains the first manipulation item information from the first manipulation item information storage unit 106, and sends it to the second electronic device 500, and then returns to Step S1101.

Note that the processing shown in the flowchart of FIG. 24 is terminated in response to the power off of the first electronic device 400 or to an interruption for terminating the processing.

Figure 25:
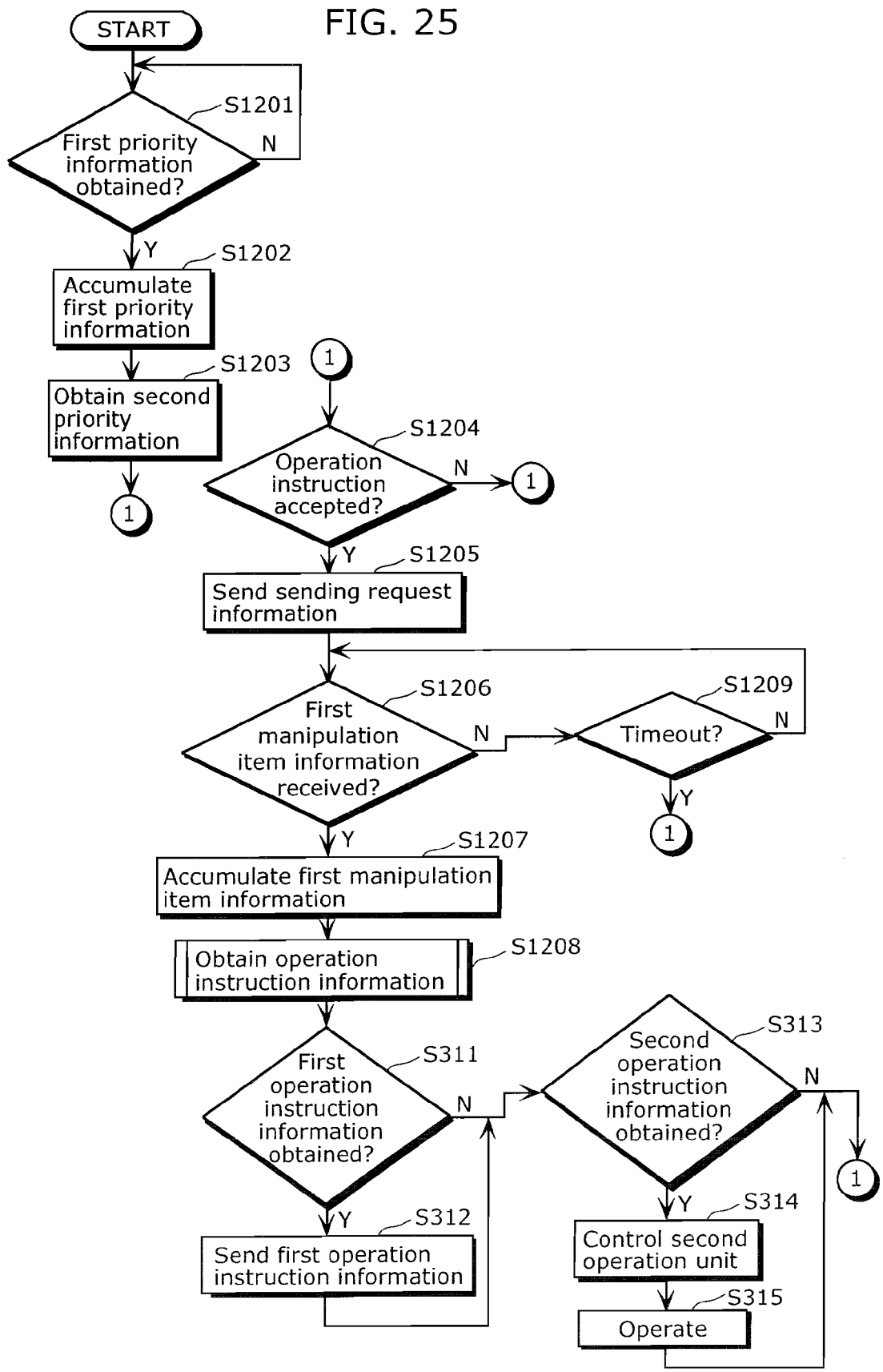
FIG. 25 is a flowchart for describing an operation performed in the electronic device system.

Next, referring to the flowchart shown in FIG. 25, the operation of the second electronic device 500 is described. Note that in FIG. 25, the same reference numbers as those shown in FIG. 16 are the same or equivalent to the process steps shown in FIG. 16, and thus their descriptions are not given.

(Step S1201) The second priority information obtainment unit 211 judges whether or not the first priority information sent by the First electronic device 400 has been obtained. In the case where the judgment is YES, the process proceeds to Step S1202, whereas in the case where the judgment is NO, the process returns to Step S1201.

(Step S1202) The second priority information obtainment unit 211 accumulates, in a memory or the like, the received first priority information, and proceeds to Step S1203.

(Step S1203) The self device priority information obtainment unit 213 obtains the second priority information that is stored in advance in a memory or the like.

(Step S1204) The second operation instruction accepting unit 205 judges whether or not an operation instruction has been accepted. In the case where the judgment is YES, the process proceeds to Step S1205, whereas in the case where the judgment is NO, the process returns to Step S1204.

(Step S1205) The sending request information sending unit 501 sends sending request information to the first electronic device 400.

(Step S1206) The second operation instruction information obtainment unit 504 judges whether or not the second manipulation item information receiving unit 209 has received the first manipulation item information from the first electronic device 400. In the case where the judgment is YES, the process proceeds to Step S1207, whereas in the case where the judgment is NO, the process proceeds to Step S1209.

(Step S1207) The second manipulation item information accumulation unit 502 accumulates, in a memory or the like, the first manipulation item information received in Step S1206.

(Step S1208) The second operation instruction information obtainment unit 504 performs a process of obtaining at least one of a first operation instruction information and a second operation instruction information, using the priority information. This process is equivalent to a process obtained by omitting the processes of Step 5402 and Step S403 shown in the flowchart in FIG. 17, and thus its description is not given here.

(Step S1209) The second operation instruction information obtainment unit 504 judges whether it is a time-out or not. Time-out is a pointer based on which it is judged, for example, whether or not a predetermined period of time has elapsed after the sending of sending request information. The second operation instruction information obtainment unit 504 may also judge whether or not a certain period of time has elapsed after the reception of an operation instruction. In the case where the judgment is NO, the process returns to Step S1206, whereas in the case where the judgment is YES, the process returns to Step S1204.

Note that the processing shown in the flowchart of FIG. 25 is terminated in response to the power off of the second electronic device 500 or to an interruption for terminating the processing.

Next, a description is given of a concrete example. Note that the same parts as those in the concrete example in the third embodiment are not described here. The overview of the electronic device system in this concrete example is the same as the one described in FIG. 17 except that the first electronic device 400 is included instead of the first electronic device 100 and the second electronic device 500 is included instead of the second electronic device 200.

First, when the first electronic device 400 and second electronic device 500 are powered on, the first electronic device 400 recognizes that a connection is established with the second electronic device 500, and sends, to second electronic device 500, the first priority information stored in the priority information storage unit 108 via the network 300. Here, assume that the value of the first priority information is "8". The second priority information obtainment unit 211 of the second electronic device 500 receives such first priority information, and accumulates it in a memory or the like.

Then, when the user gives an operation instruction "surround-sound effect ON" to add a surround-sound effect to the sound outputted from the second electronic device 500, by manipulating a remote control device or the like, the second operation instruction accepting unit 205 accepts the operation instruction "surround-sound effect ON".

Next, the sending request information sending unit 501 sends sending request information to the first electronic device 400.

When the sending request information receiving unit 401 of the first electronic device 400 receives the sending request information from the second electronic device 500, the first manipulation item information sending unit 402 obtains state information of the first electronic device 400. Here, suppose that the first electronic device 400 is in a power-on state, that it does not perform a process of outputting sound or the like, and thus that the state information indicating "powered on" is obtained.

FIG. 26 is a sending judgment table indicating a relationship between each state information and whether or not to send the first manipulation item information. The sending judgment table has attributes of "state information" and "judgment result". "State information" corresponds to state information obtained by the first manipulation item information sending unit 402. "Judgment result" is an attribute indicating the result of a judgment of whether or not to send the first manipulation item information. In "judgment result", an attribute value "sending possible" indicates that the result of a judgment is that the first manipulation item information should be sent, whereas an attribute value "sending not possible" indicates that the result of a judgment is that the first manipulation item information should not be sent. This sending judgment table is stored in a memory or the like not illustrated in the drawing.

The first manipulation item information sending unit 402 searches the sending judgment table shown in FIG. 26 for a record having an attribute value that matches the obtained state information "powered on", and obtains the attribute value, included in such record, for "judgment result". Here, the attribute value "sending possible" is obtained.

The first manipulation item information sending unit 402 judges that the sending of the first manipulation item information is possible, based on the attribute value "sending possible". Then, the first manipulation item information sending unit 402 sends, to the second electronic device 500, the first manipulation item information, shown in FIG. 19, stored in the first manipulation item information storage unit 106. Note that the first manipulation item information sending unit 402 also sends, to the second electronic device 500, the identification information of the self electronic device and the address information of the self electronic device at this time.

When the second manipulation item information receiving unit 209 receives the first manipulation item information from the first electronic device 400, the second manipulation item information accumulation unit 502 accumulates the first manipulation item information in a memory or the like. At this time, the second manipulation item information receiving unit 209 also receives the identification information and address information of the first electronic device 400, and accumulates these pieces of information in the electronic device information management table, provided in a memory or the like, as shown in FIG. 20.

Then, the second operation instruction information obtainment unit 504 judges whether or not the first manipulation item information associated with the operation instruction "surround-sound effect ON" accepted by the second operation instruction accepting unit 205 is accumulated in the second manipulation item information accumulation unit 502. Here, since there exists the first manipulation item information whose item attribute "item name" is the same as the operation instruction "surround-sound effect ON", the second operation instruction information obtainment unit 504 judges that there exists a first manipulation item information associated with the operation instruction.

Next, the second operation instruction information obtainment unit 206 judges whether or not the second manipulation item information associated with the operation instruction "surround-sound effect ON" accepted by the second operation instruction accepting unit 205 is stored in the self device manipulation item information storage unit 212. Here, since there exists the second manipulation item information whose item attribute "item name" is the same as the operation instruction "surround-sound effect ON", the second operation instruction information obtainment unit 206 judges that there exists a second manipulation item information associated with the operation instruction.

Next, the second operation instruction information obtainment unit 206 obtains the first priority information and the second priority information respectively obtained by the second priority information obtainment unit 211 and the self device priority information obtainment unit 213, and compares these pieces of priority information. Here, assuming that the value of the second priority information is "5", the value of the first priority information is "8", and thus the result of the comparison is that the value of the first priority information is greater. This indicates that the priority level of the first electronic device 400 is higher than the priority level of the second electronic device 500.

Since this result of the comparison is that the priority level of the first electronic device 400 is higher, the second operation instruction information obtainment unit 206 obtains a first operation instruction information related to a first manipulation item information corresponding to the operation instruction "surround-sound effect ON", from among pieces of first manipulation item information stored in the second manipulation item information storage unit 202. In other words, the second operation instruction information obtainment unit 206 detects the first manipulation item information whose "item name" element is "surround-sound effect ON", from among pieces of first manipulation item information shown in FIG. 19, and obtains the first operation instruction information "surround_ON", which is the "action name" element in such detected first manipulation item information.

The subsequent processes are the same as those described in the concrete example in the aforementioned embodiments, and thus their descriptions are not given here.

As described above, in the case where a state of the first electronic device 400 is "powered on", it is possible for the second electronic device 500 to judge that the manipulation of the first electronic device 400 is possible based on the fact that the first manipulation item information of the first electronic device 400 is sent to the second electronic device 500, and it is thus possible for the second operation instruction information obtainment unit 504 to obtain either a first operation instruction information or a second operation instruction information based on the result of such judgment and on the respective pieces of priority information of the first electronic device 400 and the second electronic device 500.

Here, consider the case where the first electronic device 400 is outputting the sound of another electronic device at a point in time when the second electronic device 500 accepts the operation instruction in the above-described concrete example. In this case, the first manipulation item information sending unit 402 of the first electronic device 400 detects that the first electronic device 400 is in a state of executing a playback operation, obtains state information "operation in progress", and obtains a judgment result "sending not possible" from the sending judgment table shown in FIG. 26, based on the state information "operation in progress". The first manipulation item information sending unit 402 does not send the first manipulation item information to the second electronic device 500, based on such judgment result. As a result, the second manipulation item information receiving unit 209 does not receive the first manipulation item information, and the second operation instruction information obtainment unit 504 judges that the first electronic device 400 is in a state of not accepting any manipulations and thus obtains a second operation instruction information regardless of the priority information.

Furthermore, in the case where the first electronic device 400 is powered off at a point in time when the second electronic device 500 accepts an operation instruction, the first electronic device 400 cannot send the first manipulation item information in response to the sending of sending request information by the sending request information sending unit 501. As a result, it is a time-out since the second manipulation item information receiving unit 209 has not received the first manipulation item information within a predetermined period of time after an instruction to display a manipulation menu is accepted, and thus the second operation instruction information obtainment unit 504 judges that the first electronic device 400 is in a state of not accepting any manipulations, and thus obtains a second operation instruction information regardless of the priority information.

As described above, according to the present embodiment, in the case where an operation instruction is accepted, it is possible to manipulate an electronic device by switching electronic devices to manipulate as appropriate according to the state information of the first electronic device 400 and the priority levels of the first electronic device 400 and second electronic device 500. This can improve the operability of the electronic devices since the user is not required to check whether or not an electronic device s/he wishes to manipulate is in a state ready to be manipulated, not required to select an electronic device to manipulate, or not required to manipulate electronic devices separately.

Furthermore, there becomes no need for the second electronic device 500 to perform a process of judging whether or not to obtain a first operation instruction information depending on a state of the first electronic device 400. This reduces the workload of the second electronic device 500. As a result, in the case where plural first electronic devices 400 are connected to the second electronic device 500, a process of displaying the manipulation menus of the first electronic devices 400 can be performed in a decentralized manner, which makes it possible to achieve a higher processing speed and stabilized processing.

Also note that, in each of the above-described embodiments, processes (functions) may be realized by a single device (system) executing them in a centralized manner, or may be realized by plural devices executing them in a decentralized manner.

Furthermore, in each of the above-described embodiments, each of the components may be constructed as dedicated hardware. Components that can be implemented as software may be implemented by the execution of a program. For example, each of the components can be implemented by a program execution unit such as a CPU reading out and executing a software program stored on a storage medium such as a hard disk and a semiconductor memory.

Note that software realizing the first electronic device in the electronic device system in the aforementioned embodiment is a program such as: a computer program stored on a computer readable medium of an audio-video processing apparatus connected to an electronic device via a communication path, the computer program including: computer executable program code that causes the computer to store one or more pieces of manipulation item information, each of which is information for causing the electronic device to operate in a predetermined manner; computer executable program code that causes the computer to obtain state information indicating a state of the electronic device; computer executable program code that causes the computer to accept, from an input device, an operation instruction that is an instruction to cause at least one of the electronic device and the audio-video processing apparatus to operate in a predetermined manner; computer executable program code that causes the computer to obtain, based on the state information, operation instruction information related to a corresponding one of the one or more pieces of manipulation item information corresponding to the operation instruction, the operation instruction information being information instructing that an operation should be performed; and computer executable program code that causes the computer to send, to the electronic device, the obtained operation instruction information.

Here, the above computer program may further include: computer executable program code that causes the computer to obtain priority information that is information related to a priority level of the electronic device; and computer executable program code that causes the computer to obtain, based on the priority information, the operation instruction information related to the corresponding manipulation item information corresponding to the operation instruction.

Alternatively, the above computer program may further include: computer executable program code that causes the computer to prepare a manipulation menu based on the one or more pieces of manipulation item information held, and operable to determine whether or not to display the manipulation menu depending on the obtained state information; computer executable program code that causes the computer to accept, as the operation instruction, an instruction directed to a menu item in the manipulation menu; and computer executable program code that causes the computer to obtain, based on the operation instruction accepted by the operation instruction accepting unit, the operation instruction information related to the corresponding manipulation item information.

In the above computer program, each of the audio-video processing apparatus and electronic device may be one of a television, a DVD player, a DVD recorder, a hard disk recorder, a video tape recorder, a CD player, a tuner, a cassette tape recorder, an amplifier, and a surround-sound system.

In the above computer program, the operation of the electronic device in a predetermined manner may comprise one of: reproducing a video signal, reproducing an audio signal, recording a video signal, recording an audio signal, outputting a video signal, and outputting an audio signal.

In the above computer program, the obtained state information may be one of a power-on state, a power-off state, activated state, inactivated state, input mode, output mode, display mode, recording mode, play mode, out of order state, sleep state and suspend state.

Note that the sending of information and the receiving of information in each of the above-described programs do not include any processes executed by hardware (processes executed only by hardware), e.g., a process, in the sending of information, executed by a modem or an interface card.

Furthermore, each of the above programs may be executed by a server or the like downloading such program, or may be stored on a predetermined storage medium (e.g., an optical disc such as a CD-ROM, as well as a magnetic disc and a semiconductor memory) and executed by being read out from such storage medium.

Furthermore, a single or plural computers may execute each of the above programs. In other words, each of the programs may be executed either in a centralized or decentralized manner.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention. For example, an electronic device that is made up of an arbitrary combination of constituent elements described in each of the above embodiments, is also in the scope of the present invention.

INDUSTRIAL APPLICABILITY

The present invention is effective for use as an audio-video processing apparatus connected to an electronic device, and particularly optimal for use as a television, a DVD player, a DVD recorder, a hard disk recorder, a video tape recorder, a CD player, a tuner, a cassette tape recorder, an amplifier, and a surround-sound system that are connected to an electronic device, such as an Audio-Video device and a home appliance, connected via a network or the like.

The invention claimed is:

1. An audio-video processing apparatus connected to an electronic device via a communication path, said apparatus comprising:
    a manipulation item information storage unit operable to hold one or more pieces of manipulation item information, each of which is information for causing the electronic device to operate in a predetermined manner;
    a state information obtainment unit operable to obtain state information indicating a state of the electronic device;
    a manipulation menu display unit operable to prepare a manipulation menu that includes one or more menu items that correspond to the one or more pieces of manipulation item information held in said manipulation item information storage unit, and operable to display the prepared manipulation menu, depending on the state information obtained by said state information obtainment unit;
    an operation instruction accepting unit operable to accept an operation instruction that is an instruction directed to one of the one or more menu items in the manipulation menu displayed by said manipulation menu display unit;
    an operation instruction information obtainment unit operable to obtain operation instruction information related to a corresponding one of the one or more pieces of manipulation item information corresponding to the operation instruction, the operation instruction information being information instructing that an operation should be performed; and
    an operation instruction information sending unit operable to send, to the electronic device, the operation instruction information obtained by said operation instruction information obtainment unit;
    wherein the state information indicates at least a power-on/-off state of the electronic device; and
    said manipulation menu display unit is, in the case where the obtained state information indicates the power-off state, operable to judge which of the one or more menu items are executable in the power-off state, and to display the manipulation menu such that the one or more menu items which are judged as being executable in the power-off state are included in the manipulation menu, and the one or more menu items which are not judged as being executable in the power-off state are not included in the manipulation menu.

2. The audio-video processing apparatus according to claim 1, further comprising:
    a self-device priority information storage unit operable to hold self-device priority information that is information related to a priority level of said audio-video processing apparatus; and
    an electronic device priority information obtainment unit operable to obtain electronic device priority information that is information related to a priority level of the electronic device;
    wherein in the case where both the electronic device and said audio-video processing apparatus are able to perform an operation corresponding to the operation instruction, said operation instruction information obtainment unit is further operable to compare the priority level indicated by the self-device priority information with the priority level indicated by the electronic device priority information, and is operable to obtain the operation instruction information related to the corresponding manipulation item information corresponding to the operation instruction only in the case where the priority level indicated by the electronic device priority information is higher than the priority level indicated by the self-device priority information.

3. The audio-video processing apparatus according to claim 1, wherein said audio-video processing apparatus is one of a television, a DVD player, a DVD recorder, a hard disk recorder, a video tape recorder, a CD player, a tuner, a cassette tape recorder, an amplifier, and a surround-sound system.

4. The audio-video processing apparatus according to claim 1, wherein the input device is one of a remote control device, a touch panel, a hard button, a ten key pad, a keyboard and a mouse.

5. The audio-video processing apparatus according to claim 1, wherein the operation of the electronic device in a predetermined manner comprises one of: reproducing a video signal, reproducing an audio signal, recording a video signal, recording an audio signal, outputting a video signal, and outputting an audio signal.

6. The audio-video processing apparatus according to claim 1, wherein the state information obtained by said state information obtainment unit further indicates one of activated state, inactivated state, input mode, output mode, display mode, recording mode, play mode, out of order state, sleep state and suspend state.

7. A computer program stored on a computer readable medium of an audio-video processing apparatus connected to an electronic device via a communication path, said computer program comprising:
    computer executable program code operable to cause the computer to store one or more pieces of manipulation item information, each of which is information for causing the electronic device to operate in a predetermined manner;
    computer executable program code operable to cause the computer to obtain state information indicating a state of the electronic device;
    computer executable program code operable to cause the computer to prepare a manipulation menu that includes one or more menu items that correspond to the stored one or more pieces of manipulation item information and to display the prepared manipulation menu, depending on the obtained state information;

computer executable program code operable to cause the computer to accept an operation instruction that is an instruction directed to one of the one or more menu items in the displayed manipulation menu;

computer executable program code operable to cause the computer to obtain operation instruction information related to a corresponding one of the one or more pieces of manipulation item information corresponding to the operation instruction, the operation instruction information being information instructing that an operation should be performed; and computer executable program code operable to cause the computer to send, to the electronic device, the obtained operation instruction information;

wherein the state information indicates at least a power-on/-off state of the electronic device; and in the displaying of the manipulation menu, in the case where the obtained state information indicates the power-off state, the computer is caused to judge which of the one or more menu items are executable in the power-off state, and to display the manipulation menu such that the one or more menu items which are judged as being executable in the power-off state are included in the manipulation menu, and the one or more menu items which are not judged as being executable in the power-off state are not included in the manipulation menu.

8. The computer program according to claim 7, further comprising:

computer executable program code operable to cause the computer to obtain electronic device priority information that is information related to a priority level of the electronic device; and computer executable program code operable to cause the computer to compare, in the case where both the electronic device and the audio-video processing apparatus are able to perform an operation corresponding to the operation instruction, a priority level indicated by self-device priority information stored in advance with the priority level indicated by the electronic device priority information, the self-device priority information being information related to the priority level of the audio-video processing apparatus, and obtain the operation instruction information related to the corresponding manipulation item information corresponding to the operation instruction only in the case where the priority level indicated by the electronic device priority information is higher than the priority level indicated by the self-device priority information.

9. The computer program according to claim 7, wherein each of the audio-video processing apparatus and electronic device is one of a television, a DVD player, a DVD recorder, a hard disk recorder, a video tape recorder, a CD player, a tuner, a cassette tape recorder, an amplifier, and a surround-sound system.

10. The computer program according to claim 7, wherein the operation of the electronic device in a predetermined manner comprises one of: reproducing a video signal, reproducing an audio signal, recording a video signal, recording an audio signal, outputting a video signal, and outputting an audio signal.

11. The computer program according to claim 7, wherein the obtained state information further indicates one of activated state, inactivated state, input mode, output mode, display mode, recording mode, play mode, out of order state, sleep state and suspend state.

12. The audio-video processing apparatus according to claim 1, wherein the state information further indicates whether or not reproduction of video/audio is in progress in the electronic device; and said manipulation menu display unit is further operable to display a menu item corresponding to a reproduction instruction out of the one or more pieces of manipulation item information, only in the case where the state information indicates that the reproduction is not in progress.

13. The audio-video processing apparatus according to claim 2, wherein the self-device priority information and the electronic device priority information each indicates a priority level associated with each of plural functions, and in the case where both the electronic device and said audio-video processing apparatus are able to perform an operation corresponding to the operation instruction, said operation instruction information obtainment unit is operable to compare the priority level indicated by the self-device priority information with the priority level indicated by the electronic device priority information, each of the priority levels being associated with a function corresponding to the operation instruction, and is operable to obtain the operation instruction information related to the corresponding manipulation item information corresponding to the operation instruction only in the case where the priority level indicated by the electronic device priority information is higher than the priority level indicated by the self-device priority information.

14. An electronic device system comprising an electronic device and an audio-video processing apparatus which are connected via a network, wherein said electronic device includes:

a manipulation item information sending unit operable to send, to said audio-video processing apparatus, manipulation item information that is information for causing said electronic device to operate in a predetermined manner;

a state information sending unit operable to send, to said audio-video processing apparatus, state information indicating a state of said electronic device;

an operation instruction information receiving unit operable to receive, from said audio- video processing apparatus, operation instruction information related to the manipulation item information, the operation instruction information being information instructing that an operation should be performed; and an operation unit operable to operate according to the received operation instruction information, and said audio-video processing apparatus includes:

a manipulation item information storage unit operable to receive and hold the manipulation item information sent from said electronic device;

a state information receiving unit operable to receive the state information sent from said electronic device;

a manipulation menu display unit operable to prepare a manipulation menu that includes one or more menu items that correspond to the manipulation item information held in said manipulation item information storage unit, and operable to display the prepared manipulation menu, depending on the state information received by said state information receiving unit;

an operation instruction accepting unit operable to accept an operation instruction that is an instruction directed to one of the one or more menu items in the manipulation menu displayed by said manipulation menu display unit;

an operation instruction information obtainment unit operable to obtain operation instruction information related to the manipulation item information corresponding to the operation instruction, the operation instruction information being information instructing that an operation should be performed; and an operation instruction information sending unit operable to send, to said electronic device, the operation instruction information obtained by said operation instruction information obtainment unit;

wherein the state information indicates at least a power-on/-off state of said electronic device; and said manipulation menu display unit of said audio-video processing apparatus is, in the case where the obtained state information indicates the power-off state, operable to judge which of the one or more menu items are executable in the power-off state, and to display the manipulation menu such that the one or more menu items which are judged as being executable in the power-off state are included in the manipulation menu, and the one or more menu items which are not judged as being executable in the power-off state are not included in the manipulation menu.

15. The electronic device system according to claim 14, wherein said manipulation item information sending unit of said electronic device is operable to obtain state information indicating a state of said electronic device, specify, based on the obtained state information, manipulation item information, according to which said electronic device is able to operate, and send only the specified manipulation item information to said audio-video processing apparatus.

16. The electronic device system according to claim 14, wherein said electronic device further includes:

a priority information sending unit operable to send, to said audio-video processing apparatus, electronic device priority information that is information related to a priority level of said electronic device, and said audio-video processing apparatus further includes:

a self-device priority information storage unit operable to hold self-device priority information that is information related to a priority level of said audio-video processing apparatus; and an electronic device priority information receiving unit operable to receive the electronic device priority information sent from said electronic device, and in the case where both said electronic device and said audio-video processing apparatus are able to perform an operation corresponding to the operation instruction, said operation instruction information obtainment unit is further operable to compare the priority level indicated by the self-device priority information with the priority level indicated by the electronic device priority information, and is operable to obtain the operation instruction information related to the manipulation item information corresponding to the operation instruction only in the case where the priority level indicated by the electronic device priority information is higher than the priority level indicated by the self-device priority information.

* * * * *